(12) United States Patent
Miyoshi et al.

(10) Patent No.: US 11,390,728 B2
(45) Date of Patent: Jul. 19, 2022

(54) CELLULOSE-CONTAINING RESIN COMPOSITION AND CELLULOSIC INGREDIENT

(71) Applicant: Asahi Kasei Kabushiki Kaisha, Tokyo (JP)

(72) Inventors: Takaaki Miyoshi, Tokyo (JP); Naoaki Yamasaki, Tokyo (JP); Koichi Ueno, Tokyo (JP); Takashi Sanda, Tokyo (JP); Kazuya Nagata, Toyama (JP); Kazuaki Sanada, Toyama (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 848 days.

(21) Appl. No.: 16/080,404

(22) PCT Filed: Sep. 8, 2017

(86) PCT No.: PCT/JP2017/032561
§ 371 (c)(1),
(2) Date: Aug. 28, 2018

(87) PCT Pub. No.: WO2018/123150
PCT Pub. Date: Jul. 5, 2018

(65) Prior Publication Data
US 2021/0198455 A1    Jul. 1, 2021

(30) Foreign Application Priority Data

| Dec. 28, 2016 | (JP) | JP2016-256445 |
| Mar. 27, 2017 | (JP) | JP2017-061190 |
| Jul. 13, 2017 | (JP) | JP2017-136947 |
| Jul. 14, 2017 | (JP) | JP2017-138439 |

(51) Int. Cl.
C08L 1/02       (2006.01)
C08K 5/053     (2006.01)

(52) U.S. Cl.
CPC .............. *C08L 1/02* (2013.01); *C08K 5/053* (2013.01)

(58) Field of Classification Search
CPC ....................................................... C08L 1/02
See application file for complete search history.

(56) References Cited

U.S. PATENT DOCUMENTS

| 3,489,719 A | 1/1970 | Savage et al. |
| 5,723,522 A | 3/1998 | Bergmann |
| 2008/0051498 A1 | 2/2008 | Kodama |
| 2008/0108772 A1* | 5/2008 | Oksman ............. C08L 1/14 527/314 |
| 2008/0118765 A1* | 5/2008 | Dorgan .............. C08G 63/08 428/532 |
| 2009/0029169 A1 | 1/2009 | Takamoto et al. |
| 2009/0054552 A1 | 2/2009 | Yano et al. |
| 2011/0081495 A1 | 4/2011 | Hayashi et al. |
| 2012/0283363 A1 | 11/2012 | Kumamoto et al. |
| 2014/0073722 A1 | 3/2014 | Shiramizu et al. |
| 2016/0002461 A1 | 1/2016 | Tsujii et al. |
| 2016/0040744 A1 | 2/2016 | Sumita et al. |
| 2016/0133902 A1 | 5/2016 | Nakamura et al. |
| 2016/0215179 A1 | 7/2016 | Sumnicht et al. |
| 2016/0369125 A1* | 12/2016 | Ozcan ................. C09D 163/00 |
| 2018/0142071 A1 | 5/2018 | Ju et al. |
| 2018/0179369 A1 | 6/2018 | Ito et al. |
| 2018/0258259 A1* | 9/2018 | Banerjie ............... C08L 101/00 |
| 2020/0399444 A1* | 12/2020 | Miyazaki .................. C08L 7/00 |

FOREIGN PATENT DOCUMENTS

| EP | 2557124 A1 | 2/2013 |
| JP | S47-001601 B | 1/1972 |
| JP | H09-505329 A | 5/1997 |
| JP | 2000-264975 A | 9/2000 |
| JP | 2002-294080 A | 10/2002 |
| JP | 2006-282923 A | 10/2006 |
| JP | 2007-051266 A | 3/2007 |
| JP | 2007-138106 A | 6/2007 |
| JP | 2008-001728 A | 1/2008 |
| JP | 2009-052016 A | 3/2009 |
| JP | 2010-059304 A | 3/2010 |
| JP | 2010-265357 A | 11/2010 |
| JP | 2011-140738 A | 7/2011 |
| JP | 2012-102324 A | 5/2012 |
| JP | 2012-122019 A | 6/2012 |
| JP | 2012-201767 A | 10/2012 |
| JP | 2012-236906 A | 12/2012 |
| JP | 2013-133363 A | 7/2013 |
| JP | 2013-228097 A | 11/2013 |
| JP | 2014-129518 A | 7/2014 |
| JP | 2014-156677 A | 8/2014 |
| JP | 2014-234472 A | 12/2014 |

(Continued)

OTHER PUBLICATIONS

Xu et al. (ACS Appl. Mater. Interfaces 2013, 5, 2999-3009) (Year: 2013).*
Sapkota et al. (Polymer 110, 2017, 284-291) (Year: 2017).*
Supplementary European Search Report issued in corresponding European Patent Application No. 17886453.4 dated Jul. 22, 2019.
Okuda et. al., "Tensile properties of hydrophobizing agent-treated cellulose nano fiber/polypropylene composites", Proceeding of Mechanical Engineering Congress, 337-338 (2016) (see English abstract).
Nagata et. al., "Dispersion and mechanical properties of hydrophobizing agent-treated cellulose nano fiber/polyolefin nanocomposites fabricated by melt-compounding," Proceeding of APCFS2016, TRACK13-2 (2016).

(Continued)

*Primary Examiner* — Liam J Heincer
(74) *Attorney, Agent, or Firm* — Morgan, Lewis & Bockius LLP

(57) ABSTRACT

The present disclosure relates to a resin composition that exhibits satisfactory flow properties and mechanical properties, to a cellulose formulation that is used to produce the resin composition, and to resin pellets and a molded resin formed by the resin composition.

14 Claims, 2 Drawing Sheets

(56) References Cited

FOREIGN PATENT DOCUMENTS

| | | |
|---|---|---|
| JP | 2015-096624 A | 5/2015 |
| JP | 2015-183153 A | 10/2015 |
| JP | 2015-189820 A | 11/2015 |
| JP | 2017-165956 A | 9/2017 |
| JP | 2018-009134 A | 1/2018 |
| JP | 2018-048218 A | 3/2018 |
| KR | 10-2011-0000575 A | 1/2011 |
| WO | 2006/057392 A1 | 6/2006 |
| WO | 2011/058678 A1 | 5/2011 |
| WO | 2012/111408 A1 | 8/2012 |
| WO | 2013/031444 A1 | 3/2013 |
| WO | 2013/122171 A1 | 8/2013 |
| WO | 2014/133019 A1 | 9/2014 |
| WO | 2015/199482 A1 | 12/2015 |
| WO | 2016/199923 A1 | 12/2016 |

OTHER PUBLICATIONS

Nagata et. al., "Melt Compounding and Tensile Behavior of Hydrophobing Agent-Treated Cellulose Nano Fiber/Polypropylene Composites", Proceeding of 9th International Conference on Green Composites (2016).

Nagata et. al., "A33: Tensile behavior of hydrophobic agent-treated cellulose nanocrystal/polypropylene composites", Proceeding of EMN Meeting on polymer Program & Abstracts, 33-34 (2017).

International Search Report issued in corresponding International Patent Application No. PCT/JP2017/032561 dated Nov. 21, 2017.

Ljungberg et al., "Nanocomposites of isotactic polypropylene reinforced with rod-like cellulose whiskers," Polymer, 47: 6285-6292 (2006).

Office Action issued in related Japanese Patent Application No. 2017-172997 dated Jul. 3, 2018.

Accomplishment Report 2010-2012, New Energy and Industrial Technology Development Organization,1-84 (2013) (see JP OA dated Jul. 3, 2018).

Written Opinion issued in corresponding International Patent Application No. PCT/JP2017/032561 dated Feb. 11, 2019.

Okuda, et. al., "Dispersion and tensile properties of cellulose nano fiber/polyolefin composites fabricated by melt-compounding", The Japan Society of Mechanical Engineers, Hokuriku Shin-Etsu Student Council, 45th Conference on the Graduation Thesis for Undergraduate Students, No. 0008 (2016) (see tables 1 and 2).

Office Action issued in corresponding European Patent Application No. 17886453.4 dated Sep. 18, 2019.

Office Action issued in corresponding Korean Patent Application No. 10-2017-0114870 dated Sep. 18, 2018.

\* cited by examiner (B)

(A)

CELLULOSE-CONTAINING RESIN COMPOSITION AND CELLULOSIC INGREDIENT

FIELD

The present disclosure relates to a resin composition containing cellulose, and to a cellulose formulation.

BACKGROUND

Thermoplastic resins are light and have excellent processing characteristics, and are therefore widely used for a variety of purposes including automobile members, electrical and electronic parts, business machine housings, precision parts and the like. With resins alone, however, the mechanical properties and dimensional stability are often inadequate, and it is therefore common to use composites of resins with different types of inorganic materials.

Resin compositions comprising thermoplastic resins reinforced with reinforcing materials consisting of inorganic fillers such as glass fibers, carbon fibers, talc or clay have high specific gravity, and therefore the molded resins obtained using such resin compositions have had higher weights.

In recent years, cellulose has come to be used as a new reinforcing material for resins.

Cellulose is obtained from a variety of sources, including trees as starting materials, as well as from hemp, cotton, kenaf and cassava starting materials. Bacterial celluloses are also known, typical of which is nata de coco. These natural resources used as starting materials are abundant throughout the Earth, and a great deal of effort has been focused on techniques for exploiting celluloses as fillers in resins so that they can be effectively utilized. Cellulose microfibrils such as cellulose nanofibers (hereunder also abbreviated as CNF) and cellulose nanocrystals (hereunder also abbreviated as CNC) have been a particular area of focus.

Microfibrils composed of type I cellulose crystals, in particular, are known to have excellent mechanical properties, a high elastic modulus similar to aramid fibers and a smaller linear expansion coefficient than glass fibers, their features including a true density of 1.56 g/cm$^3$ and being overwhelmingly lighter than glass (density: 2.4 to 2.6 g/cm$^3$) or talc (density: 2.7 g/cm$^3$), which are commonly used as reinforcing materials for thermoplastic resins. This has led to a wide variety of research, as it is expected that such resins can be imparted with excellent mechanical properties if such microfibrils can be microdispersed in the resins to form a network.

PTLs 1 to 4, for example, describe techniques for dispersing microfibrous cellulose, known as cellulose nanofibers, in thermoplastic resins.

CNF are obtained using pulp or the like as starting material, hydrolyzing the hemicellulose portion to weaken the pulp, and then defibrating it using a pulverizing method with a high-pressure homogenizer, microfluidizer, ball mill or disk mill, and in water they form a highly dispersed state or network known as a fine "nanodispersion".

In addition, PTL 5, for example, describes a technique for dispersing crystalline cellulose fine powder in a dispersing agent and thermoplastic resin, for the purpose of improving the dispersibility of cellulose particles in resins. PTL 6 describes a technique for increasing affinity between thermoplastic resins and plant fibers using rosin-based resins. PTL 7 describes a technique of adding a fat or oil component and a silane coupling agent to evenly disperse cellulose fibers in polyolefins. PTL 8 describes a technique for improving the water resistance of a cellulose composite material by modification of the cellulose surfaces with a rosin-based compound. PTLs 9 and 10 described techniques for improving the dispersibility of CNF in a thermoplastic resin, by adding a nonionic surfactant having a specified HLB value. Finally, PTL 11 describes a technique for improving the dispersibility of cellulose in a resin, by adding a copolymer dispersing agent having a segment with resin affinity and a segment with cellulose affinity.

CITATION LIST

Patent Literature

[PTL 1] International Patent Publication No. WO2011/058678
[PTL 2] International Patent Publication No. WO2016/199923
[PTL 3] Japanese Patent Public Inspection HEI No. 9-505329
[PTL 4] Japanese Unexamined Patent Publication No. 2008-001728
[PTL 5] Japanese Unexamined Patent Publication No. 2006-282923
[PTL 6] Japanese Unexamined Patent Publication No. 2002-294080
[PTL 7] Japanese Unexamined Patent Publication No. 2000-264975
[PTL 8] Japanese Unexamined Patent Publication No. 2014-129518
[PTL 9] International Patent Publication No. WO2013/122171
[PTL 10] International Patent Publication No. WO2012/111408
[PTL 11] International Patent Publication No. WO2014/133019

SUMMARY

Technical Problem

Addition of such cellulosic substances to resins requires drying and powdering of the cellulosic substances. However, cellulosic substances form strongly bonded aggregates out of their microdispersed state during the procedure of separation from water, and become difficult to subsequently re-disperse. The cohesion of the aggregates is exhibited due to hydrogen bonding by the hydroxyl groups of the cellulose, and is considered to be extremely strong. Consequently, in order to adequately exhibit the performance of a cellulosic substance, in the case of CNF as an example, it is necessary to apply powerful shear force to the CNF to defibrate them to nanometer-sized (i.e. <1 μm) fiber diameters.

However, even when the defibrating itself is adequately accomplished, it has been difficult to maintain the defibrated state in the resin. Moreover, when cellulose fibers have been filled into and microdispersed in a resin composition, the resin composition causes a drastic increase in melt viscosity when filled in with a smaller amount than required to exhibit the strength of the resin composition. The drastic increase in melt viscosity is directly linked to serious problems such as inability to accomplish shaping, and especially inability to accomplish shaping of materials with particularly dense structures, or even when shaping is possible, the result may be that the intended level of mechanical properties cannot be exhibited.

In other words, as of the current time, no technology exists for microdispersing sufficient amounts of microcellulose in a resin composition to exhibit desired mechanical properties for molded resins, and for ensuring sufficient flow properties to withstand actual molding.

In addition, the fact that cellulosic substances have insufficient dispersion uniformity in resin compositions can lead to differences in mechanical strength depending on the site within the molded article, and very high variation in the obtained mechanical properties. In such cases, the molded article has partial strength defects, and its reliability as an actual product is greatly impaired. Therefore, it is currently the case that cellulosic substances are not actually implemented in practice despite having excellent properties.

Moreover, the techniques so far designed to increase dispersion uniformity have not yet provided a sufficient degree of improvement. For example, since crystalline cellulose with large primary particles is used alone in PTL 5, it is difficult to disperse it in the form of microfibrils, while in PTLs 6 and 7, wherein wood dust or paper dust are used, the particles are coarse and cannot be microdispersed. Moreover, the anhydrous rosin-modified cellulose of PTL 8 is problematic in that the mechanical properties are lacking, because it is dispersed in the form of aggregates.

With the techniques described in PTLs 9 and 10, entanglement between the CNF results in insufficient dispersion in resins, which is problematic as the expected physical properties cannot be obtained. The dispersing agent described in PTL 11 is also problematic, since, because of its high molecular weight, the flow property of the resin is drastically reduced upon addition of the dispersing agent, such that excessive heating is required during melt kneading, and this leads to heat degradation of the resin and odor or impaired color tone caused by oxidation of hemicellulose.

In light of these circumstances, as one aspect of the present disclosure it is an object to provide a resin composition that can impart sufficient mechanical properties to molded resins, while also having a sufficient flow property for problem-free practical molding, and sufficient stability of physical properties that allow it to withstand practical use.

As another aspect of the present disclosure, it is an object to provide a cellulose formulation that has satisfactory dispersibility in resins, and that by being dispersed in a resin, can yield a resin composition with excellent flow properties when melted, satisfactory elongation when stretched, and excellent dimensional stability.

Solution to Problem

As a result of diligently pursuing research with the aim of solving the problems described above, the present inventors have found that, according to the one aspect, in a resin composition containing a necessary amount of a cellulose component with respect to a thermoplastic resin, the resin composition solves the indicated problem if the cellulose component includes cellulose whiskers having a length/diameter ratio (L/D ratio) of less than 30 and cellulose fibers having an L/D ratio of 30 or greater, and that according to the other aspect, a cellulose formulation obtained by pre-compositing cellulose with an organic component having a specific surface tension and having a higher boiling point than water, when it is added to and melt mixed with a resin in a dry powder state, disperses on the level of microfibrils which form a network in the resin. Specifically, the present disclosure encompasses the following aspects.

[1] A resin composition comprising 100 parts by mass of a thermoplastic resin and 0.1 to 100 parts by mass of a cellulose component, wherein the cellulose component includes cellulose whiskers having a length/diameter ratio (L/D ratio) of less than 30 and cellulose fibers having an L/D ratio of 30 or greater.

[2] The resin composition according to aspect 1, wherein the proportion of cellulose whiskers is 50 mass % or greater with respect to the total mass of the cellulose component.

[3] The resin composition according to aspect 1 or 2, wherein the diameter of the cellulose component is 500 nm or smaller.

[4] The resin composition according to any one of aspects 1 to 3, wherein the degree of crystallinity of the cellulose whiskers and the degree of crystallinity of the cellulose fibers are both 55% or higher.

[5] The resin composition according to any one of aspects 1 to 4, wherein the degree of polymerization of the cellulose whiskers is 100 or higher and 300 or lower.

[6] The resin composition according to any one of aspects 1 to 5, wherein the degree of polymerization of the cellulose fibers is 400 or higher and 3500 or lower.

[7] The resin composition according to any one of aspects 1 to 6, further comprising an organic component having a dynamic surface tension of no greater than 60 mN/m in an amount of up to 50 parts by mass with respect to 100 parts by mass of the cellulose component.

[8] The resin composition according to aspect 7, wherein the organic component is a surfactant.

[9] The resin composition according to aspect 7 or 8, wherein the static surface tension of the organic component is 20 mN/m or greater.

[10] The resin composition according to any one of aspects 7 to 9, wherein the organic component is one or more selected from the group consisting of rosin derivatives, alkylphenyl derivatives, bisphenol A derivatives, β-naphthyl derivatives, styrenated phenyl derivatives and hydrogenated castor oil derivatives.

[11] The resin composition according to any one of aspects 7 to 10, wherein the organic component is a polyoxyethylene derivative.

[12] The resin composition according to any one of aspects 1 to 11, wherein the coefficient of variation of the tensile break strength of the resin composition (standard deviation/arithmetic mean value) is no greater than 10%.

[13] A resin composition comprising 100 parts by mass of a thermoplastic resin and 0.1 to 100 parts by mass of a cellulose component, wherein the coefficient of variation of the linear expansion coefficient of the resin composition (standard deviation/arithmetic mean value) in a range of 0° C. to 60° C. is no greater than 15%, and the coefficient of variation of the tensile break strength of the resin composition is no greater than 10%.

[14] The resin composition according to aspect 13, wherein the cellulose component is present at 0.1 to 20 parts by mass with respect to 100 parts by mass of the thermoplastic resin.

[15] The resin composition according to aspect 13 or 14, wherein the cellulose component includes cellulose whiskers having a length/diameter ratio (L/D ratio) of less than 30 and cellulose fibers having an L/D ratio of 30 or greater.

[16] The resin composition according to any one of aspects 13 to 15, wherein the cellulose component includes cellulose whiskers having a length/diameter ratio (L/D ratio)

of less than 30 in an amount of 50 mass % to 98 mass % with respect to 100 mass % of the cellulose component.

[17] The resin composition according to any one of aspects 1 to 16, wherein the tensile yield strength of the resin composition is at least 1.1 times the tensile yield strength of the thermoplastic resin.

[18] The resin composition according to any one of aspects 1 to 17, wherein the linear expansion coefficient of the resin composition in a range of 0° C. to 60° C. is no greater than 50 ppm/K.

[19] The resin composition according to any one of aspects 1 to 18, wherein the thermoplastic resin is selected from the group consisting of polyolefin-based resins, polyamide-based resins, polyester-based resins, polyacetal-based resins, polyphenylene ether-based resins, polyphenylene sulfide-based resins, and mixtures of any two or more of the same.

[20] The resin composition according to aspect 19, wherein the thermoplastic resin is polypropylene, and the melt mass-flow rate (MFR) of the polypropylene is between 3 g/10 min and 30 g/10 min, inclusive, as measured at 230° C. according to ISO1133.

[21] The resin composition according to aspect 19, wherein the thermoplastic resin is a polyamide-based resin, and the ratio of carboxyl terminal groups with respect to the total terminal groups of the polyamide-based resin ([COOH]/[total terminal groups]) is 0.30 to 0.95.

[22] The resin composition according to aspect 19, wherein the thermoplastic resin is a polyester-based resin, and the ratio of carboxyl terminal groups with respect to the total terminal groups of the polyester-based resin ([COOH]/[total terminal groups]) is 0.30 to 0.95.

[23] The resin composition according to aspect 19, wherein the thermoplastic resin is a polyacetal-based resin, and the polyacetal-based resin is a copolyacetal containing 0.01 to 4 mol % of a comonomer component.

[24] A cellulose formulation including cellulose particles and an organic component that covers at least portions of the surfaces of the cellulose particles, wherein the organic component has a static surface tension of 20 mN/m or greater and a higher boiling point than water.

[25] The cellulose formulation according to aspect 24, wherein the dynamic surface tension of the organic component is no greater than 60 mN/m.

[26] The cellulose formulation according to aspect 24 or 25, wherein the solubility parameter (SP value) of the organic component is 7.25 or greater.

[27] The cellulose formulation according to any one of aspects 24 to 26, wherein the particle diameter at 50% in cumulative volume, as measured with a laser diffraction particle size distribution meter, is no greater than 10 μm.

[28] The cellulose formulation according to any one of aspects 24 to 27, wherein the mean polymerization degree of the cellulose composing the cellulose particles is no greater than 1000.

[29] The cellulose formulation according to any one of aspects 24 to 28, wherein the cellulose composing the cellulose particles includes crystalline cellulose.

[30] The cellulose formulation according to aspect 29, wherein the mean L/D ratio of the crystalline cellulose is less than 30 and/or the mean polymerization degree is less than 500.

[31] The cellulose formulation according to any one of aspects 24 to 30, wherein the cellulose formulation further includes cellulose fibers, the mean L/D ratio of the cellulose fibers being 30 or greater and/or the mean polymerization degree being 300 or greater.

[32] The cellulose formulation according to any one of aspects 24 to 31, wherein the proportion of crystalline cellulose is 50 mass % or greater with respect to the total mass of cellulose in the cellulose formulation.

[33] The cellulose formulation according to any one of aspects 24 to 32, which includes 30 to 99 mass % of cellulose and 1 to 70 mass % of the organic component.

[34] The cellulose formulation according to any one of aspects 24 to 33, wherein the organic component is selected from the group consisting of rosin derivatives, alkylphenyl derivatives, bisphenol A derivatives, β-naphthyl derivatives, styrenated phenyl derivatives and hydrogenated castor oil derivatives.

[35] The cellulose formulation according to any one of aspects 24 to 33, wherein the organic component is a polyoxyethylene derivative.

[36] A resin composition including the cellulose formulation according to any one of aspects 24 to 35 at 1 mass % or greater.

[37] The resin composition according to aspect 36, which further includes an interface-forming agent in an amount of 1 part by mass or greater with respect to 100 parts by mass of the cellulose in the cellulose formulation.

[38] The resin composition according to aspect 36 or 37, which further includes a thermoplastic resin.

[39] A resin composition including a thermoplastic resin, cellulose particles, an organic component and an interface-forming agent,
wherein the organic component has a static surface tension of 20 mN/m or greater and a higher boiling point than water, and
the amount of the interface-forming agent is 1 part by mass or greater with respect to 100 parts by mass of cellulose in the resin composition.

[40] The resin composition according to aspect 39, wherein the dynamic surface tension of the organic component is no greater than 60 mN/m.

[41] The resin composition according to aspect 39 or 40, wherein the solubility parameter (SP value) of the organic component is 7.25 or greater.

[42] The resin composition according to any one of aspects 39 to 41, wherein the particle diameter at 50% in cumulative volume of the cellulose particles, as measured with a laser diffraction particle size distribution meter, is no greater than 10 μm.

[43] The resin composition according to any one of aspects 39 to 42, wherein the mean polymerization degree of the cellulose composing the cellulose particles is no greater than 1000.

[44] The resin composition according to any one of aspects 39 to 43, wherein the cellulose composing the cellulose particles includes crystalline cellulose.

[45] The resin composition according to aspect 44, wherein the mean L/D of the crystalline cellulose is less than 30 and/or the mean polymerization degree is less than 500.

[46] The resin composition according to any one of aspects 39 to 45, wherein the resin composition further includes cellulose fibers, the mean L/D of the cellulose fibers being 30 or greater and/or the mean polymerization degree being 300 or greater.

[47] The resin composition according to any one of aspects 39 to 46, wherein the proportion of crystalline cellulose is 50 mass % or greater with respect to the total mass of cellulose in the resin composition.

[48] The resin composition according to any one of aspects 39 to 47, wherein the amount of cellulose is 30 to 99 mass % and the amount of the organic component is 1 to 70 mass %, with respect to 100 mass % as the total of the total amount of cellulose and the amount of organic component in the resin composition.

[49] The resin composition according to any one of aspects 39 to 48, wherein the organic component is selected from the group consisting of rosin derivatives, alkylphenyl derivatives, bisphenol A derivatives, β-naphthyl derivatives, styrenated phenyl derivatives and hydrogenated castor oil derivatives.

[50] Resin pellets formed of a resin composition according to any one of aspects 1 to 23 and 36 to 49.

[51] A molded resin formed of a resin composition according to any one of aspects 1 to 23 and 36 to 49.

Advantageous Effects of Invention

According to one aspect, the resin composition has a flow property that is non-problematic for practical molding, while imparting sufficient mechanical properties to the molded resin, and also has an effect of exhibiting sufficiently stable physical properties that can withstand practical use.

According to another aspect, the cellulose formulation has satisfactory dispersibility in resins, and exhibits an effect such that a resin composition obtained by dispersing the cellulose formulation in a resin has an excellent flow property when melted and satisfactory injection moldability, and the resin composition also has a low linear expansion coefficient, and excellent strength and elongation when subjected to stretching or bending deformation.

DESCRIPTION OF EMBODIMENTS

Figure 1:
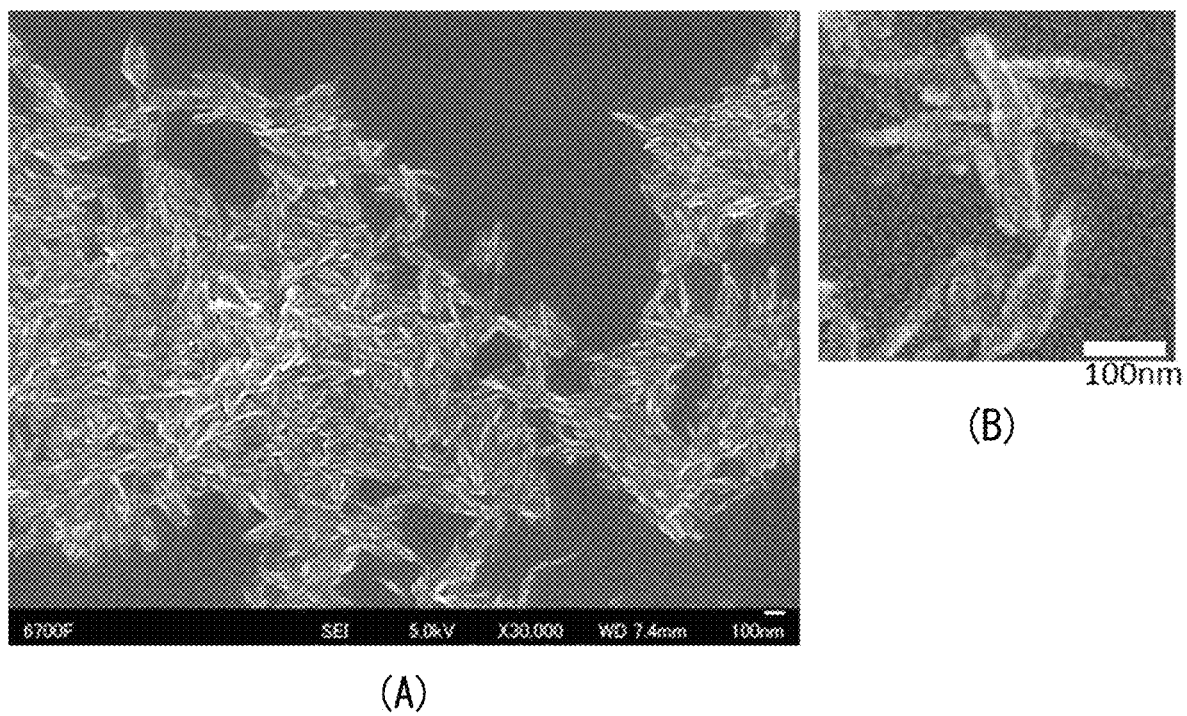
FIG. 1 is a microscope image showing an example of cellulose whiskers (needle-crystalline particulate cellulose).
Figure 1:
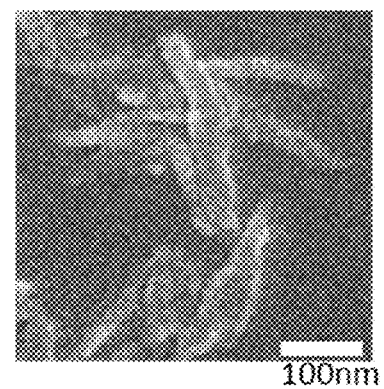

The present invention will now be described in greater detail with concrete embodiments (particularly the following aspects A to C). The following embodiments serve merely as illustration of the invention, and the gist of the invention is not limited to the content described below. The present invention may be implemented with appropriate modifications that are within the scope of its gist.

[Aspect A]

One aspect of the invention provides a resin composition comprising 100 parts by mass of a thermoplastic resin and 0.1 to 100 parts by mass of a cellulose component, wherein the cellulose component includes cellulose whiskers having a length/diameter ratio (L/D ratio) of less than 30 and cellulose fibers having an L/D ratio of 30 or greater.

<Thermoplastic Resin>

Thermoplastic resins include crystalline resins having melting points in the range of 100° C. to 350° C., and amorphous resins having glass transition temperatures in the range of 100 to 250° C.

The melting point of the crystalline resin referred to here is the peak top temperature of the endothermic peak appearing when the temperature is increased from 23° C. at a temperature-elevating rate of 10° C./min using a differential scanning calorimeter (DSC). When two or more endothermic peaks appear, it represents the peak top temperature of the endothermic peak that is furthest at the high-temperature end. The enthalpy of the endothermic peak is preferably 10 J/g or greater and more preferably 20 J/g or greater. During the measurement, preferably the sample is heated once to temperature conditions of melting point+20° C. or higher, and after the resin has been melted, it is cooled to 23° C. at a temperature-lowering rate of 10° C./min and used as the sample.

The glass transition temperature of the amorphous resin referred to here is the peak top temperature of the peak with high reduction in storage elastic modulus and maximum loss elastic modulus, during measurement with an applied frequency of 10 Hz while increasing the temperature from 23° C. at a temperature-elevating rate of 2° C./min, using a dynamic viscoelasticity measuring apparatus. When two or more loss elastic modulus peaks appear, it represents the peak top temperature of the peak that is furthest at the high-temperature end. The measuring frequency during this time is preferably one or more times in at least 20 seconds, in order to increase the measuring precision. The method of preparing the measuring sample is not particularly restricted, but from the viewpoint of eliminating the effect of molding strain it is preferred to use a strip cut out from a hot press molded article, the size (width or thickness) of the cut out strip preferably being as small as possible from the viewpoint of heat conduction.

Specific examples of thermoplastic resins include polyolefin-based resins, polyamide-based resins, polyester-based resins, polyacetal-based resins, polyphenylene ether-based resins, polyphenylene sulfide-based resins and mixtures of two or more of the same, with no particular limitation to these.

Among them, polyolefin-based resins, polyamide-based resins, polyester-based resins and polyacetal-based resins are preferred resins from the viewpoint of handleability and cost.

Polyolefin-based resins that are preferred as thermoplastic resins are polymers obtained by polymerizing olefins (such as α-olefins) or alkenes as monomer units. Specific examples of polyolefin-based resins include ethylene-based (co)polymers such as low-density polyethylene (for example, linear low-density polyethylene), high-density polyethylene, ultralow-density polyethylene and ultrahigh molecular weight polyethylene, polypropylene-based (co) polymers such as polypropylene, ethylene-propylene copolymer and ethylene-propylene-diene copolymer, and copolymers with α-olefins such as ethylene, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of between 3 g/10 min and 30 g/10 min, inclusive, as measured at 230° C. with a load of 21.2 N, according to ISO1133. The lower limit for MFR is more preferably 5 g/10 min, even more preferably 6 g/10 min and most preferably 8 g/10 min. The upper limit for MFR is more preferably 25 g/10 min, even more preferably 20 g/10 min and most preferably 18 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating to above the melting point in the presence of or in the absence of a peroxide, for melt kneading. The polyolefin resin to be acid modified may be any of the aforementioned polyolefin-based resins, but polypropylene is most suitable for use. The acid-modified polypropylene may be used alone, but it is preferably used in admixture with a non-modified polypropylene in order to adjust the modification rate of the composition. The proportion of acid-modified polypropylene with respect to the total polypropylene is 0.5 mass % to 50 mass %. A more preferred lower limit is 1 mass %, even more preferably 2 mass %, yet more preferably 3 mass %, even yet more preferably 4 mass % and most preferably 5 mass %. A more preferred upper limit is 45 mass %, even more preferably 40 mass %, yet more preferably 35 mass %, even yet more preferably 30 mass % and most preferably 20 mass %. In order to maintain interfacial strength with the cellulose it is preferably higher than the lower limit, and in order to maintain ductility as a resin it is preferably lower than the upper limit.

The melt mass-flow rate (MFR) of the acid-modified polypropylene as measured at 230° C. with a load of 21.2 N according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of residing more easily at the interface between the cellulose and the resin.

Examples of preferred polyamide-based resins for the thermoplastic resin include polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,1, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing, of which copolymers such as polyamide 6,T/6,I are examples.

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 µmol/g and more preferably 30 µmol/g. The upper limit for the terminal carboxyl group concentration is preferably 150 µmol/g, more preferably 100 µmol/g and even more preferably 80 µmol/g.

For the polyamide of this embodiment, the carboxyl terminal group ratio with respect to the total terminal groups ([COOH]/[total terminal groups]) is more preferably 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose component in the composition, and it is preferably no greater than 0.95 from the viewpoint of the color tone of the obtained composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from among acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decyl amine, stearylamine, cyclohexylamine and aniline.

The concentration of the amino terminal groups and carboxyl terminal groups is preferably determined from the integral of the characteristic signal corresponding to each terminal group, according to 1H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in 1H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by 1H-NMR.

The intrinsic viscosity [η] of the polyamide-based resin, measured in concentrated sulfuric acid at 30° C., is preferably 0.6 to 2.0 dL/g, more preferably 0.7 to 1.4 dL/g, even more preferably 0.7 to 1.2 dL/g and most preferably 0.7 to 1.0 dL/g. If the aforementioned polyamide having intrinsic viscosity in the preferred range, or the particularly preferred range, is used, it will be possible to provide an effect of drastically increasing the flow property of the resin composition in the die during injection molding, and improving the outer appearance of molded pieces.

Throughout the present disclosure, "intrinsic viscosity" is synonymous with the viscosity commonly known as the limiting viscosity. The specific method for determining the viscosity is a method in which the ηsp/c of several measuring solvents with different concentrations is measured in 96% concentrated sulfuric acid under temperature conditions of 30° C., the relational expression between each ηsp/c and the concentration (c) is derived, and the concentration is extrapolated to zero. The value extrapolated to zero is the intrinsic viscosity.

The details are described in Polymer Process Engineering (Prentice-Hall, Inc 1994), p. 291-294.

The number of measuring solvents with different concentrations is preferably at least 4, from the viewpoint of precision. The concentrations of the recommended measuring solutions with different viscosities are preferably at least four: 0.05 g/dL, 0.1 g/dL, 0.2 g/dL and 0.4 g/dL.

Polyester-based resins that are preferred as thermoplastic resins are one or more selected from among polyethylene terephthalate (hereunder also referred to simply as "PET"), polybutylene succinate (a polyester resin composed of an aliphatic polybasic carboxylic acid and an aliphatic polyol (hereunder also referred to simply as "PBS")), polybutylene succinate adipate (hereunder also referred to simply as "PBSA"), polybutylene adipate terephthalate (hereunder also referred to simply as "PBAT"), polyhydroxyalkanoic acids (polyester resins composed of 3-hydroxyalkanoic acids, hereunder also referred to simply as "PHA"), polylactic acid (hereunder also referred to simply as "PLA"), polybutylene terephthalate (hereunder also referred to simply as "PBT"), polyethylene naphthalate (hereunder also referred to simply as "PEN"), polyallylates (hereunder also referred to simply as "PAR") and polycarbonates (hereunder also referred to simply as "PC").

Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and more preferably the carboxyl terminal group ratio with respect to the total terminal groups of the polyester-based resin ([COOH]/[total terminal groups]) is 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose component in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. The preferred upper limit is 3.5 mol %, more preferably 3.0 mol %, even more preferably 2.5 mol % and most preferably 2.3 mol %.

The lower limit is preferably in the range specified above from the viewpoint of thermal stability during extrusion, and the upper limit is preferably in the range specified above from the viewpoint of mechanical strength.

<Cellulose Component>

The cellulose component will now be described in detail.

The cellulose component is a combination of at least two different types of cellulose. According to one aspect, the cellulose component includes cellulose whiskers and cellulose fibers. A mixture comprising both will inhibit deterioration of the flow property of the resin composition and ensure stable dispersibility in molded articles, allowing strength defects to be eliminated.

Cellulose whiskers refers to crystalline cellulose remaining after using pulp or the like as starting material, cutting it and then dissolving the amorphous portion of the cellulose in an acid such as hydrochloric acid or sulfuric acid, and its length/diameter ratio (L/D ratio) is less than 30. Throughout the present disclosure, "length" (L) and "diameter" (D) correspond, respectively, to the long diameter and short diameter of cellulose whiskers and the fiber length and fiber diameter of cellulose fibers. FIG. 1 is a microscope image showing an example of cellulose whiskers (needle-crystalline particulate cellulose), FIG. 1(B) being a partial magnified view of FIG. 1(A). Both of the cellulose forms have a needle-crystalline particulate structure, the L/D being a low L/D of less than 30.

Figure 2:
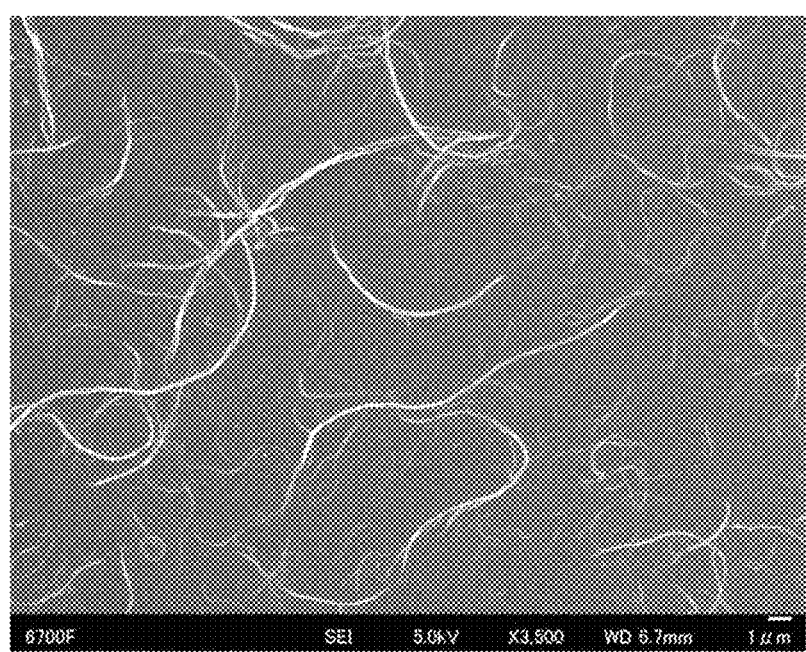
FIG. 2 is a microscope image showing an example of cellulose fibers (fibrous cellulose).

Also, cellulose fibers are cellulose obtained by treating pulp or the like with hot water or the like at 100° C. or above, hydrolyzing the hemicellulose portion to weaken it, and then defibrating by a pulverizing method using a high-pressure homogenizer, microfluidizer, ball mill or disk mill, and the L/D ratio is 30 or greater. FIG. 2 is a microscope image showing an example of cellulose fibers (fibrous cellulose). The cellulose forms all have a fibrous structure, the L/D being a high L/D of 30 or greater.

FIG. 1 and FIG. 2 show observational photographs of cellulose (wet cake following hydrolysis) (for FIG. 1) or cellulose slurry (for FIG. 2), prepared as a purified water suspension at a concentration of 1 mass % (for FIG. 1) or 0.1 mass % (for FIG. 2) and dispersed with a high-shear homogenizer (trade name, "Excel Autohomogenizer ED-7" by Nippon Seiki Co., Ltd., treatment conditions: rotational speed=15,000 rpm×5 minutes), taken with a scanning electron microscope (SEM) (apparatus: Model JSM-6700F by JEOL Corp., 5 kV, 10 mA, 30,000× (for FIG. 1) or 3,500× (for FIG. 2)). More specifically, the sample strips observed were obtained by dilution of the aqueous dispersion obtained with the homogenizer to 0.1 mass % (for FIG. 1) or 0.01 mass % (for FIG. 2) with ion-exchanged water, casting onto mica attached onto a brass stage with carbon tape, drying for 12 hours at ordinary temperature and platinum vapor deposition in a vacuum (apparatus: trade name JFC-1600 Autofine Coater by JEOL Corp., 30 mA, 30 seconds, assumed film thickness: 8 nm).

The upper limit for the L/D of the cellulose whiskers is preferably 25, more preferably 20, even more preferably 15, yet more preferably 10 and most preferably 5. The lower limit is not particularly restricted, but may be 1 or greater. The L/D ratio of the cellulose whiskers is preferably in the range specified above in order for the resin composition to exhibit a satisfactory flow property.

The lower limit for L/D of the cellulose fibers is preferably 50, more preferably 80, even more preferably 100, yet more preferably 120 and most preferably 150. The upper limit is not particularly restricted but is preferably no greater than 5000 from the viewpoint of handleability. The L/D ratio of the cellulose fibers is preferably in the range specified above in order for the molded resin obtained using the resin composition of the present disclosure to exhibit satisfactory mechanical properties in a small amount.

In the present disclosure, the length, diameter and L/D ratio of the cellulose whiskers and cellulose fibers are determined by preparing aqueous dispersions of the cellulose whiskers and cellulose fibers, respectively, each aqueous dispersion being dispersed using a high-shear homogenizer (for example, an "Excel Autohomogenizer ED-7", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with a high-resolution scanning microscope (SEM) or atomic force microscope (AFM). Specifically, with the observation field adjusted to a magnification allowing observation of at least 100 cellulose aggregates, the lengths (L) and diameters (D) of 100 randomly selected cellulose aggregates are measured and the ratio (L/D) is calculated. Those with a ratio (L/D) of less than 30 are classified as cellulose whiskers, and those with a ratio of 30 or greater are classified as cellulose fibers. The number-average value of the length (L), the number-average value of the diameter (D) and the number-average value of the ratio (L/D) were calculated for both the cellulose whiskers and the cellulose fibers, and recorded as the length, diameter and L/D ratio, respectively, for the cellulose whiskers and cellulose nanofibers of the present disclosure. The length and diameter of the cellulose component of the present disclosure are the number-average values for 100 cellulose aggregates.

Alternatively, the respective lengths, diameters and L/D ratios of the cellulose whiskers and cellulose fibers in the composition can be confirmed by measurement according to the measuring method described above, using the solid composition as the measuring sample.

Yet alternatively, the respective lengths, diameters and L/D ratios of the cellulose whiskers and cellulose fibers in the composition can be confirmed by dissolving the resin component in the composition in an organic or inorganic solvent capable of dissolving the resin component of the composition, separating the cellulose, thoroughly rinsing it with the solvent, and then replacing the solvent with purified water to form an aqueous dispersion, diluting the cellulose concentration to 0.1 to 0.5 mass % with purified water, casting the dispersion onto mica, and performing measurement by the measuring method described above using the air-dried product as the measuring sample. The cellulose measured was at least 100 randomly selected cellulose fibers with an L/D of 30 or greater, and at least 100 cellulose whiskers with a L/D of less than 30, for measurement of a total of at least 200.

For the present disclosure, cellulose whiskers and cellulose fibers are those having diameters on the nanometer size (that is, smaller than 1 μm). Preferred cellulose components (especially cellulose whiskers and cellulose fibers) have diameters of 500 nm or smaller. The preferred upper limit for the diameter of the cellulose component is 450 nm, more preferably 400 nm, even more preferably 350 nm and most preferably 300 nm.

According to a particularly preferred aspect, the diameter of the cellulose whiskers is preferably 20 nm or greater and more preferably 30 nm or greater, and preferably no greater than 500 nm, more preferably no greater than 450 nm, even more preferably no greater than 400 nm, yet more preferably no greater than 350 nm and most preferably no greater than 300 nm.

According to another particularly preferred aspect, the diameter of the cellulose fibers is preferably 1 nm or greater, more preferably 5 nm or greater, even more preferably 10 nm or greater, yet more preferably 15 nm or greater and most preferably 20 nm or greater, and preferably no greater than 450 nm, more preferably no greater than 400 nm, even more preferably no greater than 350 nm, yet more preferably no greater than 300 nm and most preferably no greater than 250 nm.

The diameter of the cellulose component is preferably in the range specified above in order to effectively exhibit mechanical properties.

Preferred cellulose whiskers are cellulose whiskers with a degree of crystallinity of 55% or higher. If the degree of crystallinity is within this range, the dynamic properties (strength and dimensional stability) of the cellulose whiskers themselves will increase, so that when they are dispersed in a resin, the strength and dimensional stability of the resin composition will tend to be increased.

The degree of crystallinity of the cellulose whiskers is preferably 60% or greater, a more preferred lower limit for the degree of crystallinity being 65%, preferably 70% and most preferably 80%. Since a higher degree of crystallinity for the cellulose whiskers tends to be preferable the upper limit is not particularly restricted, but from the viewpoint of productivity it is preferably an upper limit of 99%.

The cellulose fibers used are preferably cellulose fibers with a degree of crystallinity of 55% or higher. If the degree of crystallinity is within this range, the dynamic properties (strength and dimensional stability) of the cellulose fibers themselves will increase, so that when they are dispersed in a resin, the strength and dimensional stability of the resin composition will tend to be increased. A more preferred lower limit for the degree of crystallinity is 60%, preferably 70% and most preferably 80%. The upper limit for the degree of crystallinity of the cellulose fibers is also not particularly restricted, a higher degree being preferred, but from the viewpoint of productivity the preferred upper limit is 99%.

A large residue of impurities such as lignin may result in discoloration by heating during working, and therefore the degrees of crystallinity of the cellulose whiskers and cellulose fibers are preferably within the ranges specified above from the viewpoint of minimizing discoloration of the resin composition during extrusion or during shaping.

When the cellulose component is type I cellulose crystals (derived from natural cellulose), the degree of crystallinity referred to here is that determined by the following formula, from the diffraction pattern (2θ/deg.=10 to 30) obtained by measurement of the sample by wide-angle X-ray diffraction, based on the Segal method.

Degree of crystallinity (%)=([Diffraction intensity from (200) plane with 2θ/deg.=22.5]−[diffraction intensity from amorphous matter with 2θ/deg.=18])/[diffraction intensity from (200) plane with 2θ/deg.=22.5]×100

When the cellulose component is type II cellulose crystals (derived from regenerated cellulose), the degree of crystallinity is determined by the following formula, from the absolute peak intensity h0 at 2θ=12.6° attributed to the (110) plane peak of the type II cellulose crystal, and the peak intensity h1 from the baseline for the plane spacing, in wide-angle X-ray diffraction.

Degree of crystallinity (%)=$h1/h0 \times 100$

The known crystalline forms of cellulose include type I, type II, type III and type IV, among which type I and type II are most particularly in common use, whereas type III and type IV are not commonly used on an industrial scale, although they have been obtained on a laboratory scale. The cellulose component is preferably a cellulose component containing type I cellulose crystals and type II cellulose crystals, for relatively high mobility in terms of structure and to obtain a resin composite with a lower linear expansion coefficient and more excellent strength and elongation when subjected to stretching or bending deformation, by dispersion of the cellulose component in the resin, and more preferably the cellulose component contains type I cellulose crystals with a degree of crystallinity of 55% or greater.

The degree of polymerization of the cellulose whiskers is preferably 100 or greater, more preferably 120 or greater, even more preferably 130 or greater, yet more preferably 140 or greater and most preferably 150 or greater, and preferably no greater than 300, more preferably no greater than 280, even more preferably no greater than 270, yet more preferably no greater than 260 and most more preferably no greater than 250.

The degree of polymerization of the cellulose fibers is preferably 400 or greater, more preferably 420 or greater, even more preferably 430 or greater, yet more preferably 440 or greater, and most preferably 450 or greater, and preferably no greater than 3500, more preferably no greater than 3300, even more preferably no greater than 3200, yet more preferably no greater than 3100 and most preferably no greater than 3000.

The degrees of polymerization of the cellulose whiskers and cellulose fibers are preferably within the ranges specified above from the viewpoint of workability and mechanical properties. The degrees of polymerization are preferably not too high from the viewpoint of workability, and they are preferably not too low from the viewpoint of exhibiting mechanical properties.

The degrees of polymerization of the cellulose whiskers and cellulose fibers are each the mean polymerization degree measured by a reduced relative viscosity method using a copper-ethylenediamine solution, as described in Verification Test (3) of "Japanese Pharmacopeia, 15th Edition Reference Manual (Hirokawa Shoten)".

The method of controlling the degree of polymerization (i.e. mean polymerization degree) of the cellulose component of the cellulose may be hydrolysis or the like. Hydrolysis promotes depolymerization of amorphous cellulose inside the cellulose fiber material and lowers the mean polymerization degree. Simultaneously, hydrolysis also results in removal of impurities such as hemicellulose and lignin in addition to the aforementioned amorphous cellulose, so that the interior of the fiber material becomes porous. Thus, in steps in which mechanical shear force is applied to the cellulose component and organic component (for example, the surfactant), such as during the kneading step and other steps described below, the cellulose component is more readily subjected to mechanical processing and the cellulose component is more easily micronized. As a result, the surface area of the cellulose component is increased and compositing with the organic component (for example, the surfactant) becomes easier to control.

The method of hydrolysis is not particularly restricted and may be acid hydrolysis, alkali hydrolysis, hot water decomposition, steam explosion, microwave decomposition or the like. Such methods may be used alone or in combinations of two or more. In a method of acid hydrolysis, for example, the cellulose starting material is α-cellulose obtained as pulp from a fibrous plant, which is dispersed in an aqueous medium, and then a suitable amount of a proton acid, carboxylic acid, Lewis acid, heteropolyacid or the like is added to the dispersion, and the mixture is heated while stirring, thereby allowing easy control of the mean polymerization degree. The reaction conditions such as temperature, pressure and time will differ depending on the type of cellulose, the cellulose concentration, the acid type and the acid concentration, and they are appropriately adjusted so as to obtain the desired mean polymerization degree. For example, a water-soluble mineral acid solution at up to 2 mass % may be used for treatment of cellulose for 10 minutes or longer under conditions of 100° C. or higher under pressure. Under such conditions, the catalyst component, such as an acid, penetrates to the cellulose fiber interiors and hydrolysis is promoted, allowing a lower amount of catalyst component usage and easier subsequent refining. During hydrolysis, the dispersion of the cellulose material may contain, in addition to water, also a small amount of an organic solvent in a range that does not interfere with the effect of the invention.

The zeta potential of the cellulose component, or the respective zeta potentials of the cellulose whiskers and cellulose fibers, are preferably no greater than −40 mV. If the zeta potential is within this range, when the cellulose component and resin are compounded there will be no excessive bonding between the cellulose component and the resin, and a satisfactory melt flow property can be maintained. The zeta potential is more preferably no greater than −30 mV, even more preferably no greater than −25 mV, yet more preferably no greater than −20 mV and most preferably no greater than −15 mV. Since a smaller value is associated with more excellent physical properties of the compound there is no particular restriction on the lower limit, but it is preferably −5 mV or greater from the viewpoint of easier production.

The zeta potential referred to here can be measured by the following method. The cellulose component, or each of the cellulose whiskers and cellulose fibers, is prepared in a 1 mass % concentration purified water suspension, a high-shear homogenizer (for example, an "Excel Autohomogenizer ED-7", trade name of Nippon Seiki Co., Ltd.) is used for dispersion under treatment conditions of rotational speed: 15,000 rpm×5 minutes, the obtained aqueous dispersion is diluted with purified water to 0.1 to 0.5 mass %, and a zeta potentiometer (for example, a Model ELSZ-2000ZS by Otsuka Electronics Co., Ltd., standard cell unit) is used for measurement at 25° C.

The amount of the cellulose component is in the range of 0.1 to 100 parts by mass with respect to 100 parts by mass of the thermoplastic resin. The lower limit for the amount of the cellulose component is preferably 0.5 part by mass, more preferably 1 part by mass and most preferably 2 parts by mass. The upper limit for the amount of the cellulose component is preferably 80 parts by mass, more preferably 70 parts by mass and most preferably 60 parts by mass.

The amount of the cellulose component is preferably within this range from the viewpoint of balance between workability and mechanical properties.

The proportion of cellulose whiskers is preferably 50 mass % or greater with respect to the total mass of the cellulose component. The proportion is more preferably greater than 50 mass %, even more preferably 60 mass % or greater, even yet more preferably 70 mass % or greater and most preferably 80 mass % or greater. The upper limit for the proportion is preferably 98 mass %, more preferably 96 mass % and most preferably 95 mass %.

The proportion of cellulose whiskers of the total mass of the cellulose component is preferably within this range from the viewpoint of flow property as a resin composition.

<Organic Component>

The resin composition may include an organic component as an additional component. According to one aspect, the organic component has a dynamic surface tension of no greater than 60 mN/m. Also according to one aspect, the organic component is a surfactant. The organic component contributes to improved dispersibility of the cellulose component in the thermoplastic resin. The preferred amount of the organic component is an amount in the range of no greater than 50 parts by mass with respect to 100 parts by mass of the cellulose component. The more preferred upper limit is 45 parts by mass, more preferably 40 parts by mass, even more preferably 35 parts by mass and most preferably 30 parts by mass. There is no particular lower limit since it is an additional component, but the handleability can be increased by addition at 0.1 part by mass or greater with respect to 100 parts by mass of the cellulose component. The lower limit is more preferably 0.5 part by mass and most preferably 1 part by mass.

Typical organic components include those having carbon atoms as the basic backbone, and with a functional group comprising elements selected from among carbon, hydrogen, oxygen, nitrogen, chlorine, sulfur and phosphorus. As long as the aforementioned structure is in the molecule, inorganic compounds chemically bonded with the aforementioned functional groups are also suitable.

The organic component may be a single one used alone, or a mixture of two or more organic components. In the case of a mixture, the characteristic values of the organic component of the present disclosure (for example, static surface tension, dynamic surface tension and SP value) are the values for the mixture.

<Static Surface Tension of Organic Component>

The static surface tension of the organic component is preferably 20 mN/m or greater. The static surface tension is the surface tension measured by the Wilhelmy method. When a liquid organic component is to be used at room temperature, the value measured at 25° C. is used.

When an organic component that is solid or semi-solid at room temperature is to be used, the organic component is heated to the melting point or higher and measurement is performed in the molten state, using the value corrected for a temperature of 25° C. According to the present disclosure, "room temperature" means 25° C. For the purpose of facilitating addition, the organic component may be dissolved or diluted with an organic solvent or water. The static surface tension, in such cases, is the static surface tension of the organic component itself.

When preparing the resin composition, there are no particular restrictions on the method of adding the organic component, and it may be a method of premixing the thermoplastic resin, cellulose component and organic component and melt kneading the mixture, a method of first adding the organic component to the resin, with preliminary kneading if necessary, and then adding the cellulose component and melt kneading the mixture, or a method of premixing the cellulose component and the organic component and then melt kneading the mixture with the thermoplastic resin. Also effective is a method of adding the organic component to a dispersion in which the cellulose component is dispersed in water, drying the mixture to prepare a cellulose formulation, and then adding the formulation to the thermoplastic resin.

If the static surface tension of the organic component is within the range specified by the present disclosure, a normally unexpected effect is exhibited, whereby the dispersibility of the cellulose component in the resin is surprisingly improved. While the reason for this is not certain, presumably the hydrophilic functional groups in the organic component undergo hydrogen bonding with the hydroxyl groups on the cellulose component surfaces, thereby covering the cellulose component surfaces and inhibiting formation of interfaces with the resin. Positioning of the hydrophilic groups on the cellulose component side creates a hydrophobic atmosphere on the resin side, thus presumably increasing affinity with the resin side.

The preferred lower limit for the static surface tension of the organic component is 23 mN/m, more preferably 25 mN/m, even more preferably 30 mN/m, yet more preferably 35 mN/m and most preferably 39 mN/m. The preferred upper limit for the static surface tension of the organic component is 72.8 mN/m, more preferably 60 mN/m, even more preferably 50 mN/m and most preferably 45 mN/m.

The static surface tension of the organic component is preferably within the range specified above, from the viewpoint of both affinity of the organic component with the thermoplastic resin and affinity with the cellulose component, and of exhibiting properties of improved microdispersibility of the cellulose component in the resin, improved flow property of the resin composition, and improved strength and elongation of the molded resin.

The static surface tension of the organic component of the present disclosure can be measured using a commercially available surface tension measuring apparatus. As a specific example, measurement may be carried out by the Wilhelmy method using an automatic surface tension measuring apparatus (for example, a "Model CBVP-Z", trade name of Kyowa Interface Science Co., Ltd., with use of accessory glass cell). During this time, when the organic component is a liquid at room temperature, it is charged in to a height of 7 mm to 9 mm from the bottom of the accessory stainless steel dish to the liquid level, and after adjusting the temperature to 25° C.±1° C., measurement is performed and calculation is by the following formula.

$$\gamma = (P - mg + sh\rho g)/L \cos\theta$$

Here, $\gamma$: static surface tension, P: balancing force, m: plate mass, g: gravitational constant, L: plate circumferential length, $\theta$: contact angle between plate and liquid, s: plate cross-sectional area, h: sunken depth from liquid level (until forces balanced), $\rho$: liquid density.

Since a solid at room temperature cannot have its surface tension measured by this method, the surface tension measured at a temperature of melting point+5° C. is used for convenience. For an unknown substance, the melting point can be measured by first measuring the melting point by a visual melting point measuring method (JIS K6220), heating to the melting point or above to cause melting, and then adjusting the temperature to the melting point+5° C. and measuring the surface tension by the aforementioned Wilhelmy method.

<Dynamic Surface Tension of Organic Component>

The dynamic surface tension of the organic component is preferably no greater than 60 mN/m. A more preferred upper limit for the dynamic surface tension is 55 mN/m, more preferably 50 mN/m, even more preferably 45 mN/m and most preferably 40 mN/m. A preferred lower limit for the dynamic surface tension of the organic component is 10 mN/m. A more preferred lower limit is 15 mN/m, with 20 mN/m being most preferred.

The dynamic surface tension referred to here is the surface tension measured by the maximum bubble pressure method (a method of running air through a tubule ("probe") inserted into a liquid to generate air bubbles, measuring the maximum pressure (maximum bubble pressure) when air bubbles are generated, and calculating the surface tension). Specifically, the dynamic surface tension of the invention is the value of the surface tension measured by preparing a measuring solution of the organic component dissolved or dispersed in ion-exchanged water to 5 mass %, adjusting the temperature to 25° C., and then using a dynamic surface tension meter (for example, a Theta Science Model t-60, product name of Eko Instruments, probe (capillary TYPE I (made of PEEK resin), single mode)), for measurement with an air bubble generation cycle of 10 Hz. The dynamic surface tension at each cycle is calculated by the following formula.

$$\sigma = \Delta P \cdot r/2$$

Here, σ: dynamic surface tension, ΔP: differential pressure (maximum pressure−minimum pressure), r: capillary radius.

The dynamic surface tension measured by the maximum bubble pressure method is the dynamic surface tension of the organic component at its location of fastest movement. An organic component usually forms micelles in water. A low dynamic surface tension indicates a rapid diffusion rate of the organic component molecules from the micelle state, while a high dynamic surface tension indicates a slow diffusion rate of the molecules.

A dynamic surface tension of the organic component that is below the specified value is advantageous from the viewpoint of exhibiting an effect of markedly improving dispersion of the cellulose component in the resin composition. While the reason for the improved dispersibility is not understood in complete detail, presumably an organic component with low dynamic surface tension, having excellent diffusibility in the extruder, contributes to the effect of improving dispersibility by allowing localization of the cellulose component and the resin at the interface and also allowing the cellulose component surfaces to be satisfactorily covered. The effect of improving dispersibility of the obtained cellulose component, when the dynamic surface tension of the organic component is below the specified value, produces a notable effect of eliminating strength defects in the molded article.

<Boiling Point of Organic Component>

The organic component is preferably one having a higher boiling point than water. Having a higher boiling point than water means having a boiling point that is higher than the boiling point of water at each pressure on a vapor pressure curve (for example, 100° C. at 1 atmosphere).

By selecting an organic component that has a higher boiling point than water, during the step in which the cellulose component that is dispersed in water is dried in the presence of the organic component to obtain the cellulose formulation, for example, the water and organic component will become exchanged during the process of water evaporation so that the organic component will be present on the cellulose component surfaces, allowing an effect to be exhibited whereby aggregation between the cellulose is greatly minimized.

From the viewpoint of handleability, the organic component that is used is preferably a liquid at room temperature (i.e. 25° C.). An organic component that is a liquid at ordinary temperature is advantageous in that it is more miscible with the cellulose component and more easily permeates the resin as well.

<Solubility Parameter (SP Value) of Organic Component>

The organic component that is used is more preferably one with having a solubility parameter (SP value) of 7.25 or greater. If the organic component has an SP value in this range, the dispersibility of the cellulose component in the resin will be higher.

According to a publication by Foders (R. F. Foders: Polymer Engineering & Science, vol. 12(10), p. 2359-23'70 (19'74)), the SP value depends on both the cohesive energy density and the molar molecular weight of the substance, which in turn are believed to depend on the type and number of substituents of the substance, and SP values $(cal/cm^3)^{1/2}$ for the major existing solvents used in the examples described below have been publicly disclosed, as published by Ueda et al. (Toryo no Kenkyu, No. 152, October 2010).

The SP value of the organic component can be experimentally determined from the soluble/insoluble boundary obtained when the organic component has been dissolved in different solvents with known SP values. For example, it can be judged based on whether or not total dissolution takes place when 1 mL of the organic component has been dissolved for a period of 1 hour at room temperature while stirring with a stirrer, in various solvents (10 mL) having different SP values shown in the tables indicated in the Examples. For example, when the organic component is soluble in diethyl ether, the SP value of the organic component is 7.25 or greater.

<Type of Organic Component>

According to one aspect, the organic component is a surfactant. Surfactants include compounds having a chemical structure in which a hydrophilic substituent and a hydrophobic substituent are covalently bonded, and any ones utilized for a variety of purposes including consumption and industrial use may be used. For example, the following may be used, either alone or in combinations of two or more. According to a particularly preferred aspect, the organic component is a surfactant having the dynamic surface tension specified above.

A surfactant used may be any anionic surfactant, nonionic surfactant, amphoteric ionic surfactant or cationic surfactant, but from the viewpoint of affinity with the cellulose component, an anionic surfactant or nonionic surfactant is preferred, and a nonionic surfactant is more preferred.

Anionic surfactants include fatty acid-based (anionic) ones such as sodium fatty acid salts, potassium fatty acid salts and sodium alpha-sulfo fatty acid esters, straight-chain alkylbenzene-based ones include straight-chain sodium alkylbenzenesulfonates, higher alcohol-based (anionic) ones include sodium alkylsulfuric acid esters and sodium alkyl-ether sulfuric acid esters, alpha-olefin-based ones include alpha-sodium olefinsulfonates and normal paraffinic ones include sodium alkylsulfonates, any of which may be used either alone or in combinations of two or more.

Nonionic surfactants include fatty acid-based (nonionic) ones such as glycolipids including sucrose fatty acid esters, sorbitan fatty acid esters and polyoxyethylenesorbitan fatty acid esters, and fatty acid alkanolamides, higher alcohol-based (nonionic) ones such as polyoxyethylenealkyl ethers, and alkylphenol-based ones such as polyoxyethylenealkylphenyl ethers, any of which may be used either alone or in combinations of two or more.

Amphoteric ionic surfactants include amino acid-based ones such as alkylamino fatty acid sodium salts, betaine-based ones such as alkyl betaines, and amine oxide-based ones such as alkylamine oxides, any of which may be used either alone or in combinations of two or more.

Cationic surfactants include quaternary ammonium salt-based ones such as alkyltrimethylammonium salts and dialkyldimethylammonium salts, any of which may be used either alone or in combinations of two or more.

The surfactant may be a fat or oil derivative. The fat or oil may be an ester of a fatty acid and glycerin, and this normally refers to one in the form of a triglyceride (tri-O-acylglycerin). Fatty oils are categorized as drying oils, semidrying oils or non-drying oils, in order of their tendency to be oxidized and harden, and any ones utilized for a variety of purposes including consumption and industrial use may be used, such as one or more of the following, for example.

Examples of animal or vegetable oils, as fats or oils, include terpene oil, tall oil, rosin, refined oil, corn oil, soybean oil, sesame oil, rapeseed oil (canola oil), rice bran oil, rice bran oil, *camellia* oil, safflower oil (safflower oil), coconut oil (palm kernel oil), cottonseed oil, sunflower oil, *perilla* oil (*perilla* oil), linseed oil, olive oil, peanut oil, almond oil, avocado oil, hazelnut oil, walnut oil, grapeseed oil, mustard oil, lettuce oil, fish oil, whale oil, shark oil, liver oil, cacao butter, peanut butter, palm oil, lard (pig fat), tallow (beef tallow), chicken fat, rabbit fat, mutton tallow, horse fat, schmaltz, milk fat (butter, ghee and the like), hydrogenated oils (margarine, shortening and the like), castor oil (vegetable oil), and the like.

Particularly preferred among these animal or vegetable oils are terpene oils, tall oils and rosins, from the viewpoint of affinity with the cellulose component surfaces and homogeneous coatability.

Terpene oil is an essential oil obtained by steam distillation of chips from trees of the pine family, or pine rosin obtained from such trees, and it is also referred to as pine essential oil or turpentine. Examples of terpene oils include gum turpentine oil (obtained by steam distillation of pine rosin), wood turpentine oil (obtained by steam distillation or dry distillation of chips from trees of the pine family), sulfate turpentine oils (obtained by distillation during heat treatment of chips during sulfate pulp production) and sulfite turpentine oils (obtained by distillation during heat treatment of chips during sulfite pulp production), and these are essentially colorless to pale yellow liquids, with α-pinene and β-pinene as major components in addition to sulfite turpentine oil. Sulfite turpentine oil, unlike other turpentine oils, is composed mainly of p-cymene. So long as it has the aforementioned component, any derivative included in terpene oil, either alone or as a mixture of more than one, may be used as the surfactant.

Tall oil is an oil composed mainly of resin and fatty acids, obtained as a by-product in the manufacture of Kraft pulp using pine wood as the starting material. The tall oil used may be tall fat composed mainly of oleic acid and linolic acid, or it may be tall rosin composed mainly of a C20 diterpenoid compound such as abietic acid.

A rosin is a natural resin composed mainly of a rosinic acid (abietic acid, palustric acid, isopimaric acid or the like), as the residue remaining after collecting balsams such as pine rosin as sap from plants of the pine family and distilling off the turpentine essential oil. It is also known as colophony or colophonium. Among these, tall rosin, wood rosin and gum rosin are preferred for use. Rosin derivatives that have been obtained by stabilizing treatment, esterification treatment or purifying treatment of these rosins may be used as surfactants. Stabilizing treatment is hydrogenation, disproportionation, dehydrogenation or polymerization of the rosins. Esterification treatment is reaction of the rosins, or the rosins after stabilizing treatment, with alcohols to form rosin esters. Various known alcohols or epoxy compounds may be used for production of the rosin esters. Examples of alcohols include monohydric alcohols such as n-octyl alcohol, 2-ethylhexyl alcohol, decyl alcohol and lauryl alcohol; dihydric alcohols such as ethylene glycol, diethylene glycol, triethylene glycol, propylene glycol and neopentyl glycol; trihydric alcohols such as glycerin, trimethylolethane, trimethylolpropane and cyclohexanedimethanol; and tetrahydric alcohols such as pentaerythritol and diglycerin. There may also be used polyhydric alcohols such as isopentyldiol, ethylhexanediol, erythrulose, ozonized glycerin, caprylyl glycol, glycol, (C15-18)glycol, (C20-30)glycol, glycerin, diethylene glycol, diglycerin, dithiaoctanediol, DPG, thioglycerin, 1,10-decanediol, decylene glycol, triethylene glycol, trimethylhydroxymethylcyclohexanol, phytantriol, phenoxypropanediol, 1,2-butanediol, 2,3-butanediol, butylethylpropanediol, BG, PG, 1,2-hexanediol, hexylene glycol, pentylene glycol, methylpropanediol, menthanediol and lauryl glycol. Polyhydric alcohols also include those classified as sugar alcohols, such as inositol, erythritol, xylitol, sorbitol, maltitol, mannitol and lactitol.

Alcoholic water-soluble polymers may be used as alcohols as well. Alcoholic water-soluble polymers include polysaccharides and mucopolysaccharides, those classified as starches, those classified as polysaccharide derivatives, those classified as natural resins, those classified as cellulose and its derivatives, those classified as proteins and peptides, those classified as peptide derivatives, those classified as synthetic homopolymers, those classified as acrylic (meth)acrylic) acid copolymers, those classified as urethane-based polymers, those classified as laminates, those classified as cationization polymers and those classified as other synthetic polymers, and polymers that are water-soluble at ordinary temperature may also be used. More specifically, they include cationic polymers such as sodium polyacrylate, cellulose ether, calcium alginate, carboxyvinyl polymers, ethylene/acrylic acid copolymers, vinylpyrrolidone-based polymers, vinyl alcohol/vinylpyrrolidone copolymers, nitrogen-substituted acrylamide-based polymers, polyacrylamide and cationized guar gum, dimethylacrylammonium-based polymers, acrylic (methacrylic) acid-acrylic copolymers, POE/POP copolymers, polyvinyl alcohol, pullulan, agar, gelatin, tamarind seed polysaccharides, xanthan gum, carrageenan, high-methoxyl pectin, low-methoxyl pectin, guar gum, gum arabic, cellulose whiskers, arabinogalactan, karaya gum, tragacanth gum, alginic acid, albumin, casein, curdlan, gellan gum, dextran, cellulose (other than the cellulose fibers and cellulose whiskers of the present disclosure), polyethyleneimine, polyethylene glycol and cationized silicone polymers.

Among the different rosin esters mentioned above, esterified rosins and water-soluble polymers are preferred, and rosin and polyethylene glycol ester compounds (also known as rosin-ethylene oxide addition products, polyoxyethylene glycol resin acid esters or polyoxyethylene rosinic acid esters) are particularly preferred as they tend to further promote the coating property onto the cellulose component surfaces and the dispersibility of the cellulose formulation in the resin.

Examples of hydrogenated castor oil-type surfactants include compounds having hydrogenated hydrophobic groups, and having in the structure hydroxyl groups covalently bonded with hydrophilic groups such as PEO chains, which are obtained using castor oil as a type of vegetable oil obtained from seeds of castor beans of *Euphorbia helioscopia* as the starting material. The components of castor oil are glycerides of unsaturated fatty acids (87% ricinolic acid, 7% oleic acid and 3% linolic acid), and small amounts of saturated fatty acids (3% palmitic acid, stearic acid and the like). Typical POE group structures include those with ethylene oxide (EO) residues of 4 to 40, and typically 15 to 30. The number of EO residues of nonylphenol ethoxylate is preferably 15 to 30, more preferably 15 to 25 and most preferably 15 to 20.

Examples of mineral oil derivatives include greases such as calcium soap-based grease, calcium composite soap-based grease, sodium soap-based grease, aluminum soap-based grease and lithium soap-based grease.

The surfactant may be an alkylphenyl-type compound, examples of which include alkylphenol ethoxylates, i.e. compounds obtained by ethoxylation of alkylphenols with ethylene oxide. Alkylphenol ethoxylates are nonionic surfactants. They are also referred to as poly(oxyethylene) alkylphenyl ethers, because they have hydrophilic polyoxyethylene (POE) chains linked with hydrophobic alkylphenol groups by ether bonds. Mixtures of multiple compounds with different alkyl chain lengths and POE chain lengths exist as product series with different average chain lengths that are generally available on the market. Alkyl chain lengths of 6 to 12 carbon atoms (excluding phenyl groups) are commercially available, and the structures of the typical alkyl groups include nonylphenol ethoxylate and octylphenol ethoxylate. Typical POE group structures include those with 5 to 40, and typically 15 to 30 ethylene oxide (EO) residues. The number of EO residues of nonylphenol ethoxylate is preferably 15 to 30, more preferably 15 to 25 and most preferably 15 to 20.

The surfactant may be a β-naphthyl-type compound, examples of which include β-monosubstituted compounds including naphthalene in part of the chemical structure and having the carbon at the 2-, 3-, 6- or 7-position of the aromatic ring covalently bonded with a hydroxyl group, and compounds with covalent bonding of hydrophilic groups such as PEO chains. Typical POE group structures include those with 4 to 40, and typically 15 to 30 ethylene oxide (EO) residues. The number of EO residues is preferably 15 to 30, more preferably 15 to 25 and most preferably 15 to 20.

The surfactant may be a bisphenol A-type compound, examples of which include compounds having bisphenol A (chemical formula: $(CH_3)_2C(C_6H_4OH)_2$) in the chemical structure, with the two phenol groups in the structure covalently bonded with hydrophilic groups such as PEO chains. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

The surfactant may be a styrenated phenyl-type compound, examples of which include compounds having a styrenated phenyl group in the chemical structure, with the phenol group in the structure covalently bonded with hydrophilic groups such as PEO chains. A styrenated phenyl group has a structure with 1 to 3 styrene molecules added to the benzene ring of a phenol residue. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

<Specific Preferred Examples of Surfactants>

Specific preferred examples of surfactants include anionic surfactants including acylamino acid salts such as acylglutamic acid salts, higher alkylsulfuric acid ester salts such as sodium laurate, sodium palmitate, sodium lauryl sulfate and potassium lauryl sulfate, alkyl ether sulfuric acid ester salts such as polyoxyethylenetriethanolamine lauryl sulfate and polyoxyethylene sodium lauryl sulfate, and N-acylsarcosinic acid salts such as lauroylsarcosine sodium, cationic surfactants including alkyltrimethylammonium salts such as stearyltrimethylammonium chloride and lauryltrimethylammonium chloride, alkylpyridinium salts such as distearyldimethylammonium chloride dialkyldimethylammonium salt, (N,N'-dimethyl-3,5-methylenepiperidinium) chloride and cetylpyridinium chloride, alkylamine salts such as alkyl quaternary ammonium salts and polyoxyethylenealkylamines, polyamine fatty acid derivatives and amyl alcohol fatty acid derivatives; and nonionic surfactants including amphoteric surfactants, among which are imidazoline-based amphoteric surfactants such as 2-undecyl-N,N,N-(hydroxyethylcarboxymethyl) 2-imidazoline sodium and 2-cocoyl-2-imidazolinium hydroxide-1-carboxyethyloxy disodium salt and betaine-based amphoteric surfactants such as 2-heptadecyl-N-carboxymethyl-N-hydroxyethyl imidazolinium betaine, lauryldimethylaminobetaine acetate, alkylbetaines, amidebetaine and sulfobetaine, sorbitan fatty acid esters such as sorbitan monooleate, sorbitan monoisostearate, sorbitan monolaurate, sorbitan monopalmitate, sorbitan monostearate, sorbitan sesquioleate, sorbitan trioleate, diglycerolsorbitan penta-2-ethylhexanoate and diglycerolsorbitan tetra-2-ethylhexanoate, glycerin-polyglycerin fatty acids such as glycerin monostearate, glycerin pyroglutamate α,α'-oleate and glycerin malate monostearate, propyleneglycol fatty acid esters such as propyleneglycol monostearate, hydrogenated castor oil derivatives, glycerin alkyl ethers, polyoxyethylene-sorbitan fatty acid esters such as polyoxyethylene-sorbitan monostearate, polyoxyethylene-sorbitan monooleate and polyoxyethylene-sorbitan tetraoleate, polyoxyethylene-glycerin fatty acid esters such as polyoxyethylene-sorbitol monolaurate, polyoxyethylene-sorbitol monooleate, polyoxyethylene-sorbitol pentaoleate, polyoxyethylene-sorbitol monostearate, polyoxyethylene-glycerin monoisostearate and polyoxyethylene-glycerin triisostearate, polyoxyethylene fatty acid esters such as polyoxyethylene monooleate, polyoxyethylene distearate, polyoxyethylene monodioleate and ethyleneglycol distearate, and polyoxyethylene castor oil hydrogenated castor oil derivatives such as polyoxyethylene hydrogenated castor oil, polyoxyethylene castor oil, polyoxyethylene hydrogenated castor oil monoisostearate, polyoxyethylene hydrogenated castor oil triisostearate, polyoxyethylene hydrogenated castor oil monopyroglutamic acid monoisostearic acid diester and polyoxyethylene hydrogenated castor oil maleate.

Among the above, from the viewpoint of affinity with the cellulose component, surfactants having polyoxyethylene chains, carboxylic acid groups or hydroxyl groups as hydrophilic groups are preferred, polyoxyethylene-based surfactants with polyoxyethylene chains as hydrophilic groups (polyoxyethylene derivatives) are more preferred, and nonionic polyoxyethylene derivatives are even more preferred. The polyoxyethylene chain length of a polyoxyethylene derivative is preferably 3 or greater, more preferably 5 or greater, even more preferably 10 or greater and most preferably 15 or greater. A longer chain length will increase the affinity with the cellulose component, but for balance with the coating property (localization of the resin and cellulose component at the interface), the upper limit is preferably no greater than 60, more preferably no greater than 50, even more preferably no greater than 40, especially preferably no greater than 30 and most preferably no greater than 20.

When the cellulose component is to be added to a hydrophobic resin (for example, a polyolefin or polyphenylene ether), it is preferred to use one having a polyoxypropylene chain instead of a polyoxyethylene chain as the hydrophilic group. The polyoxypropylene chain length is preferably 3 or greater, more preferably 5 or greater, even more preferably 10 or greater and most preferably 15 or greater. A longer chain length will increase the affinity with the cellulose component, but for balance with the coating property, the upper limit is preferably no greater than 60, more preferably no greater than 50, even more preferably no greater than 40, especially preferably no greater than 30 and most preferably no greater than 20.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater. When the resin is a polyolefin, the upper limit is not established since a greater number of carbon atoms will increase affinity with the resin, but it is preferably 30 and more preferably 25.

Among these hydrophobic groups there are preferred those having a cyclic structure, or having a bulky polyfunctional structure, those with a cyclic structure including alkylphenyl ether-type, rosin ester-type, bisphenol A-type, β-naphthyl-type and styrenated phenyl-type groups, and especially those with a polyfunctional structure including hydrogenated castor oil-type groups. Most preferred among these are rosin ester types and hydrogenated castor oil types.

Therefore, according to a particularly preferred aspect, the surfactant is one or more selected from the group consisting of rosin derivatives, alkylphenyl derivatives, bisphenol A derivatives, β-naphthyl derivatives, styrenated phenyl derivatives and hydrogenated castor oil derivatives.

Organic components other than surfactants may be compounds that are one or more selected from the group consisting of fats or oils, fatty acids and mineral oils, and that are not included among the surfactants mentioned above. Fats or oils may be the fats or oils mentioned as examples for the surfactant.

A fatty acid is a compound represented by the general formula $C_nH_mCOOH$ (where n and m are integers), and those utilized for various purposes including consumption and industrial use may be used. For example, the following may be used, either alone or in combinations of two or more.

Examples of saturated fatty acids include formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid and lignoceric acid, and examples of unsaturated fatty acids include ω-3 fatty acids such as α-linolenic acid, stearidonic acid, eicosapentaenoic acid, docosapentaenoic acid and docosahexaenoic acid; ω-6 fatty acids such as linolic acid, γ-linolenic acid, dihomo-γ-linolenic acid, arachidonic acid and docosapentaenoic acid; ω-7 fatty acids such as palmitoleic acid, vaccenic acid and paullinic acid; and ω-9 fatty acids such as oleic acid, elaidic acid, erucic acid and nervonic acid.

Mineral oils include greases such as liquid paraffin, silicon oil and calcium soap-based grease, naphthene-based and paraffin-based mineral oils; partial synthetic oils obtained by mixing PAO or esters (or hydrotreated oils) with mineral oils or higher hydrotreated oils; chemical synthetic oils, totally synthetic oils and synthetic oils such as PAO (poly α-olefins).

The amount of organic component is preferably no greater than 50 parts by mass, more preferably no greater than 45 parts by mass, even more preferably no greater than 40 parts by mass, yet more preferably no greater than 35 parts by mass and most preferably no greater than 30 parts by mass, with respect to 100 parts by mass of the cellulose component. There is no particular lower limit since it is an additional component, but the handleability can be increased by addition to a total amount of 0.1 part by mass or greater with respect to 100 parts by mass of the cellulose component. The total amount is more preferably 0.5 part by mass or greater and most preferably 1 part by mass or greater.

<Resin Composition Properties>
<Coefficient of Variation (CV) of Tensile Break Strength>

The coefficient of variation CV of the tensile break strength of the resin composition is preferably no greater than 10%, from the viewpoint of eliminating strength defects in the obtained molded article. The coefficient of variation referred to here is the value obtained by dividing the standard deviation (σ) by the arithmetic mean (μ) and multiplying by 100 to express a percentage, and it is a unitless value indicating relative variation.

$$CV = (\sigma/\mu) \times 100$$

The symbols μ and σ are given by the following formulas.

$$\mu = \frac{1}{n}\sum_{i=1}^{n} x_i \qquad \text{[Mathematical Formula 1]}$$

$$\sigma^2 = \frac{1}{n}\sum_{i=1}^{n}(x_i - \mu)^2$$

In the formulas, $x_i$ represents individual data for tensile break strength, from n number of data values: $x_1, x_2, x_3 \ldots x_n$.

The number of samples (n) for calculation of the coefficient of variation CV of the tensile break strength is preferably 10 or greater, in order to allow defects to be more easily found. The number is even more preferably 15 or greater.

A more preferred upper limit for the coefficient of variation is 9%, more preferably 8%, even more preferably 7%, yet more preferably 6% and most preferably 5%. The lower limit is desirably zero, but preferably 0.1% from the viewpoint of facilitating production.

The resin composition includes cellulose whiskers and cellulose fibers as cellulose components. By using such a combination of two or more different types of specific celluloses, it will be possible for the cellulose component to be present in the resin composition with a higher degree of dispersion and at a higher concentration than in the prior art. This will help eliminate the partial strength defects seen in conventional resin molded articles composed of cellulose compositions, to provide an epochal effect for vastly improving the reliability of actual products.

Partial strength defects in conventional resin molded articles are believed to be caused by formation of gaps (voids) due to uneven dispersion of cellulose and entangling of large L/D cellulose fibers, for example. One index for evaluating the tendency to form strength defects is a method of carrying out a tensile test with multiple test pieces, and confirming the presence and number of variations in the breaking strength.

For example, if voids are present in molded articles for structural parts such as automobile bodies, door panels or bumpers, due to sections with non-uniformly dispersed cellulose or entangling of large L/D cellulose fibers, then stress becomes concentrated at the non-uniform sections or voids when large stress is instantaneously applied to the molded article, or when the stress is small but repetitive, such as during vibration. This leads to a situation in which the molded article can break due to the concentration of stress. This lowers the reliability of the article as a product.

It has been very difficult in the prior art to predict structural defects in actual products at the testing stage, and for example, methods have been used that verify the dispersibility of cellulose fibers in products using microscopes or the like. With microscope observation, however, since the observation is on the microscopic level, it has not been possible to comprehensively evaluate test pieces as a whole, or the product as a whole.

In the course of pursuing research in this regard, the present inventors have found a correlation between the coefficient of variation of the tensile break strength, and the proportion of structural defects in products.

More specifically, if the material has a homogeneous internal structure and no voids, then even when multiple samples have been subjected to tension rupture testing, the stress that leads to rupture will be essentially the same across all of the multiple samples and the coefficient of variation will be very small. However, if the material has interior non-homogeneous sections and voids, then stress leading to rupture in a given sample will differ significantly from stress in other samples. The abundance of samples exhibiting stress differing from stress in other samples can be elucidated using the coefficient of variation as the standard.

As an example, in the case of a material without yield strength, samples having interior defects will undergo rupture at lower strength than other samples. In the case of a material with yield strength, rupture usually takes place after yielding and during necking, and therefore samples having interior defects exhibit a tendency to undergo rupture at higher strength than other samples. Nevertheless, despite such differences in behavior, using the coefficient of variation of the tensile break strength as the standard can predict the potential for strength defects in actual products.

The coefficient of variation of the tensile break strength is thought to be greatly affected by the dispersed state of the cellulose component in the composition. Various methods exist for obtaining a satisfactory dispersed state. Examples of different approaches include a method of optimizing the proportion of the cellulose fibers and cellulose whiskers, a method of optimizing the diameter and L/D of the cellulose component, a method of applying sufficient shear to the cellulose component by optimizing the screw position during melt kneading with an extruder or optimizing the resin viscosity by temperature control, a method of reinforcing the interface between the resin and the cellulose component by further addition of a suitable organic component (for example, a surfactant), and a method of forming some sort of chemical bonding between the resin and the cellulose. Any of these approaches may be employed to improve the dispersed state of the cellulose component. Limiting the coefficient of variation CV of the tensile break strength to no greater than 10% can significantly contribute to eliminating strength defects in obtained molded articles, to provide an effect of vastly improving the reliability of the molded article strength.

<Tensile Yield Strength>

With the resin composition according to one aspect of the invention, the tensile yield strength tends to be drastically improved compared to a thermoplastic resin alone. The ratio of the tensile yield strength of the resin composition, where the tensile yield strength of the thermoplastic resin alone containing no cellulose component is defined as 1.0, is preferably at least 1.1 times, more preferably at least 1.15 times, even more preferably at least 1.2 times and most preferably at least 1.3 times. The upper limit for this ratio is not particularly restricted, but from the viewpoint of easier production it is preferably 5.0 times and more preferably 4.0 times, for example.

<Linear Expansibility>

According to one aspect of the invention, the resin composition includes two or more types of cellulose as the cellulose component, and can therefore exhibit linear expansibility that is lower than conventional cellulosic compositions. Specifically, the linear expansion coefficient of the resin composition in a temperature range of 0° C. to 60° C. is preferably no greater than 50 ppm/K. A more preferred linear expansion coefficient for the composition is no greater than 45 ppm/K, more preferably no greater than 40 ppm/K and most preferably no greater than 35 ppm/K. The lower limit for the linear expansion coefficient is not particularly restricted, but from the viewpoint of easier production it is preferably 5 ppm/K and more preferably 10 ppm/K, for example.

According to one aspect of the invention, the resin composition has excellent dispersion uniformity of the cellulose in the composition, and therefore has the feature of low variation in linear expansion coefficient for large molded articles. Specifically, it exhibits the feature of very low variation in linear expansion coefficient, when measured using test pieces obtained from different sections of a large molded article.

When dispersion of the cellulose in the composition is non-homogeneous and the difference in linear expansion coefficient is large depending on the location, temperature changes tend to produce problems such as distortion or warping of the molded article. Moreover, such problems occur due to differences in thermal expansion, and constitute a failure mode that reversibly results from rising and falling temperature. This can result in a failure mode that entails latent risk which is impossible to discern when checked for under room temperature conditions.

The size of variation in the linear expansion coefficient can be expressed using the coefficient of variation of the linear expansion coefficients of measuring samples obtained from sections at different locations. The coefficient of variation referred to here is measured by the same method as explained above for the coefficient of variation of the tensile break strength.

The coefficient of variation of the linear expansion coefficient obtained from the resin composition is preferably no greater than 15%. A more preferred upper limit for the coefficient of variation is 13%, more preferably 11%, even more preferably 10%, yet more preferably 9% and most preferably 8%. The lower limit is desirably zero, but preferably 0.1% from the viewpoint of facilitating production.

The number of samples (n) for calculation of the coefficient of variation of the linear expansion coefficient is preferably at least 10 in order to reduce the effects of data error.

<Resin Composition Form>

The resin composition may be provided in a variety of different forms. Specifically, it may be in the form of resin pellets, sheets, fiber, plates or rods, with the form of resin pellets being more preferred for easier post-working and easier transport. The preferred form of pellets may be round, elliptical or cylindrical, depending on the system used for cutting during extrusion. Pellets cut by the method known as "underwater cutting" are usually round, pellets cut by the method known as "hot cutting" are usually round or elliptical, and pellets cut by the method known as "strand cutting" are usually cylindrical. The preferred size for round pellets is between 1 mm and 3 mm, inclusive, as the diameter of the pellets. The preferred diameter for cylindrical pellets is between 1 mm and 3 mm, inclusive, and the preferred length is between 2 mm and 10 mm, inclusive. The diameter and length are preferably above the specified lower limits from the viewpoint of operational stability during extrusion, and they are preferably lower than the specified upper limits from the viewpoint of seizing in the molding machine in post-working.

The resin composition may be utilized for various types of molded resins. There are no particular restrictions on the method of producing the molded resin, and any production method may be employed, such as injection molding, extrusion molding, blow molding, inflation molding or foam molding. Injection molding is most preferred among these from the viewpoint of design and cost.

<Method for Producing Resin Composition>

The method of producing the resin composition is not particularly restricted, and the following methods may be mentioned as concrete examples.

A method of melt kneading a mixture of the resin and cellulose component using a single-screw or twin-screw extruder, extruding it into strands and cooling them to solidification in a water bath to obtain molded article pellets, a method of melt kneading a mixture of the resin and cellulose component using a single-screw or twin-screw extruder and extruding and cooling it into the form of a rod or tube to obtain an extrusion molded article, a method of melt kneading a mixture of the resin and cellulose component using a single-screw or twin-screw extruder and extruding it with a T-die to obtain a molded sheet or film, and a method of melt kneading a mixture of the resin and cellulose component using a single-screw or twin-screw extruder, extruding it into strands and cooling them to solidification in a water bath to obtain molded article pellets.

Specific examples of methods for kneading a mixture of the resin and cellulose component include a method in which a mixed powder of the cellulose mixed with the resin in a prescribed proportion is mixed in the presence of or in the absence of an organic component (for example, a surfactant), and then subjected at once to melt kneading, a method in which the resin and if necessary an organic component are melt kneaded, and then a cellulose mixed powder that is mixed in the prescribed proportion and if necessary an organic component are added and the mixture is further melt kneaded, a method in which the resin, the cellulose mixed powder that is mixed in the prescribed proportion and water are mixed, with an organic component if necessary, and then subjected at once to melt kneading, and a method in which the resin and if necessary an organic component are melt kneaded, and then a cellulose mixed powder that is mixed in the prescribed proportion and water are added, together with an organic component if necessary, and the mixture is further melt kneaded.

The resin composition according to one aspect of the invention has high mechanical properties and low linear expansibility, and it not only has a high flow property making it suitable for large-sized parts, but can also yield molded articles that include essentially no partial strength defects, so that it can be satisfactorily used for various types of large-scale parts.

[Aspect B]

One aspect of the invention provides a resin composition comprising a thermoplastic resin and a cellulose component, wherein the coefficient of variation of the linear expansion coefficient and the coefficient of variation of the tensile break strength are limited to no greater than specific values.

Since the cellulose component is highly microdispersed in the resin composition, it is possible to yield a resin composition exhibiting excellent properties (mechanical properties and high flow properties), and a molded article formed from it. More specifically, by forming a higher network structure in the resin composition between the cellulose components, it is possible to highly minimize variation in the linear expansion coefficient, in particular, while also highly minimizing variation in the tensile break strength, in particular, with a relatively small amount of cellulose component in the resin composition.

<Coefficients of Variation of Linear Expansion Coefficient and Tensile Break Strength>

<Coefficient of Variation of Linear Expansion Coefficient>

For a resin composition according to one aspect of the invention, the coefficient of variation of the linear expansion coefficient of the resin composition is limited to no greater than 15%, from the viewpoint of eliminating dimensional instability defects, such as warping and deformation of the molded article obtained from the resin composition. The coefficient of variation referred to here is the value obtained by dividing the standard deviation ($\sigma$) by the arithmetic mean ($\mu$) and multiplying by 100 to express a percentage, and it is a unitless value indicating relative variation.

$$CV = (\sigma/\mu) \times 100$$

The symbols $\mu$ and $\sigma$ are given by the following formulas.

$$\mu = \frac{1}{n}\sum_{i=1}^{n} x_i \qquad \text{[Mathematical Formula 2]}$$

$$\sigma^2 = \frac{1}{n}\sum_{i=1}^{n} (x_i - \mu)^2$$

In the formula, $x_i$ represents individual data for linear expansion coefficient, from n number of data values: $x1, x2, x3 \ldots x_n$.

The number of samples (n) for calculation of the coefficient of variation CV of the linear expansion coefficient is preferably 10 or greater, in order to allow defects to be more easily found. The number is even more preferably 15 or greater.

A more preferred upper limit for the coefficient of variation is 14%, more preferably 13%, even more preferably 12%, yet more preferably 11% and most preferably 10%. The lower limit is desirably zero, but preferably 0.1% from the viewpoint of facilitating production. The number of samples (n) for calculation of the coefficient of variation of the linear expansion coefficient is preferably 10 or greater in order to reduce the effects of data error.

The coefficient of variation of the linear expansion coefficient is obtained by the following procedure. Specifically, 50 or more small 60 mm×60 mm×2 mm square plates conforming to ISO294-3 are molded, one test piece is taken for every 10 plates and a 4 mm long, 2 mm wide, 4 mm length cuboid measuring sample is cut out with a precision cutting saw, from the gate section and flow end portions of the test piece. The measuring sample obtained in this manner is measured according to ISO11359-2 in a measuring temperature range of −10 to 80° C., and the linear expansion coefficient from 0° C. to 60° C. is calculated. The coefficient of variation is calculated at this time using the aforementioned formula, based on the data for 10 or more samples. In order to eliminate the strain during molding, preferably annealing treatment is carried out for 3 hours or longer at a temperature above the measuring temperature.

In a resin composition according to one aspect of the invention, as mentioned above, the cellulose component exhibits a high degree of microdispersion, allowing a network to be formed in the composition. The mechanical properties are thus rendered uniform throughout all parts of the molded resin. This can minimize warping and deformation of the molded article produced by differences in shrinkage depending on location, when shrinkage with the passage of time after molding, or shrinkage during heating after molding, take place with unintended variation.

When dispersion of the cellulose in the composition is non-homogeneous and the difference in linear expansion coefficient is large depending on the location, temperature changes tend to produce problems such as distortion or warping of the molded article. Moreover, such problems occur due to differences in thermal expansion, and constitute a failure mode that reversibly results from rising and falling temperature. This can result in a failure mode that entails latent risk which is impossible to discern when checked for under room temperature conditions. Dimensional defects have been difficult to discern in the initial stages.

One of the causes of warping of molded articles is thought to be differences in partial shrinkage, and as mentioned above, this is believed to be caused by non-uniform dispersion of the cellulose. In the course of pursuing research in this regard, the present inventors have found a correlation between the coefficient of variation of the linear expansion coefficient, as the dimensional change due to temperature change, and the proportion of dimensional defects in products. That is, a correlation was found between dimensional defects in actual molded articles and the coefficient of variation of the linear expansion coefficient at various locations of the actual molded articles. More specifically, according to one method, test pieces are taken out from different locations of a single molded article and the linear expansion coefficient of each is measured, with any variation being comparatively evaluated. This measuring method allows test pieces to be taken out from multiple locations of the same molded article and evaluated, for evaluation of dimensional defects such as warping of molded articles. Evaluation of variation with even larger sizes is possible by evaluating differing test pieces (for example, different molding days, different production lots or different molding machines) at the same location. In such cases, it is more preferred to perform the measurement at a location where the relative fluctuation is already known to be high.

However, such dimensional defects occurring after molding in actual products have conventionally been difficult to predict at the testing stage or material design stage. The present inventors have found that a definite correlation exists between the coefficient of variation of the linear expansion coefficient at different locations of the actual molded article, and the coefficient of variation of the linear expansion coefficient measured for different test pieces, at the test piece stage. Specifically, by measuring multiple linear expansion coefficients and evaluating their coefficient of variation, even at the test piece level, it has become possible to determine the tendency toward dimensional defects in actual molded pieces.

The coefficient of variation of the linear expansion coefficient is thought to be greatly affected by the dispersed state of the cellulose component in the composition. Various methods exist for obtaining a satisfactory dispersed state. Examples of different approaches include a method of optimizing the proportion of the cellulose fibers and cellulose whiskers, a method of optimizing the diameter and L/D of the cellulose component, a method of applying sufficient shear to the cellulose component by optimizing the method of adding the cellulose component or optimizing the screw position of the extruder during melt kneading with an extruder, or optimizing the resin viscosity by temperature control, a method of reinforcing the interface between the resin and the cellulose component by further addition of a suitable organic component (for example, a surfactant), and a method of forming some sort of chemical bonding between the resin and the cellulose. Any of these approaches may be employed to improve the dispersed state of the cellulose component. Limiting the coefficient of variation of the linear expansion coefficient to no greater than 15% can greatly contribute to eliminating strength defects and dimensional defects in obtained molded articles, and provides an effect of drastically increasing the strength of the molded articles and the reliable stability of the products.

<Coefficient of Variation of Tensile Break Strength>

The coefficient of variation CV of the tensile break strength of the resin composition according to one aspect of the invention is limited to no greater than 10%, from the viewpoint of eliminating strength defects in molded articles obtained from the resin composition. The coefficient of variation referred to here is a number representing relative variation, similar to that explained in regard to the linear expansion coefficient.

The number of samples (n) for calculation of the coefficient of variation CV of the tensile break strength is preferably 10 or greater, in order to allow defects to be more easily found. The number is even more preferably 15 or greater.

A more preferred upper limit for the coefficient of variation is 9%, more preferably 8%, even more preferably 7%, yet more preferably 6% and most preferably 5%. The lower limit is desirably zero, but preferably 0.1% from the viewpoint of facilitating production.

The coefficient of variation of the tensile break strength is calculated using the tensile break strength measured according to ISO527 using a multipurpose test piece conforming to ISO294-3.

In a resin composition according to one aspect of the invention, the cellulose component exhibits a high degree of microdispersion, allowing a network to be formed in the composition. The presence of the cellulose component contributes to a lower coefficient of variation of the linear expansion coefficient, while also tending to promote a lower flow property of the resin composition and a larger coefficient of variation of the tensile break strength. A relatively lower amount of cellulose component with respect to the thermoplastic resin in the resin composition is advantageous from the viewpoint of maintaining a satisfactory flow property for the resin composition and further lowering the coefficient of variation of the tensile break strength. With a resin composition according to one aspect of the invention, therefore, partial strength defects seen in resin molded articles composed of conventional cellulose-containing resin compositions can be eliminated, and an epochal effect can be provided for vastly improving the reliability of actual products.

Partial strength defects in conventional resin molded articles are believed to be caused by formation of gaps (voids) due to uneven dispersion of cellulose and entangling of large L/D cellulose fibers, for example. One index for evaluating the tendency to form strength defects is a method of carrying out a tensile test with multiple test pieces, and confirming the presence and number of variations in the breaking strength.

For example, if voids are present in molded articles for structural parts such as automobile bodies, door panels or bumpers, due to sections with non-uniformly dispersed cellulose or entangling of large L/D cellulose fibers, then stress becomes concentrated at the non-uniform sections or voids when large stress is instantaneously applied to the molded article, or when the stress is small but repetitive, such as during vibration. This leads to a situation in which the molded article can break due to the concentration of stress. This can potentially lower the reliability of the article as a product.

It has been very difficult in the prior art to predict structural defects in actual products at the testing stage, and for example, methods have been used that confirm the dispersibility of cellulose fibers in products using microscopes or the like. With microscope observation, however, since the observation is on the microscopic level, it has not been possible to comprehensively evaluate test pieces as a whole, or the product as a whole.

In the course of pursuing research in this regard, the present inventors have found a correlation between the coefficient of variation of the tensile break strength, and the proportion of structural defects in products.

More specifically, if the material has a homogeneous internal structure and no voids, then even when multiple samples have been subjected to tension rupture testing, the stress that leads to rupture will be essentially the same across all of the multiple samples, and the coefficient of variation will be very small. However, if the material has interior non-homogeneous sections and voids, then stress leading to rupture in a given sample will differ significantly from stress in other samples. The abundance of samples exhibiting stress differing from stress in other samples can be elucidated using the coefficient of variation as the standard.

As an example, in the case of a material without yield strength, samples having interior defects will undergo rupture at lower strength than other samples. In the case of a material with yield strength, rupture usually takes place after yielding and during necking, and therefore samples having interior defects exhibit a tendency to undergo rupture at higher strength than other samples. Despite such differences in behavior, using the coefficient of variation of the tensile break strength as the standard can predict the potential for strength defects in actual products.

<Linear Expansion Coefficient of Resin Composition>

According to one aspect of the invention, the resin composition includes two or more types of cellulose as the cellulose component. This will allow linear expansibility to be exhibited that is lower than conventional cellulosic compositions. Specifically, the linear expansion coefficient of the resin composition in a temperature range of 0° C. to 60° C. is preferably no greater than 50 ppm/K. A more preferred linear expansion coefficient for the composition is no greater than 45 ppm/K, more preferably no greater than 40 ppm/K and most preferably no greater than 35 ppm/K. The lower limit for the linear expansion coefficient is not particularly restricted, but from the viewpoint of easier production it is preferably 5 ppm/K and more preferably 10 ppm/K, for example.

This linear expansion coefficient is the linear expansion coefficient measured according to ISO11359-2, in a measuring temperature range of −10 to 80° C., using a 4 mm long, 4 mm wide, 4 mm length cuboid measuring sample cut out with a precision cutting saw from the center section of a multipurpose test piece conforming to I50294-1. In order to eliminate the strain during molding, preferably annealing treatment is carried out for 3 hours or longer at a temperature above the measuring temperature.

<Tensile Yield Strength of Resin Composition>

With the resin composition according to one aspect of the invention, the tensile yield strength tends to be drastically improved compared to a thermoplastic resin alone. The ratio of the tensile yield strength of the resin composition, where the tensile yield strength of the thermoplastic resin alone containing no cellulose component is defined as 1.0, is preferably at least 1.1 times, more preferably at least 1.15 times, even more preferably at least 1.2 times and most preferably at least 1.3 times. The upper limit for this ratio is not particularly restricted, but from the viewpoint of easier production it is preferably 5.0 times and more preferably 4.0 times, for example.

<Cellulose Component>

The cellulose component will now be described in detail.

The stability of physical properties exhibited by a resin composition according to one aspect of the invention is realized by microdispersion of the cellulose in the resin composition, and by a low total amount of cellulose component with respect to the resin. According to one aspect, the cellulose component forms a network structure in the amorphous phase of the resin. By forming such a network, it is easy to obtain a result of effectively minimizing thermal expansion of the resin composition even with a small amount of cellulose. In addition, formation of a stable network structure can reduce maldistribution or aggregation of the cellulose component at different locations, so that a toughened resin with minimal variation in physical properties can be provided.

The cellulose component is preferably a combination of two or more different types of cellulose.

According to one aspect, the cellulose component includes cellulose whiskers and cellulose fibers. By including cellulose fibers and cellulose whiskers, the resin composition can have both of them mutually microdispersed to a high degree in the resin, so that a resin composition can be obtained that imparts desired physical properties to molded articles even with a lower total amount of cellulose component in the resin, compared to when cellulose fibers or cellulose whiskers are used alone.

In addition, the effect of using them in combination is to not only form a highly microdispersed state, but the cellulose fibers and cellulose whiskers also form a higher connected network structure in the amorphous phase of the resin. By forming such a network, thermal expansion of the resin composition is effectively minimized even with a small amount of cellulose. In addition, formation of a stable network structure can reduce maldistribution or aggregation of the cellulose component at different locations, so that a reinforced resin can be provided that has extremely minimal variation between molded resins or at different locations of the same molded article. This tendency is more notable for an aspect of the composition containing a larger amount of cellulose whiskers.

When the amount of cellulose component in the resin composition is low and a portion thereof consists of cellulose whiskers with a small L/D ratio, the flow property during resin molding is highly satisfactory. Consequently, molded articles with different shapes can be freely molded and variation in the physical properties of the molded resins is low, thereby allowing a resin composition to be obtained that is sufficiently suitable for mass production.

The cellulose whiskers and cellulose fibers may be the same as described for aspect A.

According to one aspect of the invention, the amount of the cellulose component is in the range of 0.1 to 100 parts by mass with respect to 100 parts by mass of the thermoplastic resin. The lower limit for the amount of the cellulose component is preferably 0.5 part by mass, more preferably 1 part by mass and most preferably 2 parts by mass. The upper limit for the amount of cellulose component is preferably 50 parts by mass, more preferably 40 parts by mass, even more preferably 30 parts by mass, yet more preferably 20 parts by mass, even yet more preferably 10 parts by mass and most preferably 5 parts by mass.

The amount of the cellulose component is preferably within this range from the viewpoint of balance between workability and mechanical properties.

The preferred proportion of cellulose whiskers with respect to the total mass of the cellulose component is the same as mentioned for aspect A.

The proportion of cellulose whiskers of the total mass of the cellulose component is preferably within this range from the viewpoint of flow property as a resin composition.

<Thermoplastic Resin>

Thermoplastic resins include crystalline resins having melting points in the range of 100° C. to 350° C., and amorphous resins having glass transition temperatures in the range of 100 to 250° C. The preferred specific examples of thermoplastic resins and the reason for their preference are as described for aspect A, unless otherwise specified.

<Organic Component>

The resin composition may include an organic component as an additional component. According to one aspect, the organic component has a dynamic surface tension of no greater than 60 mN/m. Also according to one aspect, the organic component is a surfactant. The organic component contributes to improved dispersibility of the cellulose component in the thermoplastic resin. The preferred amount of the organic component is an amount in the range of no greater than 50 parts by mass with respect to 100 parts by mass of the cellulose component. The more preferred upper limit is 45 parts by mass, more preferably 40 parts by mass, even more preferably 35 parts by mass and most preferably 30 parts by mass. There is no particular lower limit since it is an additional component, but the handleability can be increased by addition at 0.1 part by mass or greater with respect to 100 parts by mass of the cellulose component. The lower limit is more preferably 0.5 part by mass and most preferably 1 part by mass. The preferred specific examples of organic components and the reason for their preference are also as described for aspect A, unless otherwise specified.

The amount of organic component is preferably no greater than 50 parts by mass, more preferably no greater than 45 parts by mass, even more preferably no greater than 40 parts by mass, yet more preferably no greater than 35 parts by mass and most preferably no greater than 30 parts by mass, with respect to 100 parts by mass of the cellulose component. There is no particular lower limit since it is an additional component, but the handleability can be increased by addition to a total amount of 0.1 part by mass or greater with respect to 100 parts by mass of the cellulose component. The total amount is more preferably 0.5 part by mass or greater and most preferably 1 part by mass or greater.

The resin composition may be provided in a variety of different forms. Specifically, it may be in the form of resin pellets, sheets, fiber, plates or rods, with the form of resin pellets being more preferred for easier post-working and easier transport. Preferred examples of pellets are the same as mentioned for aspect A.

The resin composition may be utilized for various types of molded resins. Preferred examples for the method of producing the resin composition and the molded resin are the same as described for aspect A.

More specifically, examples include a method of heating while stirring a cellulose dispersion containing cellulose and a dispersing medium composed mainly of water, removing the dispersing medium to obtain cellulose aggregates, and then kneading the cellulose aggregates with a thermoplastic resin, a method of preparing a resin cellulose dispersion comprising a thermoplastic resin, cellulose and a dispersing medium composed mainly of water, heating the resin cellulose dispersion while stirring it, removing the dispersing medium to obtain a resin cellulose mixture, and then melt kneading the resin cellulose mixture to obtain a resin composition, a method of adding a cellulose dispersion containing cellulose and a dispersing medium composed mainly of water, to a thermoplastic resin in the molten state, melt kneading the resin and cellulose in an environment in which they are co-present while the dispersing medium gasifies, to obtain a kneaded blend, and then removing the dispersing medium from the kneaded blend to obtain a resin composition, and a method of adding a cellulose dispersion containing cellulose and a dispersing medium composed mainly of water, to a thermoplastic resin in the molten state, melt kneading the resin and cellulose in an environment in which a pressure is maintained so that the dispersing medium does not gasify while the dispersing medium composed mainly of water is in a liquid state, to obtain a kneaded blend, and then removing the dispersing medium from the kneaded blend to obtain a resin composition.

As explained above, various methods exist for obtaining resin compositions. One aspect of the invention provides a resin composition containing a cellulose component that provides sufficient stable physical properties to withstand practical use, and a technique for mass production of a cellulose nanocomposite having the properties described above. Specifically, it provides a resin composition having a coefficient of variation of the linear expansion coefficient (standard deviation/arithmetic mean value) of no greater than 15%, and a coefficient of variation of the tensile break strength of no greater than 10%, in a range of 0° C. to 60° C. Different production methods and production conditions may be applied for production of a resin composition having such a low coefficient of variation. For example, even with the same production method, the value of the coefficient of variation may change with different production conditions. Therefore, production for obtaining a resin composition of the present disclosure is not limited to the methods described in the present disclosure.

The resin composition according to one aspect of the invention has high mechanical properties and low linear expansibility, and it not only has a high flow property making it suitable for large-sized parts, but can also yield molded articles that include essentially no partial strength defects, so that it can be satisfactorily used for various types of large-scale parts.

[Aspect C]

One aspect of the invention provides a cellulose formulation that includes cellulose particles and an organic component that covers at least portions of the surfaces of the cellulose particles, as well as a resin composition containing the formulation.

[Cellulose Formulation]

The cellulose formulation includes cellulose particles having at least portions of the surfaces covered by an organic component. According to one embodiment, the static surface tension of the organic component is 20 mN/m or greater. Also according to one embodiment, the organic component has a higher boiling point than water. It is a feature of the cellulose formulation of one aspect of the invention that at least portions of the surfaces of the cellulose particles contained in it (hereunder also referred to as "cellulose particles of the present disclosure") are covered by a specific organic component, and thus the dispersibility in resins is satisfactory, and a resin composition in which the cellulose formulation is dispersed has an excellent flow property when melted and satisfactory elongation when stretched.

According to a preferred aspect, the organic component covers the particles by bonding with at least portions of the surfaces of the cellulose particles. Bonding between the cellulose particle surfaces and the organic component is by non-covalent bonding such as hydrogen bonding or intermolecular forces. The process of bonding between at least portions of the cellulose particle surfaces and the organic component will hereunder also be referred to as "compositing process (compositing step) with the organic component".

<Cellulose>
<Cellulose Starting Material>

The cellulose starting material for preparation of the cellulose particles is preferably a natural cellulosic substance (a naturally derived fibrous substance containing cellulose). The natural cellulosic substance may be vegetable or animal, or microorganically derived. Examples of natural cellulosic substances include cellulose-containing naturally derived fibrous substances such as wood, bamboo, wheat straw, rice straw, cotton, ramie, sea squirt, bagasse, kenaf, beet or bacterial cellulose. Examples of commonly available natural cellulosic substances include cellulose floc, and natural cellulosic substances in powder form (powdered cellulose) such as crystalline cellulose. The cellulose starting material used for the cellulose particles may be a single type of natural cellulosic substance, or it may be a combination of two or more different natural cellulosic substances.

The cellulose starting material used is preferably in the form of refined pulp, but there is no particular restriction on the method of refining the pulp, and any type of pulp such as dissolved pulp, Kraft pulp, NBKP, LBKP or fluff pulp may be used.

<Mean Polymerization Degree of Cellulose>

The mean polymerization degree of the cellulose may be measured by a reduced relative viscosity method using a copper-ethylenediamine solution, as described in Verification Test (3) of "Japanese Pharmacopeia, 15th Edition Reference Manual (Hirokawa Shoten)".

The mean polymerization degree of the cellulose composing the cellulose particles is preferably no greater than 1000. If the mean polymerization degree is no greater than 1000, then during the step of compositing with the organic component the cellulose will be more easily subjected to physical processing such as stirring, pulverizing and milling, and compositing will proceed more easily. As a result, the dispersibility in resins will be increased. The mean polymerization degree of the cellulose is more preferably no higher than 750, even more preferably no higher than 500, yet more preferably no higher than 350, especially preferably no higher than 300, very much preferably no higher than 250 and most preferably no higher than 200. Since a lower mean polymerization degree of the cellulose will facilitate control of compositing, there is no particular lower limit, but the preferred range is 10 or higher.

<Hydrolysis of Cellulose>

The method of controlling the mean polymerization degree of the cellulose may be hydrolysis or the like. Hydrolysis promotes depolymerization of amorphous cellulose inside the cellulose fiber material and lowers the mean polymerization degree. Simultaneously, hydrolysis also results in removal of impurities such as hemicellulose and lignin in addition to the aforementioned amorphous cellulose, so that the interior of the fiber material becomes porous. Thus, in steps in which mechanical shear force is applied to the cellulose and organic component, such as during the kneading step and other steps described below, the cellulose is more readily subjected to mechanical processing and the cellulose is more easily micronized. As a result, the surface area of the cellulose is increased and compositing with the organic component becomes easier to control.

The method of hydrolysis may be the same as for aspect A.

<Crystalline Form and Degree of Crystallinity of Cellulose>

The cellulose composing the cellulose particles preferably includes crystalline cellulose, and more preferably it consists of crystalline cellulose. The degree of crystallinity of the crystalline cellulose is preferably 10% or greater. If the degree of crystallinity is at least 10%, the dynamic properties (strength and dimensional stability) of the cellulose particles themselves will increase, so that when they are dispersed in a resin, the strength and dimensional stability of the resin composition will tend to be increased. The degree of crystallinity of the cellulose composing the cellulose particles is preferably 30% or greater, more preferably 50% or greater and even more preferably 70% or greater. There is no particular restriction for the upper limit for the degree of crystallinity, but it is preferably no greater than 90%.

The method of measuring the degree of crystallinity may be the same as for aspect A.

The known crystalline forms of cellulose include type I, type II, type III and type IV, among which type I and type II are most particularly in common use, whereas type III and type IV are not commonly used on an industrial scale, although they have been obtained on a laboratory scale. The cellulose composing the cellulose particles is preferably crystalline cellulose containing type I cellulose crystals, because it has relatively high mobility due to its structure, and by dispersing such cellulose particles in a resin, a resin composite will be obtained having a lower linear expansion coefficient and excellent strength and elongation when subjected to stretching or bending deformation, and more preferably it is crystalline cellulose containing type I cellulose crystals and having a degree of crystallinity of 10% or greater.

<Form of Cellulose (Length (L), Diameter (D) and L/D Ratio)>

In the present disclosure, the length, diameter and L/D ratio of the cellulose (specifically the cellulose particles and cellulose fibers) are determined by preparing a 1 mass % concentration purified water suspension of the cellulose (preferably a hydrolyzed wet cake), dispersing it with a high-shear homogenizer (for example, an "Excel Autohomogenizer ED-7", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with a high-resolution scanning microscope (SEM) or atomic force microscope (AFM). Specifically, the lengths (specifically, the long diameters of the cellulose particles, or the fiber lengths of the cellulose fibers, when present) (L), the diameters (specifically, the short diameters of the cellulose particles, or the fiber diameters of the cellulose fibers, when present) (D), and the ratio (L/D) are determined from an image of randomly chosen cellulose particles in an observation field with the magnification adjusted for observation of at least 100, such as 100 to 150, cellulose particles. Incidentally, when crystalline cellulose and cellulose fibers are co-present in the measuring sample, the crystalline cellulose having cellulose particles with a ratio (L/D) of less than 30, for example, those with a ratio (L/D) of less than 30 are classified as crystalline cellulose, and those with 30 or greater are classified as cellulose fibers. The number-average value of the length (L), the number-average value of the diameter (D) and the number-average value of the ratio (L/D) are calculated as the number-average values for at least 100 particles, such as 100 to 150.

Alternatively, the length, diameter and L/D ratio of the cellulose in the composition can be confirmed by measurement according to the measuring method described above, using the solid composition as the measuring sample.

Yet alternatively, the length, diameter and L/D ratio of the cellulose in the composition can be confirmed by dissolving the resin component in the composition in an organic or inorganic solvent capable of dissolving the resin component of the composition, separating the cellulose, thoroughly rinsing it with the solvent, and then replacing the solvent with purified water to form an aqueous dispersion, diluting the cellulose concentration to 0.1 to 0.5 mass % with purified water, casting the dispersion onto mica, and performing measurement by the measuring method described above using the air-dried product as the measuring sample.

For confirmation of the length, diameter and L/D ratio of the cellulose particles in the cellulose formulation, the cellulose formulation is dispersed in water or an organic solvent (the dispersion method being carried out with a high-shear homogenizer (for example, an "Excel Autohomogenizer ED-7", trade name of Nippon Seiki Co., Ltd.) with the cellulose formulation at 1 mass % concentration, under treatment conditions of rotational speed: 15,000 rpm×5 minutes), and then measurement is performed with an AFM by the method described above.

From the viewpoint of obtaining a resin composite with a low linear expansion coefficient, the length (L) of the cellulose particles is preferably 200 nm or greater, more preferably 500 nm or greater and even more preferably 1000 nm or greater, and from the viewpoint of dispersibility in resins, and of the flow property and injection molding property of the resin composition when melted, it is preferably no greater than 10,000 nm, more preferably no greater than 5000 nm and even more preferably no greater than 3000 nm.

From the viewpoint of obtaining a resin composite with a low linear expansion coefficient, the diameter (D) of the cellulose particles is preferably 20 nm or greater and more preferably 30 nm or greater, and from the viewpoint of dispersibility in resins, and of the flow property and injection molding property of the resin composition when melted, it is preferably no greater than 500 nm, more preferably no greater than 450 nm, even more preferably no greater than 400 nm, yet more preferably no greater than 350 nm and most preferably no greater than 300 nm.

From the viewpoint of dispersibility in resins and of the flow property and injection molding property of the resin composition when melted, the L/D of the cellulose particles is preferably less than 30, more preferably 20 or lower, even more preferably 15 or lower, yet more preferably 10 or lower, even yet more preferably 5 or lower, especially preferably less than 5, and most preferably 4 or lower. It is sufficient if the L/D ratio is 1 or greater, but from the viewpoint of ensuring dispersibility in resins while obtaining a low linear expansion coefficient and a satisfactory balance between the flow property and injection molding property when melted, it is preferably 2 or greater and more preferably 3 or greater.

<Content of Colloidal Cellulose Particles>

The cellulose formulation preferably includes colloidal cellulose particles as the cellulose particles. A higher proportion of colloidal cellulose particles constituting the total cellulose particles will allow formation of a network with advanced dispersion and high surface area when the cellulose formulation using the cellulose particles has been dispersed in a resin, thereby tending to increase the resin strength and dimensional stability. The content of colloidal cellulose particles with respect to 100 mass % of the cellulose particles is preferably 50 mass % or greater, more preferably 60 mass % or greater, even more preferably 70 mass % or greater and most preferably 80 mass % or greater. There is no particular restriction on the upper limit for the content of the colloidal cellulose particles, but the theoretical upper limit is 100 mass %.

The content of colloidal cellulose particles can be measured by the following method. Cellulose at a solid content of 40 mass % is kneaded for 30 minutes in a planetary mixer (for example, a 5DM-03-R by Shinagawa Machinery Works Co., Ltd., hook-type stirring blade) at 126 rpm, room temperature, ordinary pressure, and then a purified water suspension is prepared to a solid concentration of 0.5 mass %, a high-shear homogenizer (for example, an "Excel Autohomogenizer ED-7", trade name of Nippon Seiki Co., Ltd.) is used for dispersion under treatment conditions of rotational speed: 15,000 rpm×5 minutes, a centrifugal separator (for example, a "Model 6800 Centrifugal Separator", trade name of Kubota Corp., Rotor type Model RA-400) is used for centrifugation under treatment conditions of centrifugal force: 39,200 $m^2/s$, 10 minutes, the resulting supernatant is obtained, the supernatant is centrifuged at 116,000 $m^2/s$ for 45 minutes, the solid portion remaining from the centrifuged supernatant is measured by an absolute dry method, and the mass percentage is calculated.

<Volume-Average Particle Size of Cellulose>

In the present disclosure, the volume-average particle size of the cellulose is measured using a laser diffraction particle size distribution meter. Also, in the present disclosure, the concept of "the 50% cumulative particle diameter (the diameter of particles as spheres wherein the cumulative volume is 50% with respect to the volume of the total particles) in the volume frequency particle size distribution obtained by a laser diffraction particle size distribution meter" will also be referred to as "volume-average particle size" or "particle diameter at 50% in cumulative volume".

The volume-average particle size of the cellulose can be measured by the method described below. Cellulose at a solid content of 40 mass % is kneaded for 30 minutes in a planetary mixer (for example, a 5DM-03-R by Shinagawa Machinery Works Co., Ltd., hook-type stirring blade) at 126 rpm, room temperature, ordinary pressure, and then a purified water suspension is prepared to 0.5 mass %, a high-shear homogenizer (for example, an "Excel Autohomogenizer ED-7", trade name of Nippon Seiki Co., Ltd., processing conditions) is used for dispersion under treatment conditions of rotational speed: 15,000 rpm×5 minutes, a centrifugal separator (for example, a "Model 6800 Centrifugal Separator", trade name of Kubota Corp., Rotor type Model RA-400) is used for centrifugation under treatment conditions of centrifugal force: 39,200 $m^2/s$, 10 minutes, the resulting supernatant is obtained, the supernatant is centrifuged at 116,000 $m^2/s$ for 45 minutes, and the centrifugation supernatant is obtained. The supernatant liquid is used to measure the 50% cumulative particle diameter (volume-average particle size) in the volume frequency particle size distribution obtained by a laser diffraction/scattering method-based particle size distribution meter (for example, a "LA-910" or "LA-950", trade names of Horiba, Ltd., ultrasonic treatment for 1 minute, refractive index: 1.20).

The cellulose particles preferably have smaller particle diameters. A smaller particle diameter will allow formation of a network with advanced dispersion and high surface area when the cellulose formulation containing the cellulose particles has been dispersed in a resin, thereby tending to increase the strength and dimensional stability of the obtained resin composite. The volume-average particle size of the cellulose particles is preferably no greater than 10 µm, more preferably no greater than 8.0 µm, even more preferably no greater than 5.0 µm, yet more preferably no greater than 3.0 µm, especially preferably no greater than 1.0 µm, particularly preferably no greater than 0.7 µm, very preferably no greater than 0.5 µm and most preferably no greater than 0.3 µm. While there is no particular restriction on the lower limit for the particle diameter, in practical terms it is 0.05 µm or greater.

<Zeta Potential>

The zeta potential of the cellulose composing the cellulose particles is preferably no greater than −40 mV. If the zeta potential is within this range, when the cellulose particles and resin are compounded there will be no excessive bonding between the cellulose particles and the resin, and a satisfactory melt flow property can be maintained. The zeta potential is more preferably no greater than −30 mV, even more preferably no greater than −25 mV, yet more preferably no greater than −20 mV and most preferably no greater than −15 mV. Since a smaller value is associated with more excellent physical properties of the compound there is no particular restriction on the lower limit, but it is preferably −5 mV or greater.

The zeta potential referred to here can be measured by the following method. The cellulose is prepared in a 1 mass % concentration purified water suspension, a high-shear homogenizer (for example, an "Excel Autohomogenizer ED-7", trade name of Nippon Seiki Co., Ltd.) is used for dispersion under treatment conditions of rotational speed: 15,000 rpm×5 minutes, the obtained aqueous dispersion is diluted with purified water to 0.1 to 0.5 mass %, and a zeta potentiometer (for example, a Model ELSZ-2000ZS by Otsuka Electronics Co., Ltd., standard cell unit) is used for measurement at 25° C.

<Crystalline Cellulose>

The cellulose particles preferably include the aforementioned crystalline cellulose, and more preferably they consist of the crystalline cellulose. The crystalline cellulose can be obtained by the hydrolysis described above, using the aforementioned cellulose as the starting material. According to one embodiment, the crystalline cellulose is controlled to a mean polymerization degree of lower than 500 and/or a mean L/D of lower than 30. By using crystalline cellulose, compositing between the cellulose particles and organic component is promoted, and during preparation of the resin composition by addition of the cellulose formulation to a resin, the dispersibility of the cellulose is increased and the resin composition can be provided with an excellent flow property and injection molding property when melted. As a result, an effect can be exhibited whereby a resin composition having the cellulose formulation dispersed in a resin has a low linear expansion coefficient, and excellent elongation when subjected to stretching or bending deformation.

The mean polymerization degree of the crystalline cellulose is preferably lower than 500, more preferably 400 or lower, even more preferably 250 or lower, especially preferably 230 or lower, particularly preferably 200 or lower and most preferably 180 or lower. No particular lower limit is set since a lower polymerization degree will increase the aforementioned effect by the crystalline cellulose, but in practical terms it may be 50 or higher.

The mean L/D of the crystalline cellulose is preferably lower than 30, more preferably 20 or lower, even more preferably 15 or lower and most preferably 10 or lower. No particular lower limit is set since a lower L/D will increase the aforementioned effect, but in practical terms it may be 2 or higher.

<Cellulose Fibers>

The cellulose formulation preferably further includes cellulose fibers. Cellulose fibers are cellulose obtained by treating a cellulose starting material such as pulp with hot water or the like at 100° C. or above, hydrolyzing the hemicellulose portion to weaken it, and then defibrating by a pulverizing method using a high-pressure homogenizer, microfluidizer, ball mill or disk mill. According to one embodiment, the cellulose fibers have a mean polymerization degree of 300 or higher. According to one embodiment, the cellulose fibers are controlled to have a mean L/D in the range of 30 or higher. By using cellulose fibers, when the cellulose formulation is added to a resin, the dispersibility of the cellulose is even more satisfactorily maintained, and the resin composition can exhibit a satisfactory flow property and injection molding property when melted. As a result, an effect can be exhibited whereby a resin composition comprising the cellulose formulation dispersed in a resin has an even lower linear expansion coefficient, and even more excellent strength when subjected to stretching or bending deformation.

The mean polymerization degree of the cellulose fibers is more preferably 350 or higher, even more preferably 400 or higher, especially preferably 500 or higher and particularly preferably 700 or higher. From the viewpoint of compositing with the organic component, the mean polymerization degree is preferably no higher than 1500 and more preferably no higher than 1000.

From the viewpoint of obtaining a resin composite with a low linear expansion coefficient, the fiber lengths (L) of the cellulose fibers are preferably 5 μm or greater, more preferably 10 μm or greater and even more preferably 50 μm or greater, and from the viewpoint of dispersibility in resins and the flow property and injection molding property of the resin composition when melted, they are preferably no greater than 1000 μm, more preferably no greater than 500 μm and even more preferably no greater than 100 μm.

The fiber diameters (D) of the cellulose fibers are preferably of the nanometer size (that is, smaller than 1 μm), and the fiber diameters are more preferably 500 nm or smaller. The fiber diameters of the cellulose fibers are preferably no greater than 450 nm, more preferably no greater than 400 nm, even more preferably no greater than 350 nm, yet more preferably no greater than 300 nm, even yet more preferably no greater than 200 nm, still more preferably no greater than 100 nm, even still more preferably no greater than 50 nm, and most preferably no greater than 30 nm. The fiber diameters of the cellulose fibers are preferably 1 nm or greater and more preferably 2 nm or greater.

The fiber diameters of the cellulose fibers are preferably within this range from the viewpoint of effectively exhibiting the mechanical properties of the resin composite.

The lower limit for L/D of the cellulose fibers is preferably 50, more preferably 80, even more preferably 100, yet more preferably 120 and most preferably 150. The upper limit is not particularly restricted but is preferably no greater than 1000 from the viewpoint of handleability.

<Combination of Crystalline Cellulose and Cellulose Fibers>

The cellulose formulation preferably includes cellulose particles (preferably crystalline cellulose with an L/D of lower than 30) and cellulose fibers with an L/D of 30 or greater. When a combination of cellulose particles (preferably crystalline cellulose with an L/D of lower than 30) and cellulose fibers with an L/D of 30 or higher, the cellulose particles and the organic component will satisfactorily form a composite. Thus, when the cellulose formulation is added to the resin to produce the resin composition, the dispersibility of the cellulose formulation in the resin will be increased, and the resin composition will have an excellent flow property and injection molding property when melted. Consequently, an effect can be exhibited whereby a resin composition having the cellulose formulation dispersed in a resin has a low linear expansion coefficient, and excellent elongation and strength when subjected to stretching or bending deformation. By optimizing the mixing proportion of the cellulose particles (preferably crystalline cellulose) and cellulose fibers, the aforementioned effect is satisfactorily exhibited by the resin composition even with the cellulose particles added in a small amount, and as a result a lighter weight resin composite can be designed.

The proportion of crystalline cellulose with respect to the total mass of cellulose in the cellulose formulation is preferably 50 mass % or greater. The proportion is more preferably greater than 50 mass %, even more preferably 60 mass % or greater, even yet more preferably 70 mass % or greater and most preferably 80 mass % or greater. The upper limit for the proportion is preferably 98 mass %, more preferably 96 mass % and most preferably 95 mass %.

<Binding Rate of Cellulose and Organic Component>

In the cellulose formulation, the organic component is preferably bonded to the surfaces of the cellulose particles with weak force. A "weak force" is, for example, non-covalent bonding (hydrogen bonding, coordination bonding, ionic bonding, intermolecular forces, etc.), physical adsorption, electrostatic attraction, or the like. When the organic component and cellulose are bonded by weak force without covalent bonding, the organic component on the cellulose surfaces disengages and dissociates in the resin during the process of mixing and dispersing the cellulose formulation in the resin in a molten state, thereby exposing the original surfaces of the cellulose. The exposed cellulose particle surfaces interact, tending to result in a stronger cellulose network. A stronger cellulose network can be expected to improve the dynamic properties of the resin composition and increase the mechanical strength.

The degree of covalent bonding between the cellulose and organic component is represented by the binding rate, explained below.

The cellulose formulation powder is pulverized so as to pass through a 250 μm sieve, and 1 g thereof is sampled. The sample is placed in 10 mL of an organic solvent (such as ethanol) or water (a medium that can dissolve the organic component), and stirred for 60 minutes at room temperature using a stirrer. The organic solvent or water is filtered with a PTFE membrane filter having an aperture of 0.4 μm, and the organic solvent or water is evaporated off from the filtrate. The mass of the residue obtained from the filtrate is determined and the binding rate is calculated by the following formula. The amount of organic component in the cellulose formulation can be determined using the theoretical value obtained from the contents during production, or it can be determined by chemical analysis such as NMR, IR or X-ray diffraction.

Binding rate (%)=[1-([Mass of residue (g)]/[amount of organic component in cellulose formulation (g)])]×100

In the cellulose formulation, the binding rate is preferably no greater than 90%, more preferably no greater than 50%, even more preferably no greater than 20%, yet more preferably no greater than 10% and most preferably no greater than 5%. A lower binding rate increases the dispersibility of the cellulose formulation in the resin and the dynamic properties after dispersion, and while there is no particular restriction on the lower limit, it is 0% in theory.

<Organic Component>

For the purpose of the present disclosure, the term "organic component" refers to one typically having carbon atoms as the backbone and with a functional group comprising hydrogen, oxygen, carbon, nitrogen, chlorine, sulfur, sulfur or the like. So long as the aforementioned structure is in the molecule, the organic component also includes components in which inorganic compounds and functional groups are chemically bonded.

<Boiling Point of Organic Component>

The organic component covering the surfaces of the cellulose particles according to one aspect of the invention (hereunder also referred to as "organic component of the present disclosure") has a higher boiling point than water. Having a higher boiling point than water means having a boiling point that is higher than the boiling point of water at each pressure on a vapor pressure curve (100° C. at 1 atmosphere, for example). If the boiling point of the organic component is higher than water, then the water in the cellulose formulation will evaporate off when the cellulose formulation is mixed with a resin in the molten state, the water being replaced with the organic component, and therefore dispersion of the cellulose in the resin will be accelerated.

The organic component is preferably a liquid at ordinary temperature (25° C.). An organic component that is liquid at ordinary temperature will form a composite more easily with cellulose and will uniformly mix with the resin more easily. It will also help prevent aggregation and recrystallization of the organic component in the resin composition.

<Static Surface Tension of Organic Component>

The static surface tension of the organic component is 20 mN/m or greater. The static surface tension is the surface tension measured by the Wilhelmy method described below. When an organic component that is in liquid form at ordinary temperature is used, the value is measured at 25° C., but when an organic component that is solid or semi-solid at ordinary temperature is used, the organic component is heated to the melting point or higher and measurement is performed in the molten state, using the value corrected for a temperature of 25° C. The organic component may be one in any state so long as the static surface tension is satisfied when the cellulose formulation is prepared. For example, the organic component may be a single organic component, or a mixture of two or more different organic components, or it may be used as an organic component dissolved in an organic solvent or water.

According to one aspect, if the organic component has static surface tension within a specified range, the hydrophilic groups will participate in hydrogen bonding with the hydroxyl groups on the cellulose surfaces, thereby allowing the surfaces to be uniformly covered. In addition, since hydrophobic groups will be exposed on the surfaces of the uniformly covered cellulose primary particles when dried, the cellulose will easily disperse in the resin during preparation of the resin composition. If the static surface tension of the organic component is too low, the hydrophobicity of the organic component will be too strong and coating of the cellulose surfaces will be insufficient, resulting in inadequate dispersibility of the cellulose. If the static surface tension of the organic component is too high, coating of the cellulose surfaces will be sufficient but affinity between the cellulose and resin will be reduced, resulting in lower dispersibility of the cellulose.

When the resin composition is produced by kneading the cellulose particles and resin with a balance between affinity with the cellulose interface and affinity with the resin, it is preferred to control the static surface tension of the organic component to within a specified range in order to exhibit satisfactory dispersibility, as well as increased flow property, strength and elongation of the resin composition. The static surface tension of the organic component is preferably 23 mN/m or greater, more preferably 25 mN/m or greater, even more preferably 30 mN/m or greater, yet more preferably 35 mN/m or greater and most preferably 39 mN/m or greater. The static surface tension of the organic component is preferably less than 72.8 mN/m, more preferably no greater than 60 mN/m, even more preferably no greater than 50 mN/m and yet more preferably no greater than 45 mN/m.

The method of measuring the static surface tension may be the same as for aspect A.

<Dynamic Surface Tension of Organic Component>

The dynamic surface tension of the organic component is preferably no greater than 60 mN/m. The method of measuring the dynamic surface tension may be the same as for aspect A.

The dynamic surface tension measured by the maximum bubble pressure method is the dynamic surface tension of the organic component at its location of fastest movement. An organic component usually forms micelles in water. A low dynamic surface tension indicates a rapid diffusion rate of the organic component molecules from the micelle state, while a high dynamic surface tension indicates a slow diffusion rate of the molecules. When obtaining the cellulose formulation or resin composition, a low dynamic surface tension (that is, a high diffusion rate of the molecules) will cause the organic component molecules that are forming micelles to diffuse on the cellulose surfaces when water evaporates from the cellulose surfaces, allowing the cellulose surfaces to be uniformly coated. This will render the cellulose particle surfaces suitably hydrophobic when the cellulose particles undergo secondary aggregation, thereby inhibiting excessive hydrogen bonding between the cellulose particles and their aggregation. As a result, when the cellulose and resin are compounded, the resin will satisfactorily infiltrate into the gaps between the cellulose (especially the gaps between cellulose particles), increasing the dispersibility of the cellulose.

If the dynamic surface tension is too high, on the other hand, since the diffusion rate of the molecules is slower than the evaporation rate of water, some of the organic component will remain as masses (undiffused) and adhere to the cellulose surfaces, causing the cellulose to be mutually attracted by hydrogen bonding and to aggregate. As a result, the dispersibility of the cellulose during compounding with the resin will be poor.

The dynamic surface tension of the organic component is more preferably no greater than 55 mN/m, even more preferably no greater than 50 mN/m, yet more preferably no greater than 45 mN/m and most preferably no greater than 40 mN/m. The dynamic surface tension of the organic component is preferably 10 mN/m or greater, more preferably 15 mN/m or greater, even more preferably 20 mN/m or greater, yet more preferably 30 mN/m or greater and most preferably 35 mN/m or greater.

<Solubility Parameter (SP Value) of Organic Component>

The organic component preferably has a solubility parameter (SP value) of 7.25 or greater. If the organic component has an SP value within this range, compositing between the cellulose and organic component will be promoted and dispersion of the cellulose in the resin will be promoted. The method of measuring the SP value may be the same as for aspect A.

<Type of Organic Component>

The organic component is not particularly restricted, and for example, a fat or oil, fatty acid, surfactant or the like may be used.

Fats or oils include esters of fatty acids and glycerin. A fat or oil will usually be in the form of a triglyceride (tri-O-acylglycerin). Here, "fats and oils" are fatty oils that are categorized as drying oils, semidrying oils or non-drying oils, in order of their tendency to be oxidized and harden, and any ones utilized for a variety of purposes including consumption and industrial use may be used, such as one or more of the following, for example.

Examples of animal and vegetable oils include the same ones mentioned for aspect A, for example. Examples of mineral oils include liquid paraffin, silicone oils, greases such as calcium soap-based grease, calcium complex soap-based grease, sodium soap-based grease, aluminum soap-based grease, lithium soap-based grease, non-soap-based grease and silicon grease; naphthene-based and paraffin-based mineral oils; partial synthetic oils obtained by mixing PAO or esters (or hydrotreated oils) with mineral oils or higher hydrotreated oils; chemical synthetic oils, totally synthetic oils and synthetic oils such as PAO (poly α-olefins).

A fatty acid is a compound represented by the general formula $C_nH_mCOOH$ (where n and m are integers), and those utilized for various purposes including consumption and industrial use may be used. For example, the following may be used, either alone or in combinations of two or more.

Examples of saturated fatty acids include the same ones mentioned for aspect A, for example.

Surfactants include compounds having a chemical structure in which a hydrophilic substituent and a hydrophobic substituent are covalently bonded, and any ones utilized for a variety of purposes including consumption and industrial use may be used. For example, the following may be used, either alone or in combinations of two or more.

A surfactant used may be any anionic surfactant, nonionic surfactant, amphoteric ionic surfactant or cationic surfactant, but from the viewpoint of affinity with cellulose, an anionic surfactant or nonionic surfactant is preferred, and a nonionic surfactant is more preferred.

Examples of anionic surfactants include the same ones mentioned for aspect A, for example, any of which may be used either alone or in combinations of two or more.

Examples of nonionic surfactants include the same ones mentioned for aspect A, for example, any of which may be used either alone or in combinations of two or more.

Examples of amphoteric ionic surfactants include the same ones mentioned for aspect A, for example, any of which may be used either alone or in combinations of two or more.

Examples of cationic surfactants include the same ones mentioned for aspect A, for example, any of which may be used either alone or in combinations of two or more.

Surfactants that may be suitably used as organic components include not only those mentioned above, but also the same ones mentioned under <Specific preferred examples of surfactants> for aspect A, for example.

Among the above, from the viewpoint of affinity with cellulose, surfactants having polyoxyethylene chains, carboxylic acid groups or hydroxyl groups as hydrophilic groups are preferred, polyoxyethylene-based surfactants with polyoxyethylene chains as hydrophilic groups (polyoxyethylene derivatives) are more preferred, and nonionic polyoxyethylene derivatives are even more preferred. The polyoxyethylene chain length of a polyoxyethylene derivative is preferably 3 or greater, more preferably 5 or greater, even more preferably 10 or greater and most preferably 15 or greater. A longer chain length will increase the affinity with cellulose, but for balance with the coating property, it is preferably no greater than 60, more preferably no greater than 50, even more preferably no greater than 40, especially preferably no greater than 30 and most preferably no greater than 20.

When the cellulose is to be added to a hydrophobic resin (for example, a polyolefin or polyphenylene ether), it is preferred to use one having a polyoxypropylene chain instead of a polyoxyethylene chain as the hydrophilic group. The polyoxypropylene chain length is preferably 3 or greater, more preferably 5 or greater, even more preferably 10 or greater and most preferably 15 or greater. A longer chain length will increase the affinity with cellulose, but for balance with the coating property, it is preferably no greater than 60, more preferably no greater than 50, even more preferably no greater than 40, especially preferably no greater than 30 and most preferably no greater than 20.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater. When the resin is a polyolefin, a greater number of carbon atoms will increase affinity with the resin, and therefore no upper limit is set, but it is preferably no greater than 30 and more preferably no greater than 25.

Among these hydrophobic groups there are preferred those having a cyclic structure, or having a bulky polyfunctional structure, those with a cyclic structure including alkylphenyl ether-type, rosin ester-type, bisphenol A-type, β-naphthyl-type and styrenated phenyl-type groups, and those with a polyfunctional structure including hydrogenated castor oil-type groups.

More particularly preferred among these are rosin ester types and hydrogenated castor oil types.

In particular, among the animal and vegetable oils mentioned above, from the viewpoint of affinity and uniform coating with the cellulose surfaces, terpene oils, tall oils, rosins and their derivatives are preferred as organic components to cover the surfaces of the cellulose particles.

Specific examples of production of terpene oil (also known as terpentine oil), tall oil, rosins and rosin esters, and of alcohols to be used for their production, may be the same as mentioned for aspect A, for example.

The organic component may be an alkylphenyl-type compound, examples of which include the same ones mentioned for aspect A.

The organic component may also be a β-naphthyl-type compound, examples of which include the same ones mentioned for aspect A.

The organic component may also be a bisphenol A-type compound, examples of which include the same ones mentioned for aspect A.

The organic component may also be a styrenated phenyl-type compound, examples of which include the same ones mentioned for aspect A.

The organic component may also be a hydrogenated castor oil-type compound, examples of which include the same ones mentioned for aspect A.

According to a preferred aspect, the organic component is selected from the group consisting of rosin derivatives, alkylphenyl derivatives, bisphenol A derivatives, β-naphthyl derivatives, styrenated phenyl derivatives and hydrogenated castor oil derivatives. According to another preferred aspect, the organic component is a polyoxyethylene derivative.

<Content Ratio of Cellulose and Organic Component>

The cellulose formulation preferably includes 30 to 99 mass % of cellulose and 1 to 70 mass % of the organic component. By forming a composite of the cellulose and organic component, the organic component covers the surfaces of the cellulose particles by non-covalent chemical bonding such as hydrogen bonding or intermolecular forces, resulting in accelerated diffusion of the cellulose in the resin. If the contents of the cellulose and the organic component are within the ranges specified above, composite formation will be further promoted. The cellulose formulation more preferably includes the cellulose at 50 to 99 mass % and the organic component at 1 to 50 mass %, even more preferably it includes the cellulose at 70 to 99 mass % and the organic component at 1 to 30 mass %, yet more preferably it includes the cellulose at 80 to 99 mass % and the organic component at 1 to 20 mass %, and most preferably it includes the cellulose at 90 to 99 mass % and the organic component at 1 to 10 mass %.

<Method for Producing Cellulose Formulation>

A method for producing the cellulose formulation will now be described.

The method for producing the cellulose formulation is not particularly restricted and may be mixing of the cellulose starting material and the organic component followed by micronization (granulation), or adhesion of the organic component onto the cellulose particles obtained by micronization of the cellulose starting material, and drying, to cover at least portions of the cellulose particle surfaces with the organic component. Micronization of the cellulose starting material and covering with the organic component may also be carried out simultaneously.

For example, the cellulose formulation may be produced by kneading the cellulose starting material and the organic component. Specifically, the cellulose and organic component may be subjected to mechanical shear force in the kneading step, to cause micronization (granulation) of the cellulose as the organic component is composited on the cellulose surfaces. Moreover, a hydrophilic substance other than the organic component, as well as other additives, may be added in the kneading step. Drying may be performed after the kneading step if necessary. The cellulose formulation may be in undried form after the kneading step, or it may be dried afterwards.

A method of kneading using a kneading machine or the like, for example, may be used to apply the mechanical shear force. Examples of kneading machines to be used include kneaders, extruders, planetary mixers and Raikai mixers, which may be based on either a continuous or batch process. The temperature during kneading may be uncontrolled, or if heat is generated by compositing reaction and abrasion during kneading, the kneading may be carried out while removing the heat. The machine used may be of a single type, or two or more types may be used in combination.

The kneading temperature is preferably low from the viewpoint of minimizing deterioration of the organic component and helping to promote composite formation between the cellulose and organic component. The kneading temperature is preferably 0 to 100° C., more preferably no higher than 90° C., even more preferably no higher than 70° C., yet more preferably no higher than 60° C. and most preferably no higher than 50° C. In order to maintain the aforementioned kneading temperature under high energy conditions, it is preferred to carry out heat removal by jacket cooling, heat radiation or the like.

The solid content during kneading is preferably 20 mass % or greater. By kneading of a semi-solid high-viscosity kneaded blend, the kneading energy explained below is more readily transferred to the kneaded blend without causing the kneaded blend to become loose, and composite formation tends to be promoted. The solid content during the kneading is more preferably 30 mass % or greater, even more preferably 40 mass % or greater and yet more preferably 50 mass % or greater. There is no particular restriction on the upper limit for the solid content, but from the viewpoint of obtaining a satisfactory kneading effect and a more uniform kneaded state, it is preferably no greater than 90 mass %, more preferably no greater than 70 mass % and yet more preferably no greater than 60 mass %. In order to adjust the solid content to within this range, the timing of water addition may be addition of water in the necessary amount before the kneading step, addition of water during the kneading step, or both.

The kneading energy will now be explained. The kneading energy is defined as the electrical energy (Wh/kg) per unit mass of the kneaded blend. For production of the cellulose formulation, the kneading energy is preferably 50 Wh/kg or greater. If the kneading energy is at least 50 Wh/kg, the grinding property imparted to the kneaded blend will be high, and compositing between the cellulose and organic component will tend to be further promoted. The kneading energy is preferably 80 Wh/kg or greater, more preferably 100 Wh/kg or greater, even more preferably 200 Wh/kg or greater, yet more preferably 300 Wh/kg or greater and most preferably 400 Wh/kg or greater. A higher kneading energy is thought to further promote composite formation, but excessively high kneading energy requires very large industrial equipment, which will result in excessive equipment load. The upper limit for the kneading energy is therefore preferably 1000 Wh/kg.

The degree of composite formation is considered to be the proportion of bonding due to hydrogen bonding and intermolecular forces between the cellulose and organic component. Since aggregation between the cellulose molecules is prevented during kneading of the resin and the cellulose formulation as composite formation progresses, the dispersibility of the cellulose in the resin composition tends to increase.

Composite formation in the kneading step is preferably carried out under reduced pressure. When a water-containing wet cake is used as the cellulose starting material, the step is carried out under reduced pressure to take advantage of the hydrogen bonds in the water between the cellulose particles at the initial kneading stage and even further promote micronization of the particles. Also, discharging the water out of the system under reduced pressure as kneading further proceeds is efficient for promoting simultaneous cellulose micronization, dewatering, and coating of the organic component.

When the kneaded blend obtained by the kneading step described above is to be dried when preparing the cellulose formulation, a known drying method may be used, such as compartment tray drying, spray-drying, belt drying, fluidized bed drying, freeze-drying or microwave drying. When the kneaded blend is to be supplied to a drying step, preferably it is supplied to the drying step while maintaining the solid concentration in the kneading step, without adding water to the kneaded blend.

The water content of the dried cellulose formulation is preferably 1 to 20 mass %. A water content of no greater than 20 mass % will aid adhesion onto containers, and help prevent problems such as decay or cost-related problems for carrying and transport. A lower water content will also help avoid inclusion of voids caused by evaporation of water during mixing with the molten resin, and will tend to increase the physical properties (strength and dimensional stability) of the resin composite. On the other hand, a water content of 1 mass % or greater will minimize the risk of impairment of the dispersibility due to overdrying. The water content of the cellulose formulation is preferably no greater than 15 mass %, more preferably no greater than 10 mass %, yet more preferably no greater than 5 mass % and most preferably no greater than 3 mass %. The lower limit for the water content of the cellulose formulation is preferably 1.5 mass % or greater.

When the cellulose formulation is to be distributed on the market, it is preferably in the easily manageable form of powder, and therefore the cellulose formulation is preferably subjected to pulverizing treatment to a powder form. However, pulverizing is not necessary when spray-drying is used as the drying method, since drying and powdering are carried out simultaneously. When the cellulose formulation is to be pulverized, a known method using a cutter mill, hammer mill, pin mill, jet mill or the like may be employed. The extent of pulverization may be such that the pulverized product completely passes through a 1 mm aperture sieve. More preferably, it is pulverized so that it completely passes through a 425 μm aperture sieve and has a mean particle size (mass average particle size) of 10 to 250 μm. The obtained dry powder comprises aggregated fine particles of the cellulose formulation that form secondary aggregates. The secondary aggregates disintegrate when stirred in water, dispersing in the cellulose particles.

The apparent mass average particle size of the secondary aggregates is the 50% particle size of cumulative mass in the particle size distribution obtained by sifting 10 g of sample for 10 minutes using a Ro-Tap sieve shaker (for example, a Model-A Sieve Shaker by Gondaira Kousakujyo Corp.) and a JIS standard sieve (Z8801-1987).

<Dispersion Adjuvant>

The cellulose formulation may also contain a polysaccharide as a dispersion adjuvant, in addition to the cellulose particles and organic component. Adding a polysaccharide is preferred, as the affinity of the organic component on the cellulose particle surfaces will increase and dispersion of the cellulose particles in the resin will be promoted.

The following polysaccharides are preferred. Examples include water-soluble natural polysaccharides such as *psyllium* seed gum, karaya gum, carrageenan, alginic acid, sodium alginate, HM pectin, LM pectin, *Azotobacter vinelandii* gum, xanthan gum, gellan gum and carboxymethyl cellulose sodium. Of these anionic polysaccharides, carboxymethyl cellulose sodium (also referred to hereunder as "CMC-Na") and xanthan gum are preferred. These anionic polysaccharides may also be used in combinations of two or more.

<Carboxymethyl Cellulose Sodium>

CMC-Na is particularly preferred among the aforementioned anionic polysaccharides because it facilitates compositing with cellulose. The CMC-Na referred to here comprises Na cation and an anionic polymer in which all or some of the hydrogen atoms of the hydroxyl groups of the cellulose are replaced with —$CH_2COO$ groups (carboxymethyl groups), and it has a linear chemical structure with β-1,4-bonded D-glucose. CMC-Na can be obtained by a method of dissolving pulp (cellulose) in a sodium hydroxide solution and etherifying it with monochloroacetic acid (or its sodium salt).

In the cellulose formulation, it is preferred to add CMC-Na having a degree of substitution and viscosity adjusted to the ranges specified below, from the viewpoint of compositing with cellulose. The degree of substitution is the extent of ether bonding of carboxymethyl groups to hydroxyl groups in CMC-Na (three hydroxyl groups per unit of glucose), and it is preferably 0.6 to 2.0 per unit of glucose. If the degree of substitution is within this range, then CMC-Na with a higher degree of substitution is preferred as it will more greatly facilitate compositing with cellulose and increase the storage elastic modulus of the cellulose complex, and allow higher suspension stability to be exhibited even in aqueous solutions with high salt concentrations (for example, 10 mass % sodium chloride aqueous solutions). The degree of substitution is more preferably 0.9 to 1.3.

The degree of substitution is measured by the following method. First, 0.5 g of (anhydrous) sample is precisely weighed out and wrapped with filter paper, and then subjected to ashing in a magnetic crucible. After cooling, it is transferred to a 500 mL beaker, approximately 250 mL of water and 35 mL of 0.05 M sulfuric acid are added, and boiling is carried out for 30 minutes. The mixture is then cooled, a phenolphthalein indicator is added, the excess acid is back titrated with 0.1 M potassium hydroxide, and calculation is made by the following formula.

$$A=[(af-bf1)/[\text{anhydrous sample }(g)]]-[\text{alkalinity (or +acidity)}]$$

$$\text{Degree of substitution}=(162 \times A)/(10{,}000-80A)$$

where:
A: Amount (mL) of 0.05 M sulfuric acid consumed by alkali in 1 g of sample
a: Amount of 0.05 M sulfuric acid used (mL)
f: 0.05 M sulfuric acid titer
b: 0.1 M potassium hydroxide titer (mL)
f1: 0.1 M potassium hydroxide titer
162: Molecular weight of glucose
80: Molecular weight of $CH_2COONa$—H Alkalinity (or acidity) measurement method: 1 g of anhydrous sample is precisely measured out into a 300 mL flask, and approximately 200 mL of water is added to dissolve it. After adding 5 mL of 0.05 M sulfuric acid and boiling for 10 minutes, the mixture is cooled, a phenolphthalein indicator is added and titration is performed with 0.1 M potassium hydroxide (SmL). A blank test is simultaneously carried out (BmL), and calculation is made by the following formula.

$$\text{Alkalinity}=((B-S) \times f2)/\text{anhydrous sample }(g)$$

f2: 0.1 M potassium hydroxide titer. A (−) value for (B−S)×f2 is defined as acidity.

The viscosity of the CMC-Na is preferably no greater than 500 mPa·s in a 1 mass % purified water solution. The viscosity referred to here is measured by the following method. First, 1 mass % CMC-Na powder is dispersed in purified water using a high-shear homogenizer (for example, an "Excel Autohomogenizer ED-7", trade name of Nippon Seiki Co., Ltd.) under treatment conditions of rotational speed: 15,000 rpm×5 minutes, to prepare an aqueous solution. The obtained aqueous solution is then dispersed for 3 hours (and stored at 25° C.), after which it is set in a Brookfield viscometer (rotor rotational speed: 60 rpm) and allowed to stand for 60 seconds, and then rotated for 30 seconds and measured. The rotor may be modified as appropriate depending on the viscosity.

A lower viscosity of the CMC-Na will tend to promote compositing with the cellulose. Therefore, the viscosity of the CMC-Na added to the cellulose formulation is more preferably no greater than 200 mPa·s and even more preferably no greater than 100 mPa·s. No particular lower limit is set for the viscosity, but the preferred range is 1 mPa·s or greater.

<Mixing Ratio of Cellulose and Dispersion Adjuvant>

The cellulose formulation preferably includes 30 to 99 mass % of cellulose particles at least portions of the surfaces of which are covered by the organic component, and 1 to 70 mass % of a dispersion adjuvant, more preferably it includes 50 to 99 mass % of the cellulose particles and 1 to 50 mass % of a dispersion adjuvant, even more preferably it includes 70 to 99 mass % of the cellulose particles and 1 to 30 mass % of a dispersion adjuvant, yet more preferably it includes 80 to 99 mass % of the cellulose particles and 1 to 20 mass % of a dispersion adjuvant, and most preferably it includes 90 to 99 mass % of the cellulose particles and 1 to 10 mass % of a dispersion adjuvant.

The dispersion adjuvant may be added at the time the cellulose formulation is obtained, or it may be added when the cellulose formulation is added to the resin and before a composite is obtained. Adding it when the cellulose formulation is obtained is preferred in order to reduce the amount of organic component added and to exhibit the desired effect with a smaller amount. The method of addition may be freely selected, such as a method of addition to the cellulose starting material or cellulose particles together with the organic component, successive addition after addition of the organic component, or successive addition of the organic component after addition of the dispersion adjuvant. In the case of successive addition, the first addition of the organic component and dispersion adjuvant may be followed by drying.

[Resin Composition]

The resin composition according to one aspect of the invention may be a composition having the aforementioned cellulose formulation dispersed in a resin.

<Resin>
<Type of Resin>

The resin in which the cellulose formulation is to be dispersed is not particularly restricted, and various different types may be used. For example, by using a thermoplastic resin as the resin in which the cellulose formulation is dispersed, it is possible to obtain a thermoplastic resin composition using cellulose that originally has no thermoplasticity.

The thermoplastic resin in which the cellulose formulation is to be dispersed is preferably one that can be melt kneaded/extruded at a temperature of 250° C. or below, from the viewpoint of preventing browning or aggregation due to decomposition of the cellulose particles during production of the resin composition or during production of molded articles using the resin composition. Examples of such thermoplastic resins include polyolefins such as polyethylene and polypropylene; elastomers such as ABS, ethylene-vinyl acetate copolymer, ethylene-ethyl acrylate copolymer and ethylene-propylene rubber; and such resins that have been modified.

As polyolefins there may be used olefin resins, elastomers and the like. There may also be used resins produced using single-site catalysts such as metallocene catalysts.

As olefin resins, excluding the elastomers mentioned below, there may be used polyethylenes such as low-density polyethylene (LDPE), high-density polyethylene (HDPE), ethylene-α-olefin copolymer, ethylene-vinyl acetate copolymer and ethylene-vinyl chloride copolymer; polypropylenes such as polypropylene (PP) and polypropylene-α-olefin copolymer; polypentenes such as poly-1-butene and poly-4-methyl-1-pentene; and mixtures of the foregoing.

As elastomers there may be used rubber components such as natural rubber (NR), synthetic isoprene rubber (IR), styrene-butadiene rubber (SBR), acrylonitrile-butadiene rubber (NBR), ethylene-propylene-diene terpolymer (EPDM), chloroprene (CR), halobutyl rubber (XIIR), butyl rubber (IIR) and thermoplastic elastomer (TPO), as well as mixtures of the same.

These resins may be used alone or in combinations of two or more. From the viewpoint of the strength of the resin, polypropylene is preferred among those mentioned above.

<Resin Content>

The content of the resin in the resin composition is preferably between 70 mass % and 98 mass %, inclusive, with respect to the resin composition. If the resin content is 70 mass % or greater, the obtained resin composition will tend to have satisfactory moldability and thermoplasticity, and if it is 98 mass % or lower, the dispersibility of the crystalline cellulose fine powder will tend to be satisfactory. The resin content is more preferably between 75 mass % and 90 mass %, inclusive.

<Cellulose Formulation Content>

The content of the cellulose formulation in the resin composition is preferably 1 mass % and more preferably between 1 mass % and 50 mass %, inclusive, with respect to the resin composition. If the cellulose formulation content is 1 mass % or greater, the strength and impact resistance of the obtained molded article will tend to be satisfactory. If it is 50 mass % or lower, the strength and elastic modulus of the obtained molded article will tend to be satisfactory. The cellulose formulation content is more preferably no greater than 30 mass %, even more preferably no greater than 25 mass %, yet more preferably no greater than 20 mass % and most preferably no greater than 15 mass %.

<Interface-Forming Agent>

When the cellulose formulation is to be added to a resin, it is preferred to add an interface-forming agent that produces strong adhesion at the interface between the cellulose and the resin, in order to obtain more excellent dynamic properties (low linear expansion coefficient, strength, elongation). The interface-forming agent may be any substance having both groups with affinity for the hydrophilic crystalline cellulose and groups with affinity for the hydrophobic resin component in the molecule, and it may be a polymer such as a resin or a "low molecular compound". For example, the resin composition may contain a resin having a polar functional group in part of the structure as the interface-forming agent. Examples of resins having polar functional groups in part of the structure include modified polyolefin resins, polyamide, polyester, polyacetal and acrylic resins, and the like. When the interface-forming agent is a resin, the interface-forming agent in the resin composition constitutes part of the resin component.

Preferred modified polyolefin resins are resins having carboxylic acid residues and (meth)acrylic acid compounds graft modified onto polyolefins. An unsaturated carboxylic acid to be used for graft modification is an unsaturated hydrocarbon with a carboxyl group. Their derivatives include anhydrides. Preferred examples of unsaturated carboxylic acids and their derivatives include fumaric acid, maleic acid, itaconic acid, citraconic acid, aconitic acid and their anhydrides, and methyl fumarate, ethyl fumarate, propyl fumarate, butyl fumarate, dimethyl fumarate, diethyl fumarate, dipropyl fumarate, dibutyl fumarate, methyl malate, ethyl malate, propyl malate, butyl malate, dimethyl malate, diethyl malate, dipropyl malate and dibutyl malate, with itaconic anhydride and maleic anhydride being more preferred. A (meth)acrylic acid compound is a compound including at least one (meth)acryloyl group in the molecule. Examples of (meth)acrylic acid compounds include (meth)acrylic acid, methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate and acrylamide. The olefin used here may be polyethylene or polypropylene, and the structure and molecular weight may be freely selected for compatibility with the base polymer of the composite.

As polyamides there may be used any "n-nylon" synthesized by polycondensation reaction of an ω-amino acid, and "n,m-nylon" synthesized by co-condensation polymerization reaction of a diamine and a dicarboxylic acid (where n and m are indices for the number of carbon atoms of the monomer component). For example, "n-nylon" (polycondensation product) may be nylon 6, nylon 11 or nylon 12-lauryllactam (C12), and "n,m-nylon" (co-condensation polymerization product) may be nylon 66, nylon 610, nylon 6T, nylon 61, nylon 9T, nylon MST, nylon 612, Kevlar (p-phenylenediamine+terephthalic acid copolycondensate) or Nomex (m-phenylenediamine+isophthalic acid copolycondensate).

A polyester may be a polycondensation product of a polybasic carboxylic acid (dicarboxylic acid) and a polyalcohol (diol). For example, polybasic carboxylic acid (dicarboxylic acid) components include terephthalic acid and 2,6-naphthalenedicarboxylic acid, and polyhydric alcohol (diol) components include ethylene glycol, 1,3-propanediol, 1,4-butanediol and 1,4-cyclohexanedimethanol, and polycondensates of these may also be used.

A polyacetal may be a homopolymer, random copolymer (polyoxymethylene-oxymethylene random copolymer) or blocked copolymer (polyoxymethylene-alkyl blocked copolymer).

An acrylic resin may be a polymer of an acrylic acid ester or methacrylic acid ester.

These interface-forming agents may be used alone or as mixtures of two or more, in which case the mixing ratio may be freely set.

When the resin as the base polymer is a polyolefin, for example, the interface-forming agent used is preferably an acid modified polyolefin and/or polyamide. An acid modified polyolefin is preferably a maleic acid-modified polyolefin such as maleic acid-modified polypropylene, and when the base polymer is polypropylene, maleic acid-modified polypropylene is preferably used. Because maleic acid residue has high affinity with the interface on the cellulose side, and polypropylene residue is compatible with the base polymer, it is possible to cause firm bonding at the interface of the resin composition and to increase the dimensional stability and strength, as well as the elongation, of the obtained resin composition.

The polyamide used here is preferably n-nylon. When the base polymer is polypropylene, it is preferred to use nylon 6. Since nylon itself has a rigid polymer molecular chain and the peptide residues have high affinity for cellulose surfaces, it can impart dimensional stability and strength to the resin composition.

The amount of interface-forming agent added may be an amount sufficient to molecularly cover the cellulose surfaces, and for example, it may be 1 part by mass or greater with respect to 100 parts by mass of the cellulose. It is preferably 5 parts by mass or greater, more preferably 10 parts by mass or greater, even more preferably 15 parts by mass or greater and most preferably 20 parts by mass or greater. While it is not essential to set an upper limit for the amount of interface-forming agent added, it is preferably no greater than 50 parts by mass with respect to 100 parts by mass of the cellulose, in consideration of balance between the workability and durability of the resin composition.

In order to increase the dimensional stability, the amount of interface-forming agent added is preferably, for example, 1 part by mass or greater, more preferably 5 parts by mass or greater, even more preferably 10 parts by mass or greater, yet more preferably 15 parts by mass or greater and most preferably 20 parts by mass or greater, with respect to 100 parts by mass of the cellulose in the cellulose formulation or resin composition. While it is not essential to set an upper limit for the amount of interface-forming agent added, it is preferably no greater than 50 parts by mass with respect to 100 parts by mass of the cellulose, in consideration of balance between the workability and durability of the resin composition.

In order to increase the strength, the amount of interface-forming agent added is preferably, for example, 10 parts by mass or greater, more preferably 50 parts by mass or greater, even more preferably 100 parts by mass or greater, yet more preferably 150 parts by mass or greater and most preferably 200 parts by mass or greater, with respect to 100 parts by mass of the cellulose in the cellulose formulation or resin composition. While it is not essential to set an upper limit for the amount of interface-forming agent added, it is preferably no greater than 500 parts by mass with respect to 100 parts by mass of the cellulose, in consideration of balance between the workability and durability of the resin composition.

The interface-forming agent may be added during the process of producing the cellulose formulation, or it may be added when the cellulose formulation is added to the resin to obtain the resin composition. Adding it when the cellulose formulation is obtained is preferred in order to reduce the amount of interface-forming agent added and to exhibit the desired effect with a smaller amount. The method of addition is not particularly restricted, and it may be added together with the other additives such as the dispersing agent, it may be added successively after the other additives have been added, or the other additives may be successively added after addition of the interface-forming agent.

<Dispersing Agent>

The resin composition may also include a dispersing agent such as a surfactant, surface treatment agent or inorganic filler. A dispersing agent has the function of mediating between the cellulose formulation and the resin, improving the compatibility between them. That is, it has the function of satisfactorily dispersing the cellulose particles in the resin composition without aggregation, rendering the entire resin composition homogeneous. Thus, the dispersing agent to be added in the resin composition is not particularly restricted so long as it can homogeneously disperse the cellulose particles in the resin composition. Suitable dispersing agents to be used include publicly known surfactants, surface treatment agents and inorganic fillers that have affinity at least with both the cellulose particles and the resin. The surfactant and surface treatment agent may each be an organic component having a static surface tension of 20 mN/m or higher and a higher boiling point than water.

The content of the dispersing agent in the resin composition is preferably between 1 mass % and 20 mass %, inclusive. If the dispersing agent content is 1 mass % or greater, the dispersibility of the cellulose particles in the resin composition will tend to be satisfactory, and if it is 20 mass % or lower, it will tend to be possible maintain satisfactory strength for the molded article obtained from the resin composition. The content of the dispersing agent in the resin composition is more preferably between 5 mass % and 15 mass %, inclusive. Since the aforementioned organic components having a static surface tension of 20 mN/m or greater and a higher boiling point than water also function as dispersing agents, the content of the dispersing agent is the amount including those organic components as well.

Examples of surfactants include higher fatty acids and their salts, such as stearic acid and calcium, magnesium or zinc salts of stearic acid; higher alcohols and higher polyhydric alcohols such as stearyl alcohol, stearic glyceride and polyethylene glycol; and various other fatty acid esters such as polyoxyethylene sorbitan monostearate. Stearic glyceride is preferred among these.

Examples of surface treatment agents include non-reactive silicone oils such as dimethylsilicone oil and higher fatty acid ester-modified silicone oils; reactive silicone oils such as epoxy-modified silicone oil, carbinol-modified silicone oil and carboxyl-modified silicone oil; and N-lauryl-D,L-aspartate-β-lauryl ester.

Inorganic fillers include metal elements of Group I to Group VIII of the Periodic Table, examples of which include simple elemental Fe, Na, K, Cu, Mg, Ca, Zn, Ba, Al, Ti and Si, their oxides, hydroxides, carbon salts, sulfates, silicates and sulfites, and various viscous minerals composed of such compounds, and more specific examples include barium sulfate, calcium sulfate, magnesium sulfate, sodium sulfate, calcium sulfite, zinc oxide, silica, (heavy) calcium carbonate, aluminum borate, alumina, iron oxide, calcium titanate, aluminum hydroxide, magnesium hydroxide, calcium hydroxide, magnesium carbonate, calcium silicate, clay, wollastonite, glass beads, glass powder, silica sand, silica, quartz powder, diatomaceous earth and white carbon.

As dispersing agents to be added to the resin composition there may be used any one or combination of two or more of those mentioned above. Of those mentioned above, the dispersing agent to be added to the resin composition is preferably (heavy) calcium carbonate.

<Other Additives>

The resin composition may also contain, in addition to the cellulose formulation or resin, and the interface-forming agent and dispersing agent, also other components as necessary, within ranges that do not interfere with the effect of the invention. Examples of such other components include antioxidants, metal inactivating agents, flame retardants (organic phosphate-based compounds, inorganic phosphorus-based compounds, aromatic halogen-based flame retardants, silicone-based flame retardants and the like), fluorine-based polymers, plasticizers (oils, low molecular weight polyethylene, epoxidized soybean oil, polyethylene glycol, fatty acid esters and the like), flame-retardant aids such as antimony trioxide, weather (and light) resistance improvers, nucleating agents for polyolefins, slip agents, inorganic and organic fillers and reinforcing materials (glass fibers, carbon fibers, polyacrylonitrile fibers, whiskers, mica, talc, carbon black, titanium oxide, calcium carbonate, potassium titanate, wollastonite, conductive metal fibers, conductive carbon black and the like), various coloring agents, and release agents. The contents of such other components are preferably no greater than 10 mass %, more preferably no greater than 8 mass % and even more preferably no greater than 5 mass % with respect to the total resin composition.

The resin composition according to one aspect of the invention may include the cellulose formulation as described above, but according to another aspect, the resin composition may include the aforementioned thermoplastic resin, the aforementioned cellulose particles and the aforementioned organic component having a static surface tension of 20 mN/m or greater and a higher boiling point than water. According to a preferred aspect, the resin composition may include the thermoplastic resin, the cellulose particles, the organic component having a static surface tension of 20 mN/m or greater and a higher boiling point than water, and the aforementioned interface-forming agent at 1 part by mass or greater with respect to 100 parts by mass of the cellulose in the resin composition. According to this aspect, preferably the amount of cellulose is 30 to 99 mass % and the amount of organic component is 1 to 70 mass %, with respect to 100 mass % as the total of all the cellulose and the amount of organic component in the resin composition.

<Method for Producing Resin Composition>

The method for producing the resin composition is not particularly restricted, and any of various methods used to disperse inorganic particles and the like in resins may be selected as appropriate.

The resin composition may be produced, for example, by a method of hot melting the resin or the mixture of the resin and interface-forming agent, adding the cellulose formulation (or the combination of cellulose particles and organic component) and a dispersing agent, and then melt kneading them together. Alternatively, the resin composition may be produced by a method of supplying the starting material for the resin or the starting materials for the resin and interface-forming agent to an extruder and melting them, while supplying the cellulose formulation (or the combination of cellulose particles and organic component) and the dispersing agent through an intermediate port of the extruder, to mix and disperse them in the extruder. Examples of extruders include single-screw extruders, twin-screw extruders, rolls, kneaders, Brabender plastographs and Banbury mixers. A melt kneading method using a twin-screw extruder is preferred among these, from the viewpoint of achieving adequate kneading.

The melt kneading temperature for production of the resin composition will differ depending on the components used and therefore is not particularly restricted, but generally a temperature of between 50 to 250° C. may be selected, and in most cases it will be in the range of 200° C. to 250° C. The other production conditions applied may be commonly employed conditions.

The resin composition may be in various forms such as mentioned for aspect A (that is, as resin pellets, a sheet, fibers, a plate, rods or the like). The resin composition may be formed into the molded shape of a part, by using different molding methods such as injection molding, extrusion molding or blow molding. When a thermoplastic resin is used as the resin, the obtained molded article has thermoplasticity, as well as strength, elastic modulus and impact resistance that are almost impossible to obtain with molded articles formed from thermoplastic resins alone, while the molded article also exhibits satisfactory surface properties, including lack of roughness or aggregates.

It is a particular feature of the resin composition according to one aspect of the invention that cellulose particles are added, resulting in an excellent flow property (melt flow rate: MFR) being exhibited when the resin is melted. Thus, when the molten resin is injection molded, it is possible to easily mold it into even complex shapes, using an ordinary die at low pressure. This feature is achieved because the cellulose particles are microdispersed in the resin. By microdispersing cellulose particles (and also cellulose fibers, when present) in a resin matrix, the network structure of the cellulose particles (and also cellulose fibers, when present) subsumes the resin, and the network structure exhibits a thixotropic property when the resin is melted. The flow property is improved because the cellulose serves the role of a roller (pulley) in the resin composition. According to a preferred aspect, the aforementioned properties are exhibited even more readily when the mean polymerization degree, mean particle size (volume-average particle size and mass average particle size), fiber length and fiber width, L/D, and/or zeta potential of the cellulose dispersed in the resin are appropriately controlled to within the ranges of the present disclosure.

EXAMPLES

The present invention will now be further explained by examples, with the understanding that these examples are in no way limitative on the invention.

Example A

[Starting Materials and Evaluation Methods]
The starting materials and evaluation methods used will now be explained.
<Thermoplastic Resin>
Polyamide
Polyamide 6 (hereunder referred to simply as "PA")
Available as "UBEnylon 1013B" by Ube Industries, Ltd.
Carboxyl terminal group ratio: ([COOH]/[total terminal groups])=0.6
Polypropylene
Homopolypropylene (hereunder referred to simply as "PP")
Available as "Prime Polypro J105B" by Prime Polymer Co., Ltd.
MFR=9.0 g/10 min, measured at 230° C. according to ISO1133.
Maleic acid-modified polypropylene (hereunder referred to simply as "MPP")
Available as "UMEX 1001" by Sanyo Chemical Industries, Ltd.
MFR=230 g/10 min, measured at 230° C. according to ISO1133.
<Cellulose Component>
Cellulose whiskers (hereunder referred to simply as "CW")
Commercially available DP pulp (mean polymerization degree: 1600) was cut and hydrolyzed at 105° C. for 30 minutes in 10% aqueous hydrochloric acid. The obtained acid-insoluble residue was filtered, rinsed and pH-adjusted to prepare a crystalline cellulose dispersion with a solid concentration of 14 wt % and a pH of 6.5. The crystalline cellulose dispersion was spray-dried to obtain dried crystalline cellulose. Next, the obtained dried product was supplied to an air flow-type pulverizer (Model STJ-400 by Seishin Enterprise Co., Ltd.) at a feed rate of 10 kg/hr, and pulverized to obtain cellulose whiskers as crystalline cellulose fine powder. The properties of the obtained cellulose whiskers were evaluated by the following methods. The results are shown below.
L/D=1.6
Mean diameter=200 nm
Degree of crystallinity=78%
Degree of polymerization=200
Zeta potential=−20 mV
Cellulose fibers A (hereunder referred to simply as "CF-A")
After cutting linter pulp, an autoclave was used to heat it for 3 hours in hot water at 120° C. or higher to remove the hemicellulose portion and obtained refined pulp, which was pressed and beat into highly chopped fibers and fibrils to a solid content of 1.5 wt % in purified water, and then defibrated with a high-pressure homogenizer (10 times at an operating pressure of 85 MPa) at the same concentration to obtain defibrated cellulose. For the beating treatment, a disc refiner was used for 4 hours of treatment with a high-cutting beating blade (hereunder referred to as "cutting blade"), and then a high-defibrating beating blade (hereunder referred to as "defibrating blade") was used for another 1.5 hours of beating to obtain cellulose fibers A. The properties of the obtained cellulose fibers were evaluated by the following methods. The results are shown below.
L/D=300
Mean fiber size=90 nm
Degree of crystallinity=80%
Degree of polymerization=600
Zeta potential=−30 mV
Cellulose fibers B (hereunder referred to simply as "CF-B")
Cellulose fibers B were obtained under the same conditions as CF-A, except that the beating conditions were a processing time of 2.5 hours with the cutting blade followed by a processing time of 2 hours with the defibrating blade.
L/D=450
Mean fiber size=100 nm
Degree of crystallinity=80%
Degree of polymerization=600
Zeta potential=−30 mV
Cellulose fibers C (hereunder referred to simply as "CF-C")
Linter pulp was subjected to micronization treatment for a total of 8 times using an ATOMZ dry grinder by Ishikawa Soken Co., Ltd., to prepare cellulose fine powder. The refined pulp under the production conditions for CF-A was exchanged with the obtained cellulose fine powder, and was then subjected to the same beating treatment, high-pressure homogenizer treatment and hydrophobic treatment as for production of CF-A, to obtain cellulose fibers C.
L/D=150
Mean fiber size=90 nm
Degree of crystallinity=65%
Degree of polymerization=450
Zeta potential=−30 mV
Cellulose fibers D (hereunder referred to simply as "CF-D")
Acetic acid bacteria were cultured to obtain cellulose nanofibers. The culturing was under standard conditions, and Hestrin-Schramm culture medium ("Cellulose Dictionary", Cellulose Gakkai, ed., Asakura Publishing, 2000, p 44) was used for stationary culturing several times in a plastic vat with inner dimensions of 40 cm width×60 cm length×15 cm height, for 8 days at pH 6, 28° C. using fructose as the carbon source. The obtained semi-transparent gel with a thickness of about 15 mm was cut into a die shape and then loaded into a pressure-resistant bacteriolysis tank (volume: 2 m$^3$), and bacteriolysis was carried out at 120° C. for 1 hour while immersed in 2 wt % aqueous sodium hydroxide.
After further rinsing the obtained wet gel, bacteriolysis was repeated under the same conditions as before, and the obtained wet gel was diluted with 4° C. cold water in a washing tank (volume: 2 m$^3$) to a cellulose solid content of about 0.5 wt % and subjected to dispersion treatment for about 10 minutes with a Disper homomixer mounted inside the tank, and then pressure filtered to obtain a concentrate. Dispersion and concentration steps, comprising dilution to a solid content of about 0.5 wt % in 4° C. cold water in a washing tank in the same manner and dispersion treatment for about 10 minutes with a homomixer, followed by concentration by pressure filtration, were repeated 3 times to obtain purified cellulose fibers D.
L/D=1400
Mean fiber size=90 nm
Degree of crystallinity=93%
Degree of polymerization=2700
Zeta potential=−30 mV

TABLE A1

| | Unit | CW | CF-A | CF-B | CF-C | CF-D |
|---|---|---|---|---|---|---|
| L/D | — | 1.6 | 300 | 450 | 150 | 1400 |
| Mean polymerization degree | — | 200 | 600 | 600 | 450 | 2700 |
| Crystalline form | — | Type I | Type I | Type I | Type I | Type I |
| Degree of crystallinity | % | 78 | 80 | 80 | 65 | 93 |
| Particle diameter | nm | 200 | 90 | 100 | 90 | 90 |

<Degree of polymerization of cellulose component>

This was measured by a reduced relative viscosity method using a copper-ethylenediamine solution, as specified in Crystalline Cellulose Verification Test (3) of "Japanese Pharmacopeia, 14th Edition (Hirokawa Shoten)".

<Crystalline Form and Degree of Crystallinity of Cellulose Component>

An X-ray diffraction device (Multipurpose X-ray diffraction device by Rigaku Corp.) was used to measure the diffraction image by a powder method (ordinary temperature), and the degree of crystallinity was calculated by the Segal method. The crystalline form was also measured from the obtained X-ray diffraction image.

<L/D of Cellulose Component>

A 1 mass % concentration purified water suspension of the cellulose component was prepared and dispersed with a high-shear homogenizer (for example, an "Excel Autohomogenizer ED-7", trade name of Nippon Seiki Co., Ltd., processing conditions: rotational speed=15,000 rpm×5 minutes) to produce an aqueous dispersion which was diluted with purified water to 0.1 to 0.5 mass %, and this was cast onto mica and air-dried, the ratio (L/D) was determined for the long diameter (L) and short diameter (D) of a particle image obtained under measurement with an atomic force microscope (AFM), and the value was converted to the average value for 100 to 150 particles.

<Mean Diameter of Cellulose Component>

The cellulose component was kneaded as a 40 mass % solid in a planetary mixer ("5DM-03-R", trade name of Shinagawa Machinery Works Co., Ltd., hook-type stirring blade) for 30 minutes at 126 rpm, room temperature, ordinary pressure. Next, a purified water suspension was prepared to a 0.5 mass % solid content, a high-shear homogenizer ("Excel Autohomogenizer ED-7", trade name of Nippon Seiki Co., Ltd. treatment conditions: rotational speed=15,000 rpm×5 minutes) was used for dispersion, and centrifugal separation was carried out (centrifugation for 10 minutes with a "Model 6800 Centrifugal Separator", trade name of Kubota Corp., Rotor type Model RA-400, under treatment conditions of centrifugal force: 39,200 m²/s, obtaining the resulting supernatant, and further centrifugation at 116,000 m²/s for 45 minutes). The supernatant liquid after centrifugation was used to measure the 50% cumulative particle diameter (volume-average particle size) in the volume frequency particle size distribution obtained by a laser diffraction/scattering method-based particle size distribution meter ("LA-910", trade name of Horiba, Ltd., ultrasonic treatment for 1 minute, refractive index: 1.20), and the value was used as the mean diameter.

<Zeta Potential of Cellulose Component>

The cellulose component was prepared in a 1 mass % concentration purified water suspension, an aqueous dispersion obtained by dispersion using a high-shear homogenizer ("Excel Autohomogenizer ED-7", trade name of Nippon Seiki Co., Ltd., treatment conditions: rotational speed=15,000 rpm×5 minutes) was diluted with purified water to 0.1 to 0.5 mass %, and a zeta potentiometer (Model ELSZ-2000ZS by Otsuka Electronics Co., Ltd., standard cell unit) was used for measurement at 25° C.

<Organic Component>

The organic components used were the following.

Rosin ethylene oxide addition product (rosin-polyethyleneglycol ester, trade name: "REO-15" by Harima Chemicals, Inc., static surface tension: 39.7 mN/m, SP value: ≥7.25, boiling point: >100° C. at ordinary pressure): hereunder referred to simply as "rosin ester".

Liquid paraffin (product of Wako Pure Chemical Industries, Ltd., special grade, static surface tension: 26.4 mN/m, boiling point: >100° C.)

Tall oil fatty acid (trade name "HARTALL SR-30" BY Harima Chemicals, Inc., static surface tension: 30.2 mN/m, SP value: ≥7.25, boiling point: >100° C. at ordinary pressure): hereunder referred to simply as "tall oil".

Terpene oil (trade name "Terpineol" by Yasuhara Chemical Co., Ltd., static surface tension: 33.2 mN/m, SP value: ≥7.25, boiling point: >100° C. at ordinary pressure)

Glycerin (static surface tension: 63.4 mN/m, boiling point: >100° C. at ordinary pressure)

Ethanol (product of Wako Pure Chemical Industries, Ltd., special grade, static surface tension: 22.3 mN/cm, SP value: ≥12.58, boiling point: 78.4° C. at ordinary pressure)

Polyoxyethylene alkylphenyl ether (BLAUNON N-515 by Aoki Oil Industrial Co., Ltd., static surface tension: 34.8 mN/m, dynamic surface tension: 40.9 mN/m, boiling point: >100° C. at ordinary pressure): hereunder referred to simply as "alkylphenyl ether".

Polyoxyethylene styrenated phenyl ether (BLAUNON KTSP-16 by Aoki Oil Industrial Co., Ltd., static surface tension: 39.0 mN/m, dynamic surface tension: 55.8 mN/m, boiling point: >100° C. at ordinary pressure): hereunder referred to simply as "styrenated phenyl ether".

Polyoxyethylene β-naphthyl ether (BLAUNON BN-10 by Aoki Oil Industrial Co., Ltd., static surface tension: 48.2 mN/m, dynamic surface tension: 51.7 mN/m, boiling point: >100° C. at ordinary pressure): hereunder referred to simply as "β-naphthyl ether".

Polyoxyethylene bisphenol A ether (BLAUNON BEO-17.5 by Aoki Oil Industrial Co., Ltd., static surface tension: 49.5 mN/m, dynamic surface tension: 53.1 mN/m, boiling point: >100° C. at ordinary pressure).

Polyoxyethylene hydrogenated castor oil ether (BLAUNON RCW-20 by Aoki Oil Industrial Co., Ltd., static surface tension: 42.4 mN/m, dynamic surface tension:

52.9 mN/m, boiling point: >100° C. at ordinary pressure): hereunder referred to simply as "hydrogenated castor oil ether".

Polyoxyethylene straight-chain alkyl ether (BLAUNON CH-315L by Aoki Oil Industrial Co., Ltd., static surface tension: 36.7 mN/m, dynamic surface tension: 62.6 mN/m, boiling point: >100° C. at ordinary pressure): hereunder referred to simply as "straight-chain alkyl ether".

Polyoxyethylene phytosterol ether (NIKKOL BPS-20 by Nikko Chemicals Co., Ltd., static surface tension: 51.3 mN/m, dynamic surface tension: 65.7 mN/m, boiling point: >100° C. at ordinary pressure): hereunder referred to simply as "phytosterol".

was dissolved or dispersed in ion-exchanged water to 5 mass % to prepare a measuring liquid, and 100 mL of the solution or dispersion was charged into a 100 mL-volume glass beaker and adjusted to a temperature of 25° C.±1° C., and the subsequently measured value was used. The dynamic surface tension was calculated by the following formula. σ=ΔP·r/2. Here, σ: dynamic surface tension, ΔP: differential pressure (maximum pressure−minimum pressure), r: capillary radius.

<Measurement of SP Value of Organic Component>

The SP value was determined by dropping 1 mL of each sample into 10 mL of a solvent with a known SP value, listed in the following table, at room temperature and stirring for

TABLE A2

| Units | Measured property | | | | | | | |
|---|---|---|---|---|---|---|---|---|
| | Static surface tension mN/m | Dynamic surface tension mN/m | Number of hydrophobic group carbons — | Hydrophobic group cyclic structure — | Hydrophilic group structure — | Number of hydrophilic group residues — | SP value | Boiling point |
| Straight-chain alkyl ether | 36.7 | 62.6 | 16 | No | Polyoxyethylene | 15 | | >100° C. |
| Phytosterol | 51.3 | 65.7 | 29 | Yes | Polyoxyethylene | 20 | | >100° C. |
| Rosin ester | 39.7 | 48.1 | 20 | Yes | Polyoxyethylene | 15 | ≥7.25 | >100° C. |
| Alkylphenyl ether | 34.8 | 40.9 | 15 | Yes | Polyoxyethylene | 15 | | >100° C. |
| Styrenated phenyl ether | 39.0 | 55.8 | 22 | Yes | Polyoxyethylene | 16 | | >100° C. |
| β-Naphthyl ether | 48.2 | 51.7 | 10 | Yes | Polyoxyethylene | 10 | | >100° C. |
| Bisphenol A ether | 49.5 | 53.1 | 15 | Yes | Polyoxyethylene | 17.5 | | >100° C. |
| Hydrogenated castor oil ether | 42.4 | 52.9 | 57 | No | Polyoxyethylene | 20 | | >100° C. |
| Liquid paraffin | 26.4 | — | 24 | No | — | — | | >100° C. |
| Tall oil | 30.2 | — | 16-18 | No | Carboxylic acid | 1 | ≥7.25 | >100° C. |
| Terpene oil | 33.2 | — | 9-10 | Yes | Hydroxyl | 1 | ≥7.25 | >100° C. |

<Measurement of Static Surface Tension>

Using each organic component, the static surface tension was measured by the Wilhelmy method using an automatic surface tension measuring apparatus (for example, a "Model CBVP-Z", trade name of Kyowa Interface Science Co., Ltd., with use of accessory glass cell). Since the organic components used in the examples and comparative examples were liquid at ordinary temperature, they were charged in to a height of 7 mm to 9 mm from the bottom of the accessory stainless steel dish up to the liquid level, and after adjusting the temperature to 25° C.±1° C., measurement was performed and calculation was made by the following formula. γ=(P−mg+shpg)/L cos θ. Here, P: balancing force, m: plate mass, g: gravitational constant, L: plate circumferential length, θ: contact angle between plate and liquid, s: plate cross-sectional area, h: sunken depth from liquid level (until forces balanced), p: liquid density (1, since the organic components used in the examples and comparative examples had densities of 1±0.4 g/mL).

For solids at ordinary temperature, they were heated to their melting point or above for melting and then adjusted to a temperature of melting point+5° C., and the surface tension was measured by the Wilhelmy method described above.

<Measurement of Dynamic Surface Tension>

Each organic component was used for measurement of the dynamic surface tension with a dynamic surface tension meter (Theta Science Model t-60, product name of Eko Instruments, probe (capillary TYPE I (made of PEEK resin), single mode)) by the maximum bubble pressure method, using an air bubble generation cycle of 10 Hz. Each organic component used in the examples and comparative examples 1 hour with a stirrer, and then calculating the value from the range of SP values of the solvent in which dissolution took place without phase separation.

<Tensile Yield Strength Increase Ratio>

An injection molding machine was used to cast a multi-purpose test piece conforming to ISO294-3.

For polypropylene-based materials this was carried out under conditions according to JIS K6921-2.

For polyamide-based materials it was carried out under conditions according to JIS K6920-2.

The tensile yield strengths of the resin starting material (that is, the thermoplastic resin alone) and the resin composition (that is, the cellulose-containing resin composition) were measured according to ISO527, and the tensile yield strength of the cellulose-containing resin composition was divided by the tensile yield strength of the resin starting material to calculate the tensile yield strength increase ratio.

Since polyamide-based materials undergo changes due to moisture absorption, these were stored in an aluminum moisture-proof bag immediately after casting to minimize moisture absorption.

<Coefficient of Variation of Tensile Break Strength>

Using multipurpose test pieces conforming to ISO294-3, the tensile break strengths were measured according to ISO527, for n=15, and the obtained data were used to calculate the coefficient of variation (CV) based on the following formula.

$$CV = (\sigma/\mu) \times 100$$

In the formula, a represents standard deviation and μ represents the arithmetic mean of the tensile break strength.

<Linear expansion coefficient>

Measurement was performed according to ISO11359-2, in a measuring temperature range of −10 to 80° C., using a 4 mm long, 4 mm wide, 4 mm length cuboid measuring sample cut out with a precision cutting saw from the center section of each multipurpose test piece, and the expansion coefficients between 0° C. and 60° C. were calculated. Before the measurement, it was stationed for 5 hours in an environment at 120° C. for annealing.

<Flow Property (Minimum Filling Pressure)>

The minimum filling pressure was measured as an index of the flow property close to that for practical molding.

Specifically, a flat plate die having a film gate in the widthwise direction, with a length of 200 mm and a width of 150 mm and with a thickness varying from 3 mm to 1.5 mm at the center section of the flat plate, was mounted on an injection molding machine with a locking pressure of 200 tons, the cylinder temperature and die temperature were set as indicated below, and the lowest pressure resulting in filling of the test piece was measured. There was no switching of dwelling pressure during this time, and the injection pressure and speed were on only one level. After molding to full loading with 20 continuous shots, the injection pressure was gradually lowered, and the injection pressure just before unloading, or just before sinking, was recorded as the minimum filling pressure.

Cylinder temperature
Polypropylene-based material: 210° C.
Polyamide-based material: 260° C.
Die temperature Polypropylene-based material: 40° C.
Polyamide-based material: 70° C.

<Appearance of Molded Piece>

The appearance of the full loaded molded piece formed for evaluation of the flow property was evaluated on the following scale.

Points Condition
5 Gloss over entire molded piece surface
4 No gloss at flowing end portions of molded piece
3 No gloss at thin portions of molded piece
2 No gloss over entire molded piece, slight discoloration confirmed.
1 No gloss over entire molded piece, considerable discoloration confirmed.

<Expansion Coefficient of Molded Piece>

The method of evaluating dimensional change in the actual molded article was measurement of the expansion coefficient of the molded piece.

Specifically, a full loaded molded piece formed for evaluation of the flow property was used for measurement of the lengthwise dimension of the molded piece in an environment of 23° C., 50% RH, and then the test piece was placed in an oven at 60° C. and removed out after 30 minutes, after which the dimension in the lengthwise direction was immediately measured and the dimensional change rate was calculated. The measurement was conducted n=5 times and the expansion coefficient for the molded piece was determined as the arithmetic mean.

<Colorability>

The colorability was evaluated as an index of the ease of coloration. For coloration of a resin, the usual procedure is to first whiten it, and then to add a dye or pigment necessary to produce the desired color, for color adjustment. The ease of whitening greatly affects the colorability. For this evaluation, the colorability was based on measuring the whiteness upon addition of a prescribed amount of titanium oxide.

A master batch containing 50 mass % titanium oxide was dry blended in a proportion of 3 parts by mass with respect to 100 parts by mass of the cellulose component-containing pellets prepared in the examples, and an injection molding machine with a locking pressure of 200 tons was used for casting at a pressure for sufficient loading of the test piece, using the same flat plate die as used for the flow property (minimum filling pressure), with the cylinder temperature and die temperature set as shown below. The master batch used during this time was a master batch using polypropylene as the base resin for polypropylene-based materials, and using polyamide as the base resin for polyamide-based materials.

Cylinder temperature/die temperature
Polypropylene-based material: 210° C./40° C.
Polyamide-based material: 260° C./70° C.

The flat plate section of the obtained test piece was used to measure the L* value using a color difference meter (CM-2002 by Konica Minolta Holdings, Inc.), in a 10° visual field with D65 light, and the colorability was evaluated based on the following scale.

| Flat plate L* value | Colorability |
| --- | --- |
| ≥85 | Excellent |
| ≥80 and <85 | Satisfactory |
| ≥75 and <80 | Inferior |
| <75 | Poor |

<Fender Defect Rate>

Figure 3:
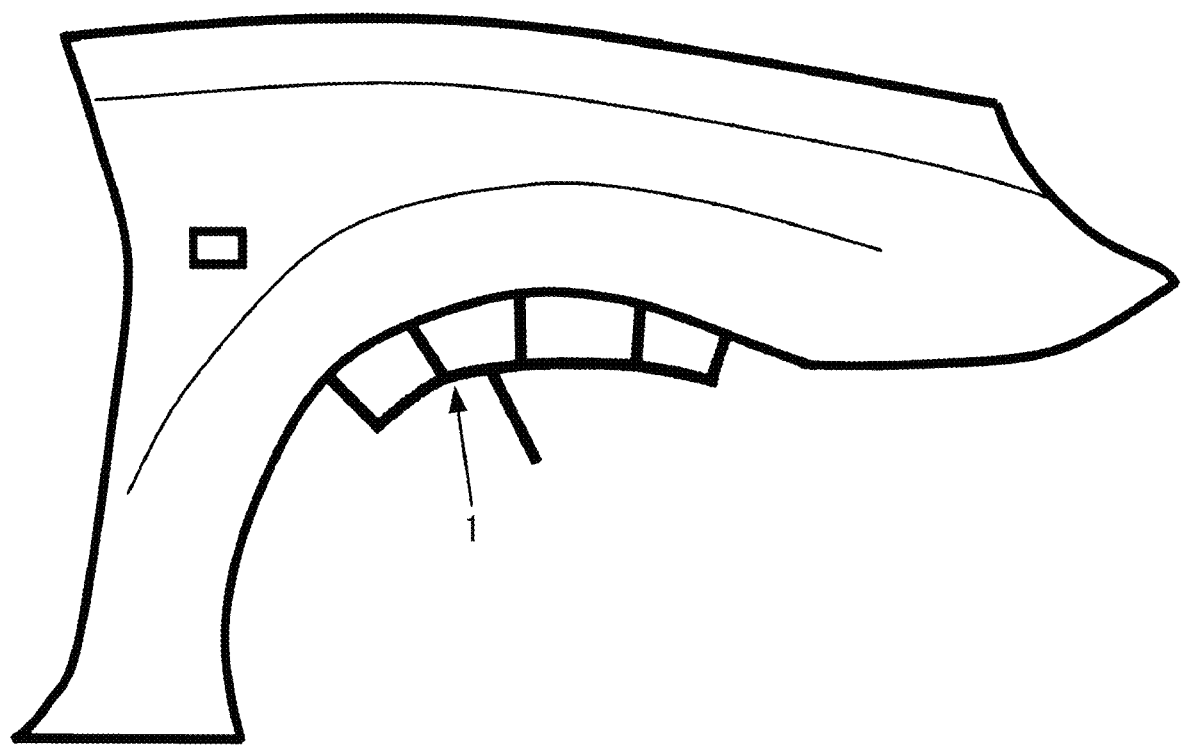
FIG. 3 is a schematic diagram showing the shape of a fender fabricated for evaluation of the fender defect rate in the examples and comparative examples.

The pellets obtained in the examples were used for molding of 20 fenders, using a prescribed die, having the cylinder temperature of an injection molding machine with a maximum locking pressure of 4000 tons set to 250° C., and capable of molding a fender having the shape shown in the schematic diagram of FIG. 3 (cavity volume: 1400 cm$^3$, mean thickness: 2 mm, projected area: 7000 cm$^2$, number of gates: 5 gates, hot runner: In FIG. 3, the relative position 1 of the runner (hot runner) is shown to clearly indicate the runner position of the molded article), with the die temperature set to 60° C.

Each of the obtained fenders was placed on the floor, a bag containing 5 kg of sand was dropped onto the center section of the fender from a height of about 50 cm, and the condition of breakage of the fender was confirmed. The number that broke among the 20 fenders was recorded.

<Coefficient of Variation of Linear Expansion Coefficient>

Figure 4:
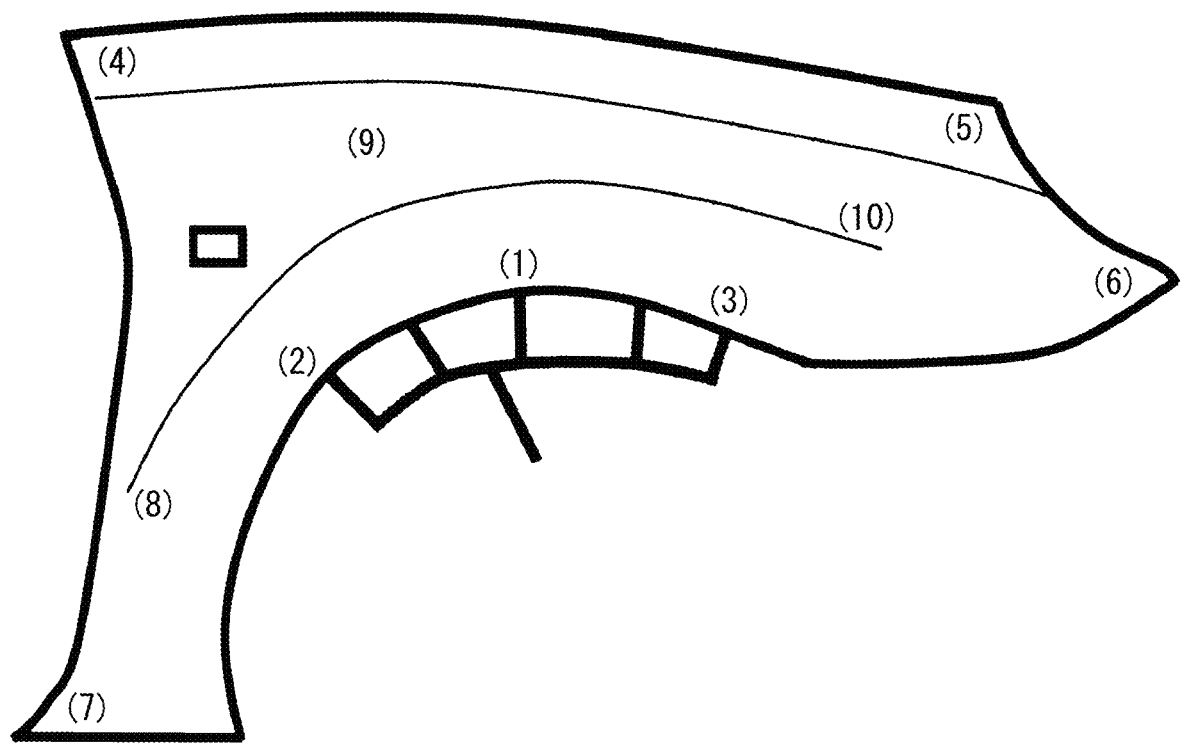
FIG. 4 is a diagram of a fender showing the location where a test piece was taken out for measurement of the coefficient of variation of the linear expansion coefficient of an actual molded article, for the examples and comparative examples.

Using the fenders that were used for measurement of the fender defect rate, approximately 10 mm square sections were cut out from positions (1) to (10) in FIG. 4, as 10 small flat plate test pieces with length=~10 mm, width=~10 mm, thickness=~2 mm. Positions (1) to (3) are near the molded article gate, positions (4) to (7) are the flow end portions of the molded article, and positions (8) to (10) are center sections of the molded article.

The obtained small flat plate test pieces were further cut out into 4 mm-vertical, 2 mm-horizontal, 4 mm-long rectangular measuring samples, using a precision cutting saw. Here, the width portions of the rectangular solid samples represent the thickness directions of the fenders.

Before the measurement, each sample was stationed for 5 hours in an environment at 120° C. for annealing, to obtain a measuring sample. The obtained sample was measured according to ISO11359-2 in a measuring temperature range of −10° C. to +80° C., and the expansion coefficient from 0° C. to 60° C. was calculated, to obtain a total of 10 measurement results. The 10 measurement data were used to calculate the coefficient of variation (CV), according to the following formula.

$$CV=(\sigma/\mu)\times 100$$

In the formula, σ represents standard deviation and μ represents the arithmetic mean of the tensile break strength.

Examples A1 to 46 and Comparative Examples A1 to 10

The polyamide, polypropylene, acid-modified polypropylene, cellulose whiskers and cellulose fibers were mixed in the proportions listed in Tables A3 to 5, and the mixture was melt kneaded with a TEM48SS extruder by Toshiba Corp., at a screw rotational speed of 350 rpm and a throughput of 140 kg/hr, and vacuum devolatilized, and then extruded from a die into a strand, cooled in a water bath and pelletized. The pellets were cylindrical in form, with diameters of 2.3 mm and lengths of 5 mm.

They were evaluated according to the evaluation method described above.

TABLE A3

| | Units | Example A1 | Example A2 | Example A3 | Example A4 | Example A5 | Comp. Example A1 | Comp. Example A2 |
|---|---|---|---|---|---|---|---|---|
| PA | Parts by mass | 100 | 100 | 100 | 100 | 100 | 100 | 100 |
| CW | Parts by mass | 19.5 | 18 | 15 | 12 | 10 | 20 | |
| CF-A | Parts by mass | 0.5 | 2 | 5 | 8 | 10 | | 20 |
| Coefficient of variation of tensile break strength | — | 9.8 | 9.4 | 9 | 8.5 | 9.2 | 10.5 | 15.5 |
| Linear expansion coefficient | ppm/K | 22 | 20 | 18 | 15 | 13 | 45 | 15 |
| Tensile yield strength increase ratio | — | 1.21 | 1.22 | 1.24 | 1.28 | 1.29 | 1.02 | 1.25 |
| Flow property (minimum filling pressure) | MPa | 92 | 92 | 93 | 95 | 100 | 85 | 185 |
| Molded piece appearance | 5-level evaluation | 5 | 5 | 5 | 5 | 5 | 4 | 1 |
| Colorability | — | Good | Good | Good | Good | Good | Good | Poor |
| Molded piece expansion coefficient (23-60° C.) | mm | 0.12 | 0.11 | 0.10 | 0.08 | 0.08 | 0.38 | 0.21 |
| Fender defect rate | Number/20 | 4 | 3 | 2 | 2 | 2 | 8 | 17 |
| Coefficient of variation of linear expansion coefficient | — | 14.1 | 11.5 | 10.4 | 11.2 | 13.9 | 19.5 | 22.3 |

TABLE A4

| | Units | Example A6 | Example A7 | Example A8 | Example A9 | Example A10 | Comp. Example A3 | Comp. Example A4 |
|---|---|---|---|---|---|---|---|---|
| PA | Parts by mass | 100 | 100 | 100 | 100 | 100 | 100 | 100 |
| CW | Parts by mass | 9 | 4 | 3 | 2.5 | 2 | 5 | |
| CF-A | Parts by mass | 1 | 1 | 2 | 2.5 | 3 | | 5 |
| Coefficient of variation of tensile break strength | — | 9.5 | 8.9 | 9 | 8.8 | 9.1 | 10.2 | 14.3 |
| Linear expansion coefficient | ppm/K | 34 | 50 | 44 | 43 | 42 | 72 | 42 |
| Tensile yield strength increase ratio | — | 1.18 | 1.09 | 1.13 | 1.16 | 1.17 | 1.01 | 1.18 |
| Flow property (minimum filling pressure) | MPa | 83 | 63 | 68 | 79 | 95 | 62 | 120 |
| Molded piece appearance | 5-level evaluation | 5 | 5 | 5 | 5 | 5 | 4 | 2 |
| Colorability | — | Good | Good | Good | Good | Good | Good | Poor |
| Molded piece expansion coefficient (23-60° C.) | mm | 0.18 | 0.25 | 0.22 | 0.22 | 0.21 | 0.38 | 0.21 |
| Fender defect rate | Number/20 | 4 | 2 | 2 | 1 | 2 | 7 | 16 |
| Coefficient of variation of linear expansion coefficient | — | 10.6 | 8.2 | 10 | 10.6 | 11.5 | 15.2 | 18.3 |

TABLE A5

|  | Units | Example A11 | Example A12 | Example A13 | Example A14 | Example A15 | Example A16 | Example A17 | Example A18 |
|---|---|---|---|---|---|---|---|---|---|
| PA | Parts by mass | 100 | 100 | 100 | 100 | 100 | 100 | 100 | 100 |
| CW | Parts by mass | 19.5 | 18 | 15 | 10 | 19.5 | 18 | 15 | 10 |
| CF-B | Parts by mass | 0.5 | 2 | 5 | 10 |  |  |  |  |
| CF-C | Parts by mass |  |  |  |  | 0.5 | 2 | 5 | 10 |
| Coefficient of variation of tensile break strength | — | 8.8 | 9.2 | 9.1 | 8.6 | 10.2 | 9.5 | 9.2 | 9.5 |
| Linear expansion coefficient | ppm/K | 18 | 16 | 14 | 14 | 24 | 22 | 20 | 17 |
| Tensile yield strength increase ratio | — | 1.35 | 1.41 | 1.42 | 1.45 | 1.18 | 1.2 | 1.2 | 1.23 |
| Flow property (minimum filling pressure) | MPa | 92 | 95 | 96 | 103 | 90 | 91 | 91 | 96 |
| Molded piece appearance | 5-level evaluation | 5 | 5 | 5 | 5 | 5 | 5 | 5 | 5 |
| Colorability | — | Good | Good | Good | Good | Good | Good | Good | Good |
| Molded piece expansion coefficient (23-60° C.) | mm | 0.09 | 0.1 | 0.09 | 0.07 | 0.15 | 0.16 | 0.13 | 0.12 |
| Fender defect rate | Number/20 | 2 | 3 | 3 | 2 | 5 | 4 | 3 | 4 |
| Coefficient of variation of linear expansion coefficient | — | 13.8 | 10.5 | 9.5 | 12.5 | 11.8 | 9.5 | 8.9 | 11.1 |

TABLE A6

|  | Units | Example A19 | Example A20 | Example A21 | Example A22 | Example A23 |
|---|---|---|---|---|---|---|
| PA | Parts by mass | 100 | 100 | 100 | 100 | 100 |
| CW | Parts by mass | 4 | 3 | 2.5 | 2 | 4 |
| CF-B | Parts by mass | 1 | 2 | 2.5 | 3 |  |
| CF-D | Parts by mass |  |  |  |  | 1 |
| Coefficient of variation of tensile break strength | — | 8.5 | 8.9 | 9 | 9.2 | 8.6 |
| Linear expansion coefficient | ppm/K | 47 | 42 | 41 | 39 | 45 |
| Tensile yield strength increase ratio | — | 1.11 | 1.16 | 1.19 | 1.19 | 1.12 |
| Flow property (minimum filling pressure) | MPa | 64 | 70 | 74 | 83 | 64 |
| Molded piece appearance | 5-level evaluation | 5 | 5 | 5 | 5 | 5 |
| Colorability | — | Good | Good | Good | Good | Good |
| Molded piece expansion coefficient (23-60° C.) | mm | 0.24 | 0.21 | 0.21 | 0.20 | 0.23 |
| Fender defect rate | Number/20 | 1 | 2 | 3 | 3 | 2 |
| Coefficient of variation of linear expansion coefficient | — | 8.5 | 9.5 | 10.5 | 10.9 | 8.0 |

|  | Example A24 | Example A25 | Example A26 | Comp. Example A5 | Comp. Example A6 |
|---|---|---|---|---|---|
| PA | 100 | 100 | 100 | 100 | 100 |
| CW | 3 | 2.5 | 2 |  |  |
| CF-B |  |  |  | 5 |  |
| CF-D | 2 | 2.5 | 3 |  | 5 |
| Coefficient of variation of tensile break strength | 8.8 | 10.6 | 11.5 | 14.9 | 15.6 |
| Linear expansion coefficient | 39 | 37 | 35 | 39 | 33 |
| Tensile yield strength increase ratio | 1.18 | 1.21 | 1.22 | 1.2 | 1.22 |
| Flow property (minimum filling pressure) | 70 | 75 | 85 | 125 | 131 |
| Molded piece appearance | 5 | 5 | 5 | 4 | 3 |

TABLE A6-continued

|  | | | | | |
|---|---|---|---|---|---|
| Colorability | Good | Good | Good | Poor | Poor |
| Molded piece expansion coefficient (23-60° C.) | 0.20 | 0.19 | 0.18 | 0.20 | 0.17 |
| Fender defect rate | 2 | 4 | 5 | 16 | 18 |
| Coefficient of variation of linear expansion coefficient | 9.3 | 9.9 | 10.2 | 19.5 | 18.1 |

The proportion of the cellulose fibers and cellulose whiskers was changed based on the polyamide-based resin.

Compared to Comparative Example A2 which used cellulose fibers alone, Example A5 which also combined cellulose whiskers had vast improvement in the fender defect rate, flow property (minimum filling pressure), molded piece appearance, colorability and molded piece expansion coefficient.

TABLE A7

|  | Units | Example A 27 | Example A 28 | Example A 29 | Example A 30 | Example A 31 | Comp. Example A7 | Comp. Example A8 |
|---|---|---|---|---|---|---|---|---|
| PP | Parts by mass | 100 | 100 | 100 | 100 | 100 | 100 | 100 |
| CW | Parts by mass | 19.5 | 18 | 15 | 12 | 10 | 20 | |
| CF-A | Parts by mass | 0.5 | 2 | 5 | 8 | 10 | | 20 |
| Coefficient of variation of tensile break strength | — | 9.5 | 9.5 | 9.2 | 8.9 | 8.9 | 11.3 | 17.8 |
| Linear expansion coefficient | ppm/K | 20 | 21 | 20 | 22 | 18 | 50 | 18 |
| Tensile yield strength increase ratio | — | 1.19 | 1.21 | 1.20 | 1.22 | 1.23 | 1.03 | 1.21 |
| Flow property (minimum filling pressure) | MPa | 81 | 80 | 83 | 85 | 87 | 78 | 172 |
| Molded piece appearance | 5-level evaluation | 5 | 5 | 5 | 5 | 5 | 5 | 1 |
| Colorability | — | Good | Good | Excellent | Excellent | Excellent | Poor | Excellent |
| Molded piece expansion coefficient (23-60° C.) | mm | 0.23 | 0.2 | 0.18 | 0.17 | 0.16 | 0.43 | 0.26 |
| Fender defect rate | Number/20 | 3 | 2 | 2 | 1 | 2 | 8 | 19 |
| Coefficient of variation of linear expansion coefficient | — | 13.8 | 12.2 | 11.0 | 11.8 | 14.6 | 20.5 | 23.2 |

The proportion of the cellulose fibers and cellulose whiskers was changed based on the polypropylene-based resin. The same tendency was seen as the examples with polyamide-based resins, as compared to Comparative Example A4 which used cellulose fibers alone, Examples A14 to 18 which also combined cellulose whiskers had vast improvement in the fender defect rate, flow property (minimum filling pressure), molded piece appearance, colorability and molded piece expansion coefficient.

TABLE A8

|  | Units | Example A32 | Example A33 | Example A34 | Example A35 | Example A36 |
|---|---|---|---|---|---|---|
| PP | Parts by mass | 95 | 95 | 95 | 95 | 99 |
| MPP | Parts by mass | 5 | 5 | 5 | 5 | 1 |
| CW | Parts by mass | 19.5 | 18 | 15 | 12 | 12 |
| CF-A | Parts by mass | 0.5 | 2 | 5 | 8 | 8 |

TABLE A8-continued

|  |  |  |  |  |  |  |
|---|---|---|---|---|---|---|
| Coefficient of variation of tensile break strength | — | 9.2 | 8.9 | 8.6 | 8.5 | 8.8 |
| Linear expansion coefficient | ppm/K | 19 | 18 | 18 | 18 | 19 |
| Tensile yield strength increase ratio | — | 1.22 | 1.26 | 1.25 | 1.25 | 1.25 |
| Flow property (minimum filling pressure) | MPa | 100 | 95 | 93 | 92 | 85 |
| Molded piece appearance | 5-level evaluation | 5 | 5 | 5 | 5 | 5 |
| Colorability | — | Good | Good | Good | Good | Excellent |
| Molded piece expansion coefficient (23-60° C.) | mm | 0.21 | 0.19 | 0.17 | 0.16 | 0.17 |
| Fender defect rate | Number/20 | 3 | 2 | 2 | 0 | 1 |
| Coefficient of variation of linear expansion coefficient | — | 15.6 | 11.1 | 9.9 | 10.5 | 14.5 |

|  |  | Example A37 | Example A38 | Comp. Example A9 | Comp. Example A10 |
|---|---|---|---|---|---|
| PP |  | 55 | 95 | 95 | 95 |
| MPP |  | 45 | 5 | 5 | 5 |
| CW |  | 12 | 10 | 20 |  |
| CF-A |  | 8 | 10 |  | 20 |
| Coefficient of variation of tensile break strength |  | 9.8 | 8.9 | 10.5 | 15.4 |
| Linear expansion coefficient |  | 20 | 18 | 45 | 20 |
| Tensile yield strength increase ratio |  | 1.28 | 1.25 | 1.05 | 1.22 |
| Flow property (minimum filling pressure) |  | 68 | 90 | 86 | 199 |
| Molded piece appearance |  | 5 | 5 | 5 | 1 |
| Colorability |  | Good | Good | Poor | Good |
| Molded piece expansion coefficient (23-60° C.) |  | 0.16 | 0.16 | 0.41 | 0.24 |
| Fender defect rate |  | 2 | 1 | 8 | 17 |
| Coefficient of variation of linear expansion coefficient |  | 8.2 | 11.2 | 18.9 | 23.5 |

TABLE A9

|  | Units | Example A39 | Example A40 | Example A41 | Example A42 | Example A43 | Example A44 | Example A45 | Example A46 |
|---|---|---|---|---|---|---|---|---|---|
| PP | Parts by mass | 95 | 95 | 95 | 95 | 99 | 55 | 95 | 95 |
| MPP | Parts by mass | 5 | 5 | 5 | 5 | 5 | 5 | 5 | 5 |
| CW | Parts by mass | 19.5 | 18 | 15 | 10 | 19.5 | 18 | 15 | 10 |
| CF-B | Parts by mass | 0.5 | 2 | 5 | 10 |  |  |  |  |
| CF-C | Parts by mass |  |  |  |  | 0.5 | 2 | 5 | 10 |
| Coefficient of variation of tensile break strength | — | 8.8 | 9.2 | 8.6 | 8.5 | 9.2 | 8.9 | 8.6 | 8.9 |
| Linear expansion coefficient | ppm/K | 17 | 17 | 16 | 16 | 21 | 20 | 20 | 19 |
| Tensile yield strength increase ratio | — | 1.35 | 1.4 | 1.42 | 1.45 | 1.18 | 1.23 | 1.22 | 1.22 |
| Flow property (minimum filling pressure) | MPa | 102 | 99 | 95 | 96 | 93 | 89 | 90 | 89 |
| Molded piece appearance | 5-level evaluation | 5 | 5 | 5 | 5 | 5 | 5 | 5 | 5 |
| Colorability | — | Good | Good | Good | Good | Good | Good | Good | Good |
| Molded piece expansion coefficient (23-60° C.) | mm | 0.2 | 0.17 | 0.18 | 0.15 | 0.23 | 0.22 | 0.21 | 0.2 |
| Fender defect rate | Number/20 | 2 | 1 | 1 | 1 | 2 | 2 | 1 | 1 |
| Coefficient of variation of linear expansion coefficient | — | 14.9 | 11.5 | 10.3 | 13.6 | 12.3 | 10.3 | 9.2 | 12.5 |

The following examples combined acid-modified polypropylene, for improved affinity with the cellulose component based on the polypropylene-based resin.

When the examples in Tables A4 and 5 are compared with the examples in Tables A6 and 7, the overall physical properties are seen to be satisfactory, presumably due to improved dispersibility of the cellulose component by combination of acid-modified polypropylene.

Examples A47 to 57

After mixing 15 parts by mass of cellulose whiskers, 5 parts by mass of cellulose fibers and 5 parts by mass of the organic components listed in Table A6 with 100 parts by mass of polyamide, melt kneading the mixture with a TEM48SS extruder by Toshiba Corp. at a screw rotational speed of 350 rpm and a throughput of 200 kg/hr, and vacuum devolatilizing, it was extruded from a die into strands, cooled in a water bath and pelletized. The pellets were cylindrical in form, with diameters of 2.3 mm and lengths of 5 mm.

They were evaluated according to the evaluation method described above.

As a result of using different compounds as organic components, a fender defect rate of zero was found to be exhibited in Examples A49 to 52 and 54. Moreover, for these examples, improve in the overall tensile yield strength increase rate, molded piece expansion coefficient and coefficient of variation of the linear expansion coefficient was confirmed.

Example B

<Thermoplastic Resin>
The thermoplastic resin used was the same as for Example A.
<Cellulose Component>
Cellulose whiskers (hereunder referred to simply as "CW")
Commercially available DP pulp (mean polymerization degree: 1600) was cut and hydrolyzed at 105° C. for 30 minutes in 10% aqueous hydrochloric acid. The obtained acid-insoluble residue was filtered, rinsed and pH-adjusted to prepare a crystalline cellulose dispersion with a solid concentration of 14 wt % and a pH of 6.5. The crystalline cellulose dispersion was spray-dried to obtain dried crystalline cellulose. Next, the obtained dried product was supplied

TABLE A10

|  | Units | Example A47 Phytosterol | Example A48 Straight-chain alkyl ether | Example A49 Styrenated phenyl ether | Example A50 Bisphenol A ether | Example A51 Hydrogenated castor oil ether |
|---|---|---|---|---|---|---|
| Coefficient of variation of tensile break strength | — | 8.9 | 8.8 | 6.5 | 5.2 | 4.8 |
| Linear expansion coefficient | ppm/K | 39 | 38 | 20 | 19 | 17 |
| Tensile yield strength increase ratio | — | 1.22 | 1.2 | 1.2 | 1.21 | 1.32 |
| Flow property (minimum filling pressure) | MPa | 72 | 70 | 69 | 65 | 56 |
| Molded piece appearance | 5-level evaluation | 5 | 5 | 5 | 5 | 5 |
| Colorability | — | Excellent | Excellent | Excellent | Excellent | Excellent |
| Molded piece expansion coefficient (23-60° C.) | mm | 0.31 | 0.32 | 0.18 | 0.18 | 0.17 |
| Fender defect rate | Number/20 | 2 | 2 | 0 | 0 | 0 |
| Coefficient of variation of linear expansion coefficient | — | 10.2 | 9.6 | 7.2 | 6.6 | 5.3 |

|  | Example A52 β-Naphthyl ether | Example A53 Rosin ester | Example A54 Alkyl phenyl ether | Example A55 Liquid paraffin | Example A56 Tall oil | Example A57 Terpene oil |
|---|---|---|---|---|---|---|
| Coefficient of variation of tensile break strength | 5.3 | 6.5 | 4.2 | 10.8 | 11.5 | 12.5 |
| Linear expansion coefficient | 20 | 23 | 17 | 42 | 44 | 43 |
| Tensile yield strength increase ratio | 1.28 | 1.25 | 1.31 | 1.18 | 1.15 | 1.14 |
| Flow property (minimum filling pressure) | 63 | 65 | 59 | 45 | 50 | 52 |
| Molded piece appearance | 5 | 5 | 5 | 5 | 4 | 4 |
| Colorability | Excellent | Excellent | Excellent | Excellent | Excellent | Excellent |
| Molded piece expansion coefficient (23-60° C.) | 0.18 | 0.19 | 0.16 | 0.38 | 0.4 | 0.39 |
| Fender defect rate | 0 | 1 | 0 | 9 | 10 | 13 |
| Coefficient of variation of linear expansion coefficient | 6.4 | 8.3 | 4.9 | 12.3 | 13.2 | 14.2 | to an air flow-type pulverizer (Model STJ-400 by Seishin Enterprise Co., Ltd.) at a feed rate of 10 kg/hr, and pulverized to obtain cellulose whiskers as crystalline cellulose fine powder. The properties of the obtained cellulose whiskers were evaluated by the following methods. The results are shown below.

L/D=1.6
Mean diameter=200 nm
Degree of crystallinity=78%
Degree of polymerization=200

Cellulose Fibers a (Hereunder Referred to Simply as "CF-A")

After cutting linter pulp, an autoclave was used to heat it for 3 hours in hot water at 120° C. or higher to remove the hemicellulose portion and obtained refined pulp, which was pressed and beat into highly chopped fibers and fibrils to a solid content of 1.5 wt % in purified water, and then defibrated with a high-pressure homogenizer (10 times at an operating pressure of 85 MPa) at the same concentration to obtain defibrated cellulose. For the beating treatment, a disc refiner was used for 4 hours of treatment with a high-cutting beating blade (hereunder referred to as "cutting blade"), and then a high-defibrating beating blade (hereunder referred to as "defibrating blade") was used for another 1.5 hours of beating to obtain cellulose fibers A. The properties of the obtained cellulose fibers were evaluated by the following methods. The results are shown below.

L/D=300
Mean fiber size=90 nm
Degree of crystallinity=80%
Degree of polymerization=600

Cellulose Fibers B (Hereunder Referred to Simply as "CF-B")

Cellulose fibers B were obtained under the same conditions as CF-A, except that the beating conditions were a processing time of 2.5 hours with the cutting blade followed by a processing time of 2 hours with the defibrating blade.

L/D=450
Mean fiber size=100 nm
Degree of crystallinity=80%
Degree of polymerization=600

Cellulose Fibers C (Hereunder Referred to Simply as "CF-C")

Acetic acid bacteria were cultured to obtain cellulose nanofibers. The culturing was under standard conditions, and Hestrin-Schramm culture medium ("Cellulose Dictionary", Cellulose Gakkai, ed., Asakura Publishing, 2000, p 44) was used for stationary culturing several times in a plastic vat with inner dimensions of 40 cm width×60 cm length×15 cm height, for 8 days at pH 6, 28° C. using fructose as the carbon source. The obtained semi-transparent gel with a thickness of about 15 mm was cut into a die shape and then loaded into a pressure-resistant bacteriolysis tank (volume: 2 m$^3$), and bacteriolysis was carried out at 120° C. for 1 hour while immersed in 2 wt % aqueous sodium hydroxide.

After further rinsing the obtained wet gel, bacteriolysis was repeated under the same conditions as before, and the obtained wet gel was diluted with 4° C. cold water in a washing tank (volume: 2 m$^3$) to a cellulose solid content of about 0.5 wt % and subjected to dispersion treatment for about 10 minutes with a Disper homomixer mounted inside the tank, and then pressure filtered to obtain a concentrate. The steps of dilution to a solid content of about 0.5 wt % in 4° C. cold water in a washing tank in the same manner and dispersion treatment for about 10 minutes with a homomixer, followed by concentration by pressure filtration, were repeated 3 times to obtain purified cellulose fibers C.

L/D=1400
Mean fiber size=90 nm
Degree of crystallinity=93%
Degree of polymerization=2700

TABLE B1

|  | Unit | CW | CF-A | CF-B | CF-C |
|---|---|---|---|---|---|
| L/D | — | 1.6 | 300 | 450 | 1400 |
| Mean polymerization degree | — | 200 | 600 | 600 | 2700 |
| Crystalline form | — | Type I | Type I | Type I | Type I |
| Degree of crystallinity | % | 78 | 80 | 80 | 93 |
| Particle diameter | nm | 200 | 90 | 100 | 90 |

<Degree of Polymerization of Cellulose Component>
This was measured in the same manner as Example A.
<Crystalline Form and Degree of Crystallinity of Cellulose Component>
This was measured in the same manner as Example A.
<L/D of Cellulose Component>
This was measured in the same manner as Example A.
<Mean Diameter of Cellulose Component>
This was measured in the same manner as Example A.
<Organic Component>
The organic component used was the same as for Example A.
<Measurement of Static Surface Tension>
This was measured in the same manner as Example A.
<Measurement of Dynamic Surface Tension>
This was measured in the same manner as Example A.
<Measurement of SP Value of Organic Component>
This was measured in the same manner as Example A.
<Tensile Yield Strength Increase Ratio>
This was measured in the same manner as Example A.
<Coefficient of Variation of Tensile Break Strength>
This was measured in the same manner as Example A.
<Linear Expansion Coefficient>
This was measured in the same manner as Example A.
<Coefficient of Variation of Linear Expansion Coefficient of Test Piece>

In order to measure the linear expansion coefficient, 50 small 60 mm×60 mm×2 mm square plates were molded, conforming to ISO294-3. One of every 10 of the test pieces was removed and a 4 mm-vertical, 2 mm-horizontal, 4 mm-long rectangular measuring sample was cut out with a precision cutting saw, from the gate section and flow end portions of the test piece.

The measuring sample obtained in this manner was used for measurement according to ISO11359-2 in a measuring temperature range of −10 to 80° C., and the linear expansion coefficient from 0° C. to 60° C. was calculated. Before the measurement, it was stationed for 5 hours in an environment at 120° C. for annealing. The coefficient of variation was measured in the same manner as for the coefficient of variation of the tensile break strength, based on the obtained 10 data values.

<Flow Property (Minimum Filling Pressure)>
This was measured in the same manner as Example A.
<Molded Piece Appearance>
This was measured in the same manner as Example A.
<Expansion Coefficient of Molded Piece>
This was measured in the same manner as Example A.
<Colorability>
This was measured in the same manner as Example A.
<Fender Defect Rate>
This was measured in the same manner as Example A.

<Coefficient of Variation of Linear Expansion Coefficient of Fender>

The coefficient of variation of the linear expansion coefficient was measured for actual molded fenders, as an index of the size of warping of actual molded articles.

The fenders molded for measurement of the fender defect rate were used for measurement in the same manner as the <Coefficient of variation of the linear expansion coefficient> for Example A.

<Extruder Design-1>

Using a twin-screw extruder with 13 cylinder blocks (TEM48SS extruder by Toshiba Corp.), cylinder 1 was water-cooled, cylinder 2 was set to 80° C., cylinder 3 was set to 150° C. and cylinder 4/die was set to 250° C.

The screw structure was as follows: cylinders 1 to 3 were used as a transport zone consisting of only transport screws, and two clockwise kneading discs (right-handed kneading discs: hereunder also referred to simply as "RKD") and two neutral kneading discs (non-transport type kneading discs: hereunder also referred to simply as "NKD"), in that order, were distributed on cylinder 4 from the upstream end. Cylinder 5 was a transport zone, one RKD and subsequently two NKD were distributed on cylinder 6, cylinders 7 and 8 were transport zones, and two NKD were distributed on cylinder 9. The following cylinder 10 was a transport zone, two NKD and subsequently one counter-clockwise screw were distributed on cylinder 11, and cylinders 12 and 13 were transport zones. Vent ports were installed on the upper part of cylinder 12 to allow depressurized suction, and vacuum suction was carried out.

The resin, cellulose component and additional components were all supplied by cylinder 1.

The throughput of the resin composition from the extruder (production volume) was 140 kg/hr. The screw rotational speed was also varied as appropriate.

<Extruder Design-2>

Using the same extruder as extruder design-1, a liquid injection nozzle was installed on cylinder 3, cylinder 1 was water-cooled, cylinders 2 to 4 were set to 80° C., cylinder 5 to 100° C., cylinder 6 to 130° C., cylinder 7 to 230° C., and cylinders 8 to 13 and the die to 250° C.

The screw structure was as follows: cylinders 1 to 4 were used as a transport zone consisting of only transport screws, 3 RKD were distributed on cylinders 5 and 6, each from the upstream end, and a vent port was installed on the upper part of the extruder to allow removal of the dispersing medium. Next, 3 RKD, 2 NKD and one counter-clockwise kneading disc (left-handed kneading disc: hereunder also referred to simply as "LKD") were connected to and distributed from cylinders 7 to 8, to form a melting zone. Cylinder 9 was a transport zone, and one RKD, 2 NKD and one LKD were connected to and distributed on cylinder 10 in that order to form a melting zone, following which cylinders 11 to 13 were used as transport zones. Depressurized suction was allowed at cylinder 12.

The resin component was supplied from cylinder 1, a dispersion of components such as the cellulose component and a surfactant as appropriate, in a dispersing medium composed mainly of water, was added in the necessary amount from cylinder 3 using a pump, and the dispersing medium was evaporated off at cylinders 5 and 6.

The throughput of the resin composition from the extruder (production volume) was 140 kg/hr. The screw rotational speed was also varied as appropriate.

<Extruder Design-3>

Using the same extruder as extruder design-1, a pressure controlled liquid injection nozzle was installed on cylinder 6, cylinder 1 was water-cooled, cylinder 2 was set to 150° C., cylinder 3 to 250° C., cylinders 4 to 7 to 270° C., and cylinders 8 to 13 and the die to 250° C.

The extruder screw design was as follows: cylinders 1 and 2 were used as a transport zone consisting of only transport screws, two RKD and an NKD and LKD were distributed on cylinder 3 from the upstream end to form a resin melting zone, cylinder 4 was used as a transport zone similar to cylinder 2, a screw part for rapid narrowing of the resin flow channel, known as a "seal ring" (hereunder also referred to simply as "SR") and subsequently a counter-clockwise screw (left-handed screw: hereunder also referred to simply as "LS") were distributed on cylinder 5, and with a molten resin seal zone being upstream from cylinder 6, a plurality of NKD were distributed on the liquid-addition portions of cylinder 6 for increased stirring efficiency. Next, at cylinder 7, an LS was distributed following an SR, to form a molten resin seal downstream from the liquid addition zone. Cylinder 8 was a transport zone, and the top end of the following cylinder 9 was an opening, as a devaporizing zone for discharge of water vapor exiting from the resin released beyond the seal section of cylinder 7. Also, at cylinder 11, an RKD and subsequently 2 NKD and one LS were distributed, followed by depressurized suction allowed at cylinder 12. The design thereafter was extrusion from the die through the transport zone of cylinder 13, into the form of a strand, and water-cooling for pelletization.

The resin component was supplied from cylinder 1, and a dispersion of components such as the cellulose component and a surfactant as appropriate, in a dispersing medium composed mainly of water, was added from cylinder 6. During this time, the release pressure of the liquid addition nozzle installed in the cylinder 6 was set to 6.2 MPa, so that the internal pressure between the two SR of the extruder cylinder 6 was at or above the water vapor pressure at that section (5.5 MPa, as the water vapor pressure at the cylinder preset temperature of 270° C.), the dispersion was conveyed with a pump to raise the pressure to the prescribed pressure, and liquid was added to the extruder in an amount for the prescribed composition.

The throughput of the resin composition from the extruder (production volume) was 140 kg/hr. The screw rotational speed was also varied as appropriate.

Examples B1 to 27 and Comparative Examples B1 to 4

The polyamide, cellulose whiskers and cellulose fibers were melt kneaded with the extruder in the respective proportions listed in Tables B3 to 6, with the extrusion conditions and screw rotational speeds also listed in the tables, and after devolatilization by depressurized suction at cylinder 12, it was extruded from a die into strands, cooled in a water bath and pelletized. The pellets were cylindrical in form, with diameters of 2.3 mm and lengths of 5 mm.

They were evaluated according to the evaluation method described above.

TABLE B2

|  | Units | Example B1 | Example B2 | Example B3 | Example B4 | Comp. Example B1 | Comp. Example B2 | Example B5 |
|---|---|---|---|---|---|---|---|---|
| PA | Parts by mass | 100 | 100 | 100 | 100 | 100 | 100 | 100 |
| CW | Parts by mass | 9 | 4 | 3 | 2 | 5 | — | — |
| CF-A | Parts by mass | 1 | 1 | 2 | 3 | — | 5 | 5 |
| Extruder design | — | 1 | 1 | 1 | 1 | 1 | 1 | 1 |
| Screw rotational speed | rpm | 350 | 350 | 350 | 350 | 350 | 350 | 500 |
| Coefficient of variation of tensile break strength | — | 9.5 | 8.9 | 9.0 | 9.1 | 10.2 | 14.3 | 9.8 |
| Coefficient of variation of linear expansion coefficient of test piece | — | 9.4 | 7.3 | 8.5 | 10.2 | 13.5 | 16.3 | 13.9 |
| Linear expansion coefficient | ppm/K | 34 | 50 | 44 | 42 | 72 | 42 | 40 |
| Tensile yield strength increase ratio | — | 1.18 | 1.09 | 1.13 | 1.17 | 1.01 | 1.18 | 1.19 |
| Flow property (minimum filling pressure) | MPa | 83 | 63 | 68 | 95 | 62 | 120 | 125 |
| Molded piece appearance | 5-level evaluation | 5 | 5 | 5 | 5 | 4 | 2 | 4 |
| Colorability | — | Good | Good | Good | Good | Good | Poor | Good |
| Molded piece expansion coefficient (23-60° C.) | mm | 0.18 | 0.25 | 0.22 | 0.21 | 0.38 | 0.21 | 0.21 |
| Fender defect rate | Number/20 | 4 | 2 | 2 | 2 | 7 | 16 | 6 |
| Coefficient of variation of linear expansion coefficient of fender | — | 10.6 | 8.2 | 10 | 11.5 | 15.2 | 18.3 | 14.5 |

While it was confirmed that using cellulose whiskers and cellulose fibers alone under conditions with a screw rotational speed of 350 rpm in extruder design-1 lowered the performance in actual molded articles (the fender defect rate and the variation in the linear expansion coefficient of the fenders that affects dimensional defects), these problems were eliminated and satisfactory performance was obtained in systems using both cellulose whiskers and cellulose fibers. Even when using cellulose fibers alone, it is seen that satisfactory performance is exhibited when using appropriate extrusion conditions with an increased screw rotational speed of the extruder.

TABLE B3

|  | Units | Example B6 | Example B7 | Example B8 | Example B9 | Example B10 | Example B11 | Comp. Example B3 |
|---|---|---|---|---|---|---|---|---|
| PA | Parts by mass | 100 | 100 | 100 | 100 | 100 | 100 | 100 |
| CW | Parts by mass | 9 | 4 | 3 | 2 | 5 | — | — |
| CF-A | Parts by mass | 1 | 1 | 2 | 3 | — | 5 | 5 |
| Extruder design | — | 2 | 2 | 2 | 2 | 2 | 2 | 2 |
| Screw rotational speed | rpm | 350 | 350 | 350 | 350 | 350 | 350 | 250 |
| Coefficient of variation of tensile break strength | — | 8.3 | 7.8 | 7.9 | 7.8 | 8.7 | 9.7 | 11.5 |
| Coefficient of variation of linear expansion coefficient of test piece | — | 8.7 | 6.7 | 7.8 | 9.4 | 12.4 | 14.6 | 15.5 |
| Linear expansion coefficient | ppm/K | 32 | 48 | 43 | 42 | 70 | 40 | 43 |
| Tensile yield strength increase ratio | — | 1.19 | 1.11 | 1.15 | 1.19 | 1.02 | 1.20 | 1.18 |
| Flow property (minimum filling pressure) | MPa | 87 | 66 | 70 | 99 | 65 | 125 | 118 |
| Molded piece appearance | 5-level evaluation | 5 | 5 | 5 | 5 | 5 | 4 | 3 |
| Colorability | — | Good | Good | Excellent | Excellent | Excellent | Good | Poor |
| Molded piece expansion coefficient (23-60° C.) | mm | 0.17 | 0.24 | 0.22 | 0.21 | 0.35 | 0.21 | 0.22 |
| Fender defect rate | Number/20 | 2 | 1 | 0 | 1 | 2 | 3 | 8 |
| Coefficient of variation of linear expansion coefficient of fender | — | 9.7 | 7.5 | 8.7 | 10.5 | 13.9 | 16.4 | 17.4 |

It is seen that changing to extruder design-2 results in more satisfactory performance being exhibited overall, than when using extruder design-1. Moreover, in comparing Comparative Example B2 and Example B11, changing the extruder design from 1 to 2 drastically increased performance (especially the defect rate). Furthermore, even with extruder design-2, a tendency toward lower performance was confirmed in Comparative Example B3 which had a very low screw rotational speed.

TABLE B4

|  | Units | Example B12 | Example B13 | Example B14 | Example B15 | Example B16 | Example B17 | Example B18 |
|---|---|---|---|---|---|---|---|---|
| PA | Parts by mass | 100 | 100 | 100 | 100 | 100 | 100 | 100 |
| CW | Parts by mass | 9 | 4 | 3 | 2 | 5 | | |
| CF-A | Parts by mass | 1 | 1 | 2 | 3 | | 5 | 5 |
| Extruder design | — | 3 | 3 | 3 | 3 | 3 | 3 | 3 |
| Screw rotational speed | rpm | 350 | 350 | 350 | 350 | 350 | 350 | 200 |
| Coefficient of variation of tensile break strength | — | 6.2 | 5.9 | 5.9 | 5.9 | 6.5 | 7.3 | 8.6 |
| Coefficient of variation of linear expansion coefficient of test piece | — | 8.0 | 6.2 | 7.2 | 8.7 | 11.5 | 13.4 | 14.2 |
| Linear expansion coefficient | ppm/K | 31 | 45 | 40 | 39 | 66 | 39 | 48 |
| Tensile yield strength increase ratio | — | 1.26 | 1.18 | 1.22 | 1.26 | 1.08 | 1.27 | 1.18 |
| Flow property (minimum filling pressure) | MPa | 90 | 69 | 72 | 101 | 67 | 115 | 124 |
| Molded piece appearance | 5-level evaluation | 5 | 5 | 5 | 5 | 5 | 4 | 4 |
| Colorability | — | Excellent | Excellent | Excellent | Excellent | Excellent | Excellent | Excellent |
| Molded piece expansion coefficient (23-60° C.) | mm | 0.16 | 0.23 | 0.21 | 0.20 | 0.33 | 0.20 | 0.24 |
| Fender defect rate | Number/20 | 1 | 0 | 0 | 0 | 1 | 2 | 2 |
| Coefficient of variation of linear expansion coefficient of fender | — | 8.9 | 6.9 | 8.0 | 9.7 | 12.8 | 15.0 | 15.9 |

It is seen that changing to extruder design-3 results in even more satisfactory performance being exhibited. With extruder design-2, satisfactory performance was shown to be exhibited even under lower screw rotational speed conditions in which a tendency toward reduced performance was confirmed.

TABLE B5

|  | Units | Example B19 | Example B20 | Example B21 | Example B22 | Example B23 |
|---|---|---|---|---|---|---|
| PA | Parts by mass | 100 | 100 | 100 | 100 | 100 |
| CW | Parts by mass | 10 | 9 | 8 | 5 | 3 |
| CF-B | Parts by mass | | 1 | 2 | 5 | 7 |
| CF-C | Parts by mass | | | | | |
| Extruder design | — | 2 | 2 | 2 | 2 | 2 |
| Screw rotational speed | rpm | 350 | 350 | 350 | 350 | 350 |
| Coefficient of variation of tensile break strength | — | 9.6 | 8.2 | 8.0 | 8.8 | 9.2 |
| Coefficient of variation of linear expansion coefficient of test piece | — | 14.1 | 8.5 | 8.2 | 7.9 | 12.4 |
| Linear expansion coefficient | ppm/K | 69 | 35 | 34 | 32 | 30 |
| Tensile yield strength increase ratio | — | 1.03 | 1.20 | 1.22 | 1.24 | 1.27 |
| Flow property (minimum filling pressure) | MPa | 69 | 90 | 93 | 96 | 102 |

TABLE B5-continued

|  |  | | | | | |
|---|---|---|---|---|---|---|
| Molded piece appearance | 5-level evaluation | 5 | 5 | 5 | 5 | 4 |
| Colorability | — | Good | Excellent | Excellent | Excellent | Excellent |
| Molded piece expansion coefficient (23-60° C.) | mm | 0.34 | 0.18 | 0.18 | 0.17 | 0.16 |
| Fender defect rate | Number/20 | 5 | 2 | 1 | 1 | 3 |
| Coefficient of variation of linear expansion coefficient of fender | — | 15.8 | 9.9 | 9.7 | 9.3 | 14.6 |

|  | Comp. Example B4 | Example B24 | Example B25 | Example B26 | Example B27 |
|---|---|---|---|---|---|
| PA | 100 | 100 | 100 | 100 | 100 |
| CW |  | 8 | 5 | 3 |  |
| CF-B | 10 |  |  |  |  |
| CF-C |  | 2 | 5 | 7 | 10 |
| Extruder design | 2 | 2 | 2 | 2 | 2 |
| Screw rotational speed | 350 | 350 | 350 | 350 | 350 |
| Coefficient of variation of tensile break strength | 11.8 | 6.8 | 7.5 | 7.8 | 10.0 |
| Coefficient of variation of linear expansion coefficient of test piece | 16.5 | 7.4 | 7.1 | 11.2 | 14.9 |
| Linear expansion coefficient | 29 | 31 | 29 | 27 | 26 |
| Tensile yield strength increase ratio | 1.23 | 1.26 | 1.28 | 1.31 | 1.27 |
| Flow property (minimum filling pressure) | 124 | 95 | 98 | 104 | 126 |
| Molded piece appearance | 3 | 5 | 5 | 5 | 4 |
| Colorability | Good | Excellent | Excellent | Excellent | Good |
| Molded piece expansion coefficient (23-60° C.) | 0.15 | 0.16 | 0.15 | 0.14 | 0.14 |
| Fender defect rate | 8 | 0 | 0 | 1 | 4 |
| Coefficient of variation of linear expansion coefficient of fender | 19.5 | 8.7 | 8.4 | 13.2 | 17.5 |

Examples B28 to 32 and Comparative Examples B5 to 6

The polypropylene, acid-modified polypropylene, cellulose whiskers and cellulose fibers were melt kneaded with the extruder in the respective proportions listed in Table B7, with different extrusion conditions and screw rotational speeds, and after devolatilization by depressurized suction at cylinder 12, it was extruded from a die into strands, cooled in a water bath and pelletized. The pellets were cylindrical in form, with diameters of 2.6 mm and lengths of 5.1 mm.

The cylinder temperature during this time was changed as follows. No change up to cylinders 1 to 6, cylinder 7 set to 160° C., and cylinders 8 to 13 and the die set to 180° C.

TABLE B6

|  | Units | Comp. Example B5 | Example B28 | Example B29 | Example B30 | Example B31 | Comp. Example B6 | Example B32 |
|---|---|---|---|---|---|---|---|---|
| PP | Parts by mass | 95 | 95 | 95 | 95 | 95 | 95 | 95 |
| MPP | Parts by mass | 5 | 5 | 5 | 5 | 5 | 5 | 5 |
| CW | Parts by mass | 10 | 9 | 8 | 5 | 3 |  |  |
| CF-B | Parts by mass |  | 1 | 2 | 5 | 7 | 10 | 10 |
| Extruder design | — | 2 | 2 | 2 | 2 | 2 | 2 | 3 |
| Screw rotational speed | rpm | 450 | 450 | 450 | 450 | 450 | 450 | 450 |
| Coefficient of variation of tensile break strength | — | 10.2 | 9.4 | 7.3 | 8.4 | 9.5 | 14.8 | 8.8 |
| Coefficient of variation of linear expansion coefficient of test piece | — | 16.3 | 13.9 | 10.5 | 12.2 | 13.8 | 18.9 | 13.9 |
| Linear expansion coefficient | ppm/K | 82 | 65 | 51 | 46 | 43 | 40 | 37 |
| Tensile yield strength increase ratio | — | 1.05 | 1.08 | 1.12 | 1.15 | 1.19 | 1.2 | 1.25 |
| Flow property (minimum filling pressure) | MPa | 83 | 90 | 105 | 119 | 129 | 152 | 145 |
| Molded piece appearance | 5-level evaluation | 5 | 5 | 5 | 5 | 4 | 1 | 3 |

TABLE B6-continued

|  | Units | Comp. Example B5 | Example B28 | Example B29 | Example B30 | Example B31 | Comp. Example B6 | Example B32 |
|---|---|---|---|---|---|---|---|---|
| Colorability | — | Poor | Good | Excellent | Good | Good | Good | Excellent |
| Molded piece expansion coefficient (23-60° C.) | mm | 0.41 | 0.33 | 0.26 | 0.23 | 0.22 | 0.21 | 0.19 |
| Fender defect rate | Number/20 | 4 | 3 | 1 | 2 | 4 | 16 | 4 |
| Coefficient of variation of linear expansion coefficient of fender | — | 19.2 | 16.4 | 12.4 | 14.4 | 16.3 | 22.3 | 16.4 |

While it was confirmed that using cellulose whiskers and cellulose fibers alone under conditions with a screw rotational speed of 450 rpm in extruder design-1 lowered the performance in actual molded articles, these problems were eliminated and satisfactory performance was obtained in systems using both cellulose whiskers and cellulose fibers.

Moreover, even when using cellulose fibers alone, it is seen that changing the extruder design from 2 to 3 provides satisfactory performance.

Examples B33 to 43

After mixing 5 parts by mass of CW, 5 parts by mass of CF-B and 5 parts by mass of the organic components listed in Table B8 with 100 parts by mass of polyamide, melt kneading the mixture with a TEM48SS extruder by Toshiba Corp., with extruder design-1, at a screw rotational speed of 350 rpm and a throughput of 200 kg/hr, and vacuum devolatilizing, it was extruded from a die into strands, cooled in a water bath and pelletized. The pellets were cylindrical in form, with diameters of 2.3 mm and lengths of 5 mm.

They were evaluated according to the evaluation method described above.

TABLE B7

|  | Units | Example B33 No | Example B34 Phyto-sterol | Example B35 Straight-chain alkyl ether | Example B36 Styrenated phenyl ether | Example B37 Bisphenol A ether | Example B38 Hydrogenated castor oil ether |
|---|---|---|---|---|---|---|---|
| Extruder design | — | 1 | 1 | 1 | 1 | 1 | 1 |
| Screw rotational speed | rpm | 350 | 350 | 350 | 350 | 350 | 350 |
| Coefficient of variation of tensile break strength | — | 9.8 | 9.2 | 9.1 | 6.7 | 5.4 | 4.9 |
| Coefficient of variation of linear expansion coefficient of test piece | — | 12.7 | 12.0 | 11.8 | 8.7 | 7.0 | 6.4 |
| Linear expansion coefficient | ppm/K | 35 | 45 | 44 | 32 | 30 | 30 |
| Tensile yield strength increase ratio | — | 1.2 | 1.19 | 1.18 | 1.19 | 1.2 | 1.23 |
| Flow property (minimum filling pressure) | MPa | 90 | 69 | 67 | 66 | 62 | 58 |
| Molded piece appearance | 5-level evaluation | 5 | 5 | 5 | 5 | 5 | 5 |
| Colorability | — | Excellent | Excellent | Excellent | Excellent | Excellent | Excellent |
| Molded piece expansion coefficient (23-60° C.) | mm | 0.18 | 0.23 | 0.22 | 0.17 | 0.16 | 0.16 |
| Fender defect rate | Number/20 | 3 | 3 | 3 | 2 | 0 | 0 |
| Coefficient of variation of linear expansion coefficient of fender | — | 15.0 | 14.1 | 14.0 | 10.3 | 8.3 | 7.5 |

|  | Example B39 β-Naphthyl ether | Example B40 Rosin ester | Example B41 Alkyl phenyl ether | Comp. Example B7 Liquid paraffin | Comp. Example B8 Tall oil | Comp. Example B9 Terpene oil |
|---|---|---|---|---|---|---|
| Extruder design | 1 | 1 | 1 | 1 | 1 | 1 |
| Screw rotational speed | 350 | 350 | 350 | 350 | 350 | 350 |
| Coefficient of variation of tensile break strength | 5.5 | 6.7 | 4.3 | 10.8 | 11.8 | 12.9 |
| Coefficient of variation of linear expansion coefficient of test piece | 7.2 | 8.7 | 5.6 | 14.0 | 15.3 | 16.8 |
| Linear expansion coefficient | 35 | 37 | 28 | 48 | 51 | 49 |
| Tensile yield strength increase ratio | 1.21 | 1.18 | 1.29 | 1.15 | 1.12 | 1.12 |

TABLE B7-continued

| | | | | | | |
|---|---|---|---|---|---|---|
| Flow property (minimum filling pressure) | 60 | 62 | 55 | 44 | 47 | 49 |
| Molded piece appearance | 5 | 5 | 5 | 5 | 4 | 4 |
| Colorability | Excellent | Excellent | Excellent | Excellent | Excellent | Excellent |
| Molded piece expansion coefficient (23-60° C.) | 0.18 | 0.19 | 0.15 | 0.24 | 0.26 | 0.25 |
| Fender defect rate | 0 | 1 | 0 | 4 | 6 | 9 |
| Coefficient of variation of linear expansion coefficient of fender | 8.4 | 10.3 | 6.6 | 16.6 | 18.1 | 19.8 |

As a result of using different compounds as organic components, it was confirmed that adding organic components such as a hydrogenated castor oil ether or alkylphenyl ether under these conditions improved performance, while conversely a tendency toward lower performance was found for organic components such as liquid paraffin. However, even with organic components such as liquid paraffin, adequate increase in performance may be expected depending on the extruder design and conditions, as also demonstrated in the examples described above.

Example C

[Starting Materials and Evaluation Methods]

The starting materials and evaluation methods used will now be explained.

<Mean Polymerization Degree of Cellulose>

This was measured by a reduced relative viscosity method using a copper-ethylenediamine solution, as specified in Crystalline Cellulose Verification Test (3) of "Japanese Pharmacopeia, 14th Edition (Hirokawa Shoten)".

<Crystalline Form and Degree of Crystallinity of Cellulose>

An X-ray diffraction device (Multipurpose X-ray diffraction device by Rigaku Corp.) was used to measure the diffraction image by a powder method (ordinary temperature), and the degree of crystallinity was calculated by the Segal method. The crystalline form was also measured from the obtained X-ray diffraction image.

<L/D of Cellulose Particles>

A 1 mass % concentration purified water suspension of the cellulose (hydrolyzed wet cake) was prepared and dispersed with a high-shear homogenizer (for example, an "Excel Autohomogenizer ED-7", trade name of Nippon Seiki Co., Ltd., processing conditions: rotational speed=15,000 rpm×5 minutes) to produce an aqueous dispersion which was diluted with purified water to 0.1 to 0.5 mass %, and this was cast onto mica and air-dried, the ratio (L/D) was determined for the length (L) and diameter (D) of a particle image, obtained by measurement with an atomic force microscope (AFM), and the value was converted to the average value for 100 to 150 particles.

<Colloidal Cellulose Content>

Each cellulose was kneaded as a 40 mass % solid in a planetary mixer ("5DM-03-R", trade name of Shinagawa Machinery Works Co., Ltd., hook-type stirring blade) for 30 minutes at 126 rpm, room temperature, ordinary pressure. Next, a purified water suspension was prepared to a 0.5 mass % solid content, a high-shear homogenizer ("Excel Autohomogenizer ED-7", trade name of Nippon Seiki Co., Ltd. treatment conditions: rotational speed=15,000 rpm×5 minutes) was used for dispersion, and centrifugal separation was carried out (centrifugation for 10 minutes with a "Model 6800 Centrifugal Separator", trade name of Kubota Corp., Rotor type Model RA-400, under treatment conditions of centrifugal force: 39,200 $m^2/s$, obtaining the resulting supernatant, and further centrifugation at 116,000 $m^2/s$ for 45 minutes). The solid content remaining from the supernatant after centrifugation was measured by an absolute dry method and the mass percentage was calculated.

<Volume-Average Particle Size of Cellulose>

The cellulose was kneaded as a 40 mass % solid in a planetary mixer ("5DM-03-R", trade name of Shinagawa Machinery Works Co., Ltd., hook-type stirring blade) for 30 minutes at 126 rpm, room temperature, ordinary pressure. Next, a purified water suspension was prepared to a 0.5 mass % solid content, a high-shear homogenizer ("Excel Autohomogenizer ED-7", trade name of Nippon Seiki Co., Ltd. treatment conditions: rotational speed=15,000 rpm×5 minutes) was used for dispersion, and centrifugal separation was carried out (centrifugation for 10 minutes with a "Model 6800 Centrifugal Separator", trade name of Kubota Corp., Rotor type Model RA-400, under treatment conditions of centrifugal force: 39,200 $m^2/s$, obtaining the resulting supernatant, and further centrifugation at 116,000 $m^2/s$ for 45 minutes). The supernatant liquid after centrifugation was used to measure the 50% cumulative particle diameter (volume-average particle size) in the volume frequency particle size distribution obtained by a laser diffraction/scattering method-based particle size distribution meter ("LA-910", trade name of Horiba, Ltd., ultrasonic treatment for 1 minute, refractive index: 1.20).

<Zeta Potential of Cellulose>

This was measured in the same manner as Example A.

<Static Surface Tension of Organic Component>

This was measured in the same manner as Example A.

<Dynamic Surface Tension of Organic Component>

This was measured in the same manner as Example A.

<SP Value of Organic Component>

This was measured in the same manner as Example A.

TABLE C1

SP value and surface tension of solvents obtained by Feders method

| Classification | Solvent | SP value $(cal/cm^3)^{1/2}$ | Surface tension $(mNm^{-1})$ |
|---|---|---|---|
| Hydrocarbon | n-Hexane | 7.28 | 18.4 |
| | Toluene | 9.14 | 28.5 |
| | o-xylene | 9.10 | — |
| Ketone | Acetone | 9.07 | 23.3 |
| | Methyl ethyl ketone | 8.98 | 24.6 |
| | Cyclohexanone | 9.80 | 35.2 |
| Ester | Ethyl acetate | 8.74 | 24.0 |
| | Butyl acetate | 8.70 | — |
| Ether | Diethyl ether | 7.25 | 17.3 |
| | THF | 8.28 | 26.4 |

TABLE C1-continued

SP value and surface tension of solvents obtained by Feders method

| Classification | Solvent | SP value $(cal/cm^3)^{1/2}$ | Surface tension $(mNm^{-1})$ |
|---|---|---|---|
| Alcohol | Methanol | 13.77 | 22.5 |
| | Ethanol | 12.58 | 22.6 |
| | 1-Propanol | 11.84 | 23.7 |
| Water | Water | 23.4 | 72.8 |

<Binding Rate of Organic Component>

The cellulose formulation in an amount of 1 g solid content was placed in 10 mL of ethanol and stirred at room temperature for 60 minutes using a stirrer, after which the solvent was filtered with a PTFE membrane filter having an aperture of 0.4 μm, and the ethanol and other solvents were evaporated from the filtrate. The mass of the residue obtained from the filtrate was determined and the binding rate was calculated by the following formula.

Binding rate (%)=[1−([Mass of residue (g)]/[amount of organic component in cellulose formulation (g)])]×100

<Dispersibility>

A thin-film obtained from a strand of the resin composition was observed with a microscope ("VHX-1000", trade name of Keyence, 200× magnification) under transmitted light, and the number of coarse particles with short diameters of 100 μm and greater was counted. Evaluation was made on the following scale, based on the number of particles with short diameters of 100 μm and greater confirmed in a 2000 μm×2000 μm visual field.

A: ≤10
B: >10 and ≤20
C: >20 and ≤50
D: >50

<Colorability>

A thin-film obtained from a strand of the resin composition was visually observed. The evaluation was made on the following scale.

A: Colorless transparent
B: Light orange
C: Dark orange
D: Dark orange to dark brown <MFR (Melt Flow Rate)>

Pellets obtained from a strand of the resin composition were measured according to the method of ISO1133 A, under conditions of 230° C., 2.16 kgf load. The measured MFR of each resin composition was compared with the measured MFR for pellets of PP alone ("SunAllomer, Ltd. PX600N", product name of SunAllomer, Ltd., same hereunder), and evaluation was made on the following scale. The units were g/10 min. The MFR for the pellets of PP alone was 5.8 g/10 min.

A: Increased ≥80% with respect to PP alone
B: Increased ≥50% with respect to PP alone
C: Increased ≥20% with respect to PP alone
D: +≤10% with respect to PP alone (no effect)

<Linear Expansion Coefficient>

Pellets obtained from a strand of the resin composition were measured according to the method of JIS K7197 (TMA: Thermomechanical Analysis method) in a range of 0 to 60° C., and evaluation was made on the following scale based on the obtained value (where the value of PP alone was 148 ppm/K).

Examples C1-28 and Comparative Example C

A: <120 ppm/K
B: ≥120 ppm/K and <130 ppm/K
C: ≥130 ppm/K and <140 ppm/K
D: 140 to 150 ppm/K Examples C29-41

A: <40 ppm/K
B: ≥40 ppm/K and <50 ppm/K
C: ≥50 ppm/K and <60 ppm/K
D: 60 to 70 ppm/K <Tensile Strength>

Dumbbell-shaped test pieces conforming to JIS K7127, obtained for the examples and comparative examples, were used for measurement of the tensile strength using a universal material tester (Model AG-E Autograph, product of Shimadzu Corp.). Measurement was performed with a testing temperature of room temperature and a cross head speed of 50 mm/min, and the yield value read from the obtained stress-strain curve was determined as the tensile strength. The measured tensile strength for each resin composition was compared with the measured tensile strength for pellets of PP alone, and evaluated on the following scale. The tensile strength of pellets of PP alone was 33 MPa.

A: Increased ≥130% with respect to PP alone
B: Increased ≥120% with respect to PP alone
C: Increased ≥110% with respect to PP alone
D: <110% with respect to PP alone <Tensile Elongation>

The breaking distance was read from the stress-strain curve obtained by measurement of the tensile strength, to determine the tensile elongation. The measured tensile strength for each resin composition was compared with the measured tensile elongation for pellets of PP alone, and evaluated on the following scale. The tensile elongation of pellets of PP alone was 20%.

A: Increased ≥200% with respect to PP alone
B: Increased ≥150% with respect to PP alone
C: Increased ≥130% with respect to PP alone
D: <110% with respect to PP alone Example C1

Commercially available DP pulp (mean polymerization degree: 1600) was macerated and then hydrolyzed in 2.5 mol/L hydrochloric acid at 105° C. for 15 minutes, after which it was washed and filtered to prepare a cellulose wet cake with a solid content of 50 mass % (mean polymerization degree: 220, crystalline form: type I, degree of crystallinity: 78%, particle L/D: 1.6, colloidal cellulose content: 55 mass %, particle diameter (particle diameter at 50% in cumulative volume, same hereunder): 0.2 μm, zeta potential: −20 mV). The cellulose wet cake was then subjected to grinding treatment alone in a sealed planetary mixer ("ACM-5LVT", trade name of Kodaira Seisakusho Co., Ltd., hook-type stirring blade), at 70 rpm, ordinary temperature and ordinary pressure for 20 minutes, and then a rosin-ethylene oxide addition product (rosin-polyethylene glycol ester, trade name "REO-15" by Harima Chemicals, Inc., static surface tension: 39.7 mN/m, dynamic surface tension: 48.1 mN/m, SP value: ≥7.25, boiling point: >100° C. at ordinary pressure) was loaded to a cellulose/rosin-ethylene oxide addition product ratio of 80/20 (mass ratio), the mixture was subjected to grinding treatment for 60 minutes at 70 rpm, ordinary temperature and ordinary pressure, and finally the pressure was reduced (−0.1 MPa), and the mixture was set in a warm bath at 40° C. and coated and dried under reduced pressure at 307 rpm for 2 hours, to obtain cellulose formulation A (moisture content: 2 mass %, organic component binding rate: 5%).

After adding 12.5 parts by mass of the obtained cellulose formulation, 3 parts by mass of maleic acid-modified PP ("UMEX 1001", product name of Sanyo Chemical Industries, Ltd.) and 84.5 parts by mass of PP ("SunAllomer, Ltd. PX600N", product name of SunAllomer, Ltd.), a mini kneader ("Xplore", product name of Xplore Instruments) was used for circulated kneading for 5 minutes at 200° C., 100 rpm (shear rate: 1570 (1/s)), and the kneaded mixture was passed through a die to obtain a ϕ1 mm strand of the composite PP (resin composition). The strand was cut to 1 cm lengths at ordinary temperature and weighed out to 1 g, and a thin-film of 100 μm thickness was obtained using a hot press (200° C.). Pellets obtained from the strand (after cutting the strand to 1 cm lengths) were melted at 200° C. with an accessory injection molding machine, and the resin was used to form a dumbbell-shaped test piece conforming to JIS K7127, which was used for evaluation. The obtained thin-film, pellets and dumbbell-shaped test piece were used to conduct the evaluation. The results are shown in Table C2.

Example C2

Cellulose formulation B (moisture content: 2 mass %, organic component binding rate: ≤5%) was obtained by the same method as Example C1, except that in the method of producing the cellulose formulation in Example C1, the mixing proportion of the cellulose/rosin-ethylene oxide addition product was 95/5 (mass ratio). Cellulose formulation B was used to produce a resin composition by the same method as Example C1, and was evaluated. The results are shown in Table C2.

Example C3

Cellulose formulation C (moisture content: 2 mass %, organic component binding rate: ≤5%) was obtained by the same method as Example C1, except that in the method of producing the cellulose formulation in Example C1, the mixing proportion of the cellulose/rosin-ethylene oxide addition product was 50/50 (mass ratio). Cellulose formulation C was used to produce a resin composition by the same method as Example C1, and was evaluated. The results are shown in Table C2.

Example C4

Cellulose formulation D (moisture content: 2 mass %, organic component binding rate: ≤5%) was obtained by the same method as Example C1, except that in the method of producing the cellulose formulation in Example C1, the mixing proportion of the cellulose/rosin-ethylene oxide addition product was 99/1 (mass ratio). Cellulose formulation D was used to produce a resin composition by the same method as Example C1, and was evaluated. The results are shown in Table C2.

Example C5

Cellulose formulation E (moisture content: 2 mass %, organic component binding rate: ≤5%) was obtained by the same method as Example C1, except that in the method of producing the cellulose formulation in Example C1, the organic component used was liquid paraffin (product of Wako Pure Chemical Industries, Ltd., special grade, static surface tension: 26.4 mN/m (since the liquid paraffin underwent phase separation with water, the dynamic surface tension was the same value as water), boiling point: >100° C. at ordinary pressure).

Cellulose formulation E was used to produce a resin composition by the same method as Example C1, and was evaluated. The results are shown in Table C2.

Example C6

Cellulose formulation F (moisture content: 2 mass %, organic component binding rate: ≤5%) was obtained by the same method as Example C1, except that in the method of producing the cellulose formulation in Example C1, the organic component used was tall oil fatty acid ("HARTALL SR-30", trade name of Harima Chemicals, Inc., static surface tension: 30.2 mN/m (since the tall oil fatty acid underwent phase separation with water, the dynamic surface tension was the same value as water), SP value: ≥7.25, boiling point: >100° C. at ordinary pressure). Cellulose formulation F was used to produce a resin composition by the same method as Example C1, and was evaluated. The results are shown in Table C2.

Example C7

Cellulose formulation G (moisture content: 2 mass %, organic component binding rate: ≤5%) was obtained by the same method as Example C1, except that in the method of producing the cellulose formulation in Example C1, the organic component used was terpene oil ("Terpineol", trade name of Yasuhara Chemical Co., Ltd., static surface tension: 33.2 mN/m (since the terpene oil underwent phase separation with water, the dynamic surface tension was the same value as water), SP value: ≥7.25, boiling point: >100° C. at ordinary pressure). Cellulose formulation G was used to produce a resin composition by the same method as Example C1, and was evaluated. The results are shown in Table C3.

Example C8

Cellulose formulation H (moisture content: 2 mass %, organic component binding rate: ≤5%) was obtained by the same method as Example C1, except that in the method of producing the cellulose formulation in Example C1, the organic component used was 20 parts by mass of an equivalent mass ratio mixture (static surface tension: 35 mN/m, dynamic surface tension: 39 mN/m) of a rosin-ethylene oxide addition product (rosin-polyethyleneglycol ester, "REO-15", trade name of Harima Chemicals, Inc., static surface tension: 39.7 mN/m, dynamic surface tension: 48.1 mN/m, SP value: ≥7.25, boiling point: >100° C. at ordinary pressure) and tall oil fatty acid ("HARTALL SR-30", trade name of Harima Chemicals, Inc., static surface tension: 30.2 mN/m, SP value: ≥7.25, boiling point: >100° C. at ordinary pressure). Cellulose formulation H was used to produce a resin composition by the same method as Example C1, and was evaluated. The results are shown in Table C3.

Example C9

Cellulose formulation I (moisture content: 2 mass %, organic component binding rate: ≤5%) was obtained by the same method as Example C1, except that in the method of producing the cellulose formulation in Example C1, the organic component used was glycerin (static surface tension: 63.4 mN/m, dynamic surface tension: 71.9 mN/m, boiling point: >100° C. at ordinary pressure). Cellulose formulation I was used to produce a resin composition by the same method as Example C1, and was evaluated. The results are shown in Table C3.

Example C10

Commercially available DP pulp (mean polymerization degree: 1600) was macerated and then hydrolyzed in 2.5 mol/L hydrochloric acid at 70° C. for 15 minutes, after which it was washed and filtered to prepare a cellulose wet cake with a solid content of 50 mass % (mean polymerization degree: 490, crystalline form: type I, degree of crystallinity: 73%, particle L/D: 1.4, colloidal cellulose content: 50 mass %, particle diameter: 0.3 µm). Cellulose formulation J (moisture content: 2 mass %, organic component binding rate: 5%) was obtained by the same method as Example C1, except that the obtained cellulose wet cake was used as the cellulose. Cellulose formulation J was used to produce a resin composition by the same method as Example C1, and was evaluated. The results are shown in Table C3.

Example C11

Commercially available bagasse pulp (mean polymerization degree: 1100) was macerated and then hydrolyzed in 1.5 mol/L hydrochloric acid at 70° C. for 15 minutes, after which it was filtered to prepare a cellulose wet cake with a solid content of 50 mass % (mean polymerization degree: 750, crystalline form: type I, degree of crystallinity: 69%, particle L/D: 1.3, colloidal cellulose content: 40 mass %, particle diameter: 0.5 µm). Cellulose formulation K (moisture content: 2 mass %, organic component binding rate: 5%) was obtained by the same method as Example C1, except that the obtained cellulose wet cake was used as the cellulose. Cellulose formulation K was used to produce a resin composition by the same method as Example C1, and was evaluated. The results are shown in Table C3.

Example C12

Commercially available KP pulp (mean polymerization degree: 1600) was macerated and then hydrolyzed in 2.5 mol/L hydrochloric acid at 120° C. for 50 minutes, after which it was washed and filtered, diluted to 10 mass % concentration with ion-exchanged water, treated with a high-shear homogenizer ("TK Homogenizer", trade name of Primix Corp., 8000 rpm, 15 minutes) and further filtered to prepare a cellulose wet cake with a solid content of 50 mass % (mean polymerization degree: 110, crystalline form: type I, degree of crystallinity: 85%, particle L/D: 5.5, colloidal cellulose content: 80 mass %, particle diameter: 0.15 µm). Cellulose formulation L (moisture content: 2 mass %, organic component binding rate: 5%) was obtained by the same method as Example C1, except that the obtained cellulose wet cake was used as the cellulose. Cellulose formulation L was used to produce a resin composition by the same method as Example C1, and was evaluated. The results are shown in Table C4.

Example C13

Commercially available DP pulp (mean polymerization degree: 1620) was dissolved in a 60 mass % sulfuric acid aqueous solution at −5° C. to a cellulose concentration of 4 wt %, to obtain a cellulose dope. The cellulose dope was poured into a 2.5-fold weight of water (5° C.) while stirring, whereby the cellulose aggregated into a flocculated form, producing a suspension. After reaching a temperature of 80° C., the suspension was hydrolyzed for 10 minutes, and rinsing and dewatering were repeated until the supernatant pH reached 4 or higher, to obtain paste-like cellulose particles with a cellulose concentration of 6 wt %, as a semi-transparent white paste. The paste was also diluted with water to a cellulose concentration of 5 wt % and mixed for 5 minutes with a high-shear homogenizer (Excel Autohomogenizer) at a rotational speed of ≥15,000 rpm. The paste was then treated 4 times with an ultrahigh-pressure homogenizer (Model M-110EH Microfluidizer, product of Mizuho Industrial Co., Ltd., operating pressure: 1750 kg/cm$^2$), to obtain a transparent gel (transparent paste). The transparent paste was rinsed and desolvated 3 times with ion-exchanged water/ethanol=50/50 (weight ratio), to obtain a gel with a cellulose concentration of 5.2 wt %. The gel was mixed for 5 minutes with a blender at a rotational speed of 10,000 rpm. The resulting dispersion was concentrated under reduced pressure while stirring, to obtain cellulose floc with a solid content of 50 mass % (mean polymerization degree: 80, crystalline form: type II, degree of crystallinity: 28%, particle L/D: 0.1, colloidal cellulose content: 80 mass %, particle diameter: 0.1 µm). Cellulose formulation M (moisture content: 2 mass %, organic component binding rate: 5%) was obtained by the same method as Example C1, except for using this cellulose. Cellulose formulation M was used to produce a resin composition by the same method as Example C1, and was evaluated. The results are shown in Table C4.

Comparative Example C1

A PP resin composition was prepared and evaluated in the same manner as Example C1, except that in the method of producing the cellulose formulation of Example C1, no organic component was added and a cellulose wet cake (cellulose formulation N) with a cellulose concentration of 50 mass % was used. The results are shown in Table C4.

Comparative Example C2

In the method of producing the cellulose formulation of Example C1, the organic component used was ethanol (product of Wako Pure Chemical Industries, Ltd., special grade, static surface tension: 22.3 mN/m, dynamic surface tension: 54.9 mN/m, SP value: 12.58, boiling point: 78.4° C. at ordinary pressure), and the cellulose/organic component mixing ratio was prepared to 80/20 to obtain cellulose formulation O. Cellulose formulation O was used to produce a PP resin composition in the same manner as Example C1, and was evaluated. The results are shown in Table C4.

Comparative Example C3

To 600 g of commercially available conifer bleached Kraft pulp (refined, polymerization degree: 1050, 25 mass % solid) there was added 19.94 kg of ion-exchanged water, to prepare an aqueous suspension (cellulose concentration: 0.75 mass %). The obtained slurry was pulverized with a bead mill ("Apex Mill Model AM-1, trade name of Kotobuki Engineering & Manufacturing Co., Ltd.), using φ1 mm zirconia beads (fill factor: 70 vol %) as the medium, with two passes under conditions with a stirring blade rotational speed of 2500 rpm and a cellulose dispersion supply rate of 0.4 L/min, to obtain a cellulose dispersion. The resulting dispersion was concentrated under reduced pressure while stirring, to obtain cellulose floc with a solid content of 50 mass % (mean polymerization degree: 1050, crystalline form: type I, degree of crystallinity: 69%, particle L/D: 15,000, colloidal cellulose content: unmeasurable, particle diameter: 550 μm).

The cellulose floc and a rosin-ethylene oxide addition product (rosin-polyethyleneglycol ester, "REO-15", trade name of Harima Chemicals, Inc., static surface tension: 39.7 mN/m, dynamic surface tension: 48.1 mN/m, SP value: ≥7.25, boiling point: >100° C. at ordinary pressure) were loaded into water to a cellulose/rosin-ethylene oxide addition product ratio of 80/20 (mass ratio), to prepare a dispersion (cellulose concentration: 0.5 mass %). This was designated as cellulose dispersion P. Cellulose dispersion P was used to produce a PP resin composition by the same method as Example C1, and was evaluated. The results are shown in Table C4.

Comparative Example C4

In the method of Example C1, no cellulose was added during preparation of the resin composition, the organic components used were a rosin-ethylene oxide addition product (rosin-polyethyleneglycol ester, "REO-15", trade name of Harima Chemicals, Inc., static surface tension: 39.7 mN/m, dynamic surface tension: 48.1 mN/m, SP value: ≥7.25, boiling point: >100° C. at ordinary pressure) added at 2.5 parts by mass, maleic acid-modified PP ("UMEX 1001", product name of Sanyo Chemical Industries, Ltd. at 3 parts by mass and PP ("SunAllomer, Ltd. PX600N", product name of SunAllomer, Ltd.) at 84.5 parts by mass, a mini kneader ("Xplore", product name of Xplore instruments) was used to prepare a resin composition by the same procedure as Example C1, and the obtained thin-film, pellet and dumbbell-shaped test piece were used for evaluation. The results are shown in Table C4.

TABLE C2

|  |  | Example C1 | Example C2 | Example C3 | Example C4 | Example C5 | Example C6 |
|---|---|---|---|---|---|---|---|
| Cellulose formulation | | A | B | C | D | E | F |
| Crystal cellulose (A) | Mean polymerization degree | | | | 220 | | |
| | Crystalline form | | | | Type I | | |
| | Degree of crystallinity (%) | | | | 78 | | |
| | Particle diameter (μm) | | | | 0.2 | | |
| | Particle L/D | | | | 1.6 | | |
| | Colloid component (mass %) | | | | 55 | | |
| Organic component | Type | | | Rosin ester | | Liquid paraffin | Tall oil |
| | Static surface tension (25° C.) (mN/m) | | | 39.7 | | 26.4 | 30.2 |
| | Dynamic surface tension (25° C.) (mN/m) | | | 48.1 | | 72.8 | 72.8 |
| Hydrophobic group | Number of carbons | | | 20 | | 24 | 16 to 18 |
| | Cyclic structure | | | Yes | | No | No |
| Hydrophilic group | Structure | | | Polyoxyethylene | | — | Carboxylic acid |
| | Number of residues | | | 15 | | — | 1 |
| Cellulose formulation mixing ratio | Cellulose (mass %) | 80 | 95 | 50 | 99 | 80 | 80 |
| | Organic component (mass %) | 20 | 5 | 50 | 1 | 20 | 20 |
| Resin composition properties | Dispersibility | A | B | A | C | C | B |
| | Colorability | B | A | C | A | A | A |
| | MFR (g/10 min) | A: 10.8 | C: 8.5 | A: 11.5 | C: 7.5 | C: 7.1 | C: 7.1 |
| | Linear expansion coefficient (ppm/K) | A: 110 | B: 128 | B: 122 | C: 133 | C: 136 | B: 129 |
| | Tensile strength (MPa) | A: 45.5 | B: 42.5 | A: 43.0 | C: 39.5 | B: 40.0 | B: 42.1 |
| | Tensile elongation (%) | A: 230 | C: 145 | B: 175 | C: 135 | C: 130 | C: 135 |

TABLE C3

|  |  | Example C7 | Example C8 | Example C9 | Example C10 | Example C11 |
|---|---|---|---|---|---|---|
| Cellulose formulation | | G | H | I | J | K |
| Crystal cellulose (A) | Mean polymerization degree | | 220 | | 490 | 750 |
| | Crystalline form | | Type I | | Type I | Type I |
| | Degree of crystallinity (%) | | 78 | | 73 | 69 |
| | Particle diameter (μm) | | 0.2 | | 0.3 | 0.5 |
| | Particle L/D | | 1.6 | | 1.4 | 1.3 |

TABLE C3-continued

|  |  | Example C7 | Example C8 | Example C9 | Example C10 | Example C11 |
|---|---|---|---|---|---|---|
|  | Colloid component (mass %) |  | 55 |  | 50 | 40 |
| Organic component | Type | Terpene oil | Rosin ester/tall oil | Glycerin | Rosin ester | Rosin ester |
|  | Static surface tension (25° C.) (mN/m) | 33.2 | 35 | 63.4 | 39.7 | 39.7 |
|  | Dynamic surface tension (25° C.) (mN/m) | 72.8 | 39 | 71.9 | 48.1 | 48.1 |
| Hydrophobic group | Number of carbons | 9 to 10 | 18 to 19 | — | 20 | 20 |
|  | Cyclic structure | Yes | Yes | — | Yes | Yes |
| Hydrophilic group | Structure | Hydroxyl | Polyoxyethylene | Glycerin | Polyoxyethylene | Polyoxyethylene |
|  | Number of residues | 1 | 15 | — | 15 | 15 |
| Cellulose formulation mixing ratio | Cellulose (mass %) | 80 | 80 | 80 | 80 | 80 |
|  | Organic component (mass %) | 20 | 10/10 | 20 | 20 | 20 |
| Resin composition properties | Dispersibility | A | A | C | A | A |
|  | Colorability | B | A | A | B | C |
|  | MFR (g/10 min) | B: 9.8 | B: 10.2 | C: 9.2 | A: 10.5 | C: 8.5 |
|  | Linear expansion coefficient (ppm/K) | B: 125 | B: 122 | C: 133 | B: 126 | C: 133 |
|  | Tensile strength (MPa) | A: 43.1 | A: 44.3 | C: 36.6 | A: 43.0 | C: 36.6 |
|  | Tensile elongation (%) | B: 150 | A: 210 | C: 130 | A: 210 | C: 135 |

TABLE C4

|  |  | Example C12 | Example C13 | Comp. Example C1 | Comp. Example C2 | Comp. Example C3 | Comp. Example C4 |
|---|---|---|---|---|---|---|---|
| Cellulose formulation |  | L | M | N | O | P |  |
| Crystal cellulose (A) | Mean polymerization degree | 110 | 80 | 220 | 220 | 1050 |  |
|  | Crystalline form | Type I | Type II | Type I | Type I | Type I |  |
|  | Degree of crystallinity (%) | 85 | 28 | 78 | 78 | 69 |  |
|  | Particle diameter (μm) | 0.15 | 0.1 | 0.2 | 0.2 | 550 |  |
|  | Particle L/D | 5.5 | 1.1 | 1.6 | 1.6 | 15,000 |  |
|  | Colloid component (mass %) | 80 | 80 | 55 | 55 | N.D |  |
| Organic component | Type | Rosin ester | Rosin ester | Water | Ethanol | Rosin ester | Rosin ester |
|  | Static surface tension (25° C.) (mN/m) | 39.7 | 39.7 | 72.8 | 22.3 | 39.7 | 39.7 |
|  | Dynamic surface tension (25° C.) (mN/m) | 48.1 | 48.1 | 72.8 | 54.9 | 48.1 | 48.1 |
| Hydrophobic group | Number of carbons | 20 | 20 | — | — | 20 | 20 |
|  | Cyclic structure | Yes | Yes | — | — | Yes | Yes |
| Hydrophilic group | Structure | Polyoxyethylene | Polyoxyethylene | — | — | Polyoxyethylene | Polyoxyethylene |
|  | Number of residues | 15 | 15 | — | — | 15 | 15 |
| Cellulose formulation mixing ratio | Cellulose | 80 | 80 | 100 | 80 | 80 | 0 |
|  | Organic component | 20 | 20 | 0 | 20 | 20 | 100 |
| Resin composition properties | Dispersibility | A | A | D | D | D | — |
|  | Colorability | C | C | A | A | D | C |
|  | MFR (g/10 min) | B: 10.4 | C: 8.6 | D: 5.3 | D: 5.5 | D: 3.8 | D: 3.8 |
|  | Linear expansion coefficient (ppm/K) | A: 108 | D: 140 | D: 148 | D: 144 | C: 131 | D: 145 |
|  | Tensile strength (MPa) | B: 39.6 | D: 35.3 | D: 29.9 | D: 34.3 | C: 36.5 | D: 28.2 |
|  | Tensile elongation (%) | B: 180 | C: 145 | D: 80 | D: 90 | D: 70 | D: 70 |

In the resin composition of Comparative Example C1 with addition of cellulose formulation N composed of cellulose particles not covered by an organic component, and in the resin composition of Comparative Example C2 with addition of cellulose formulation O composed of cellulose particles covered with ethanol that has a lower boiling point than water, dispersion of the cellulose particles in PP was poor, the MFR was low, and the flow property was no better than that of PP alone. The expansion coefficient, tensile strength and tensile elongation of the molded articles, such as thin-films, formed from the resin compositions were all low, with no improvement seen over PP alone. Also, with the resin composition of Comparative Example C3 which had addition of a rosin-ethylene oxide addition product with a static surface tension of ≥20 mN/m and a higher boiling point than water, and an aqueous dispersion of cellulose particles, the flow property and tensile elongation were poorer than those of PP alone.

The resin composition of Comparative Example C4 was obtained by the same procedure as Example C1, with no addition of cellulose but with addition of an organic component alone, and no notable effect on the flow property, dimensional stability, strength or elongation was observed with respect to PP alone.

In contrast, with the resin compositions of Examples C1 to 13 which had addition of cellulose formulations A to M comprising cellulose particles that had been kneaded with an organic component having a static surface tension of 20 mN/m or greater and a higher boiling point than water to cover at least portions of the particle surfaces with the organic component, the dispersibility of the cellulose particles in the resins was satisfactory, and the MFR and tensile elongation of the obtained resin compositions were all improved over those of PP alone. In particular, the resin compositions of Examples C1 to 12, which had addition of cellulose formulations A to L comprising type I crystalline cellulose particles covered with an organic component, exhibited linear expansion coefficients and tensile strengths that were improved over PP alone.

Furthermore, based on the results for the resin compositions of Examples C1, 10, 11 and 12 which had addition of cellulose formulations A, J, K and L comprising cellulose particles covered with a rosin-ethylene oxide addition product, the resin compositions that had addition of cellulose formulations A, J and L in which the mean polymerization degree of the cellulose particles was lower than 500 all exhibited more satisfactory MFR, linear expansion coefficient, tensile strength and tensile elongation than the resin composition that had addition of cellulose formulation K in which the mean polymerization degree of the cellulose particles was 750. Also, cellulose formulations A, F, G and H (Examples C1 and 6 to 8) covered with organic components comprising both hydrophobic groups and hydrophilic groups exhibited more satisfactory dispersibility in resins compared to cellulose formulation E (Example C5) covered with a liquid paraffin lacking hydrophilic groups and cellulose formulation I (Example C9) covered with glycerin lacking hydrophobic groups, and especially they exhibited more satisfactory linear expansion coefficients, tensile strength and tensile elongation.

Example C14

A resin composition was prepared in the same manner with a mini kneader, using cellulose formulation A of Example C1 and changing the resin composition to 12.5 parts by mass of the cellulose formulation, 0.1 part by mass of maleic acid-modified PP, and polypropylene added as the remainder for a total amount of 100 parts by mass, and the composition was evaluated. The results are shown in Table C5.

For evaluation of the resin compositions of the Examples C, the evaluation criteria for Examples C14 to 28 were as follows.
<Linear Expansion Coefficient>
  AAA: <80 ppm/K
  AA: ≥80 ppm/K and <100 ppm/K
  A: ≥100 ppm/K and <120 ppm/K
  B: ≥120 ppm/K and <130 ppm/K
  C: ≥130 ppm/K and <140 ppm/K
<Tensile Strength>
  AA: Increased ≥140% with respect to PP alone
  A: Increased ≥130% with respect to PP alone
  B: Increased ≥120% with respect to PP alone
  C: Increased ≥110% with respect to PP alone
<Tensile elongation>
  A: Increased ≥200% with respect to PP alone
  B: Increased ≥150% with respect to PP alone
  C: Increased ≥130% with respect to PP alone

Example C15

A resin composition was prepared in the same manner with a mini kneader, using cellulose formulation A of Example C1 and changing the resin composition to 12.5 parts by mass of the cellulose formulation, 0.5 part by mass of maleic acid-modified PP, and PP as the remainder added for a total amount of 100 parts by mass, with the cellulose/maleic acid-modified PP mass ratio of the formulation adjusted to 95/5, and the composition was evaluated. The results are shown in Table C5.

Example C16

A resin composition was prepared in the same manner with a mini kneader, using cellulose formulation A of Example C1 and changing the resin composition to 12.5 parts by mass of the cellulose formulation, 1.1 parts by mass of maleic acid-modified PP, and PP added as the remainder for a total amount of 100 parts by mass, and the composition was evaluated. The results are shown in Table C5.

Example C17

A resin composition was prepared in the same manner with a mini kneader, using cellulose formulation A of Example C1 and changing the resin composition to 12.5 parts by mass of the cellulose formulation, 1.8 parts by mass of maleic acid-modified PP, and PP added as the remainder for a total amount of 100 parts by mass, and the composition was evaluated. The results are shown in Table C5.

Example C18

A resin composition was prepared in the same manner with a mini kneader, using cellulose formulation A of Example C1 and changing the resin composition to 12.5 parts by mass of the cellulose formulation, 2.5 parts by mass of maleic acid-modified PP, and PP added as the remainder for a total amount of 100 parts by mass, and the composition was evaluated. The results are shown in Table C5.

Example C19

A resin composition was prepared in the same manner with a mini kneader, using cellulose formulation A of Example C1 and changing the resin composition to 12.5 parts by mass of the cellulose formulation, 8.5 parts by mass of maleic acid-modified PP, and PP added as the remainder for a total amount of 100 parts by mass, and the composition was evaluated. The results are shown in Table C6.

Example C20

A resin composition was prepared in the same manner with a mini kneader, fixing the content of cellulose formulation A at 12.5 parts by mass and the content of maleic acid-modified PP at 3 parts by mass in the resin composition of Example C1, and in place of part of the PP, adding 0.1 part by mass of polyamide 6 (AMILAN CM1007, product of Toray Co., Ltd.), and the composition was evaluated. The results are shown in Table C6.

Example C21

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 0.5 part by mass of polyamide 6, and the composition was evaluated. The results are shown in Table C6.

Example C22

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 1.0 part by mass of polyamide 6, and the composition was evaluated. The results are shown in Table C6.

Example C23

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 2.0 parts by mass of polyamide 6, and the composition was evaluated. The results are shown in Table C6.

Example C24

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 5.0 parts by mass of polyamide 6, and the composition was evaluated. The results are shown in Table C7.

Example C25

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 10.0 parts by mass of polyamide 6, and the composition was evaluated. The results are shown in Table C7.

Example C26

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 20.0 parts by mass of polyamide 6, and the composition was evaluated. The results are shown in Table C7.

Example C27

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 30.0 parts by mass of polyamide 6, and the composition was evaluated. The results are shown in Table C7.

Example C28

A resin composition was prepared in the same manner with a mini kneader, fixing the content of cellulose formulation A at 12.5 parts by mass and the content of maleic acid-modified PP at 3.0 parts by mass in the resin composition of Example C1, and in place of part of the PP, adding 75.0 parts by mass of polyamide 6, and the composition was evaluated. The results are shown in Table C7.

TABLE C5

| | | Example C14 | Example C15 | Example C16 | Example C17 | Example C18 |
|---|---|---|---|---|---|---|
| Cellulose formulation | | | | A | | |
| Resin composition mixing ratio | Cellulose (mass %) | | | 10 | | |
| | Organic component (mass %) | | | 2.5 | | |
| | Maleic acid-modified PP (mass %) | 0.1 | 0.5 | 1 | 1.5 | 2 |
| | Polyamide 6 (mass %) | — | — | — | — | — |
| | Polypropylene (mass %) | 87.4 | 87 | 86.5 | 86 | 85.5 |
| Resin composition properties | Dispersibility | A | A | A | A | A |
| | Colorability | B | B | B | B | B |
| | MFR (g/10 min) | A | A | A | A | A |
| | Linear expansion coefficient (ppm/K) | C: 138 | C: 135 | B: 128 | B: 120 | A: 113 |
| | Tensile strength (MPa) | C: 35.5 | C: 36.0 | B: 41.0 | B: 42.2 | A: 43.1 |
| | Tensile elongation (%) | C: 140 | B: 150 | B: 160 | B: 180 | A: 210 |

TABLE C6

|  |  | Example C19 | Example C20 | Example C21 | Example C22 | Example C23 |
|---|---|---|---|---|---|---|
| Cellulose formulation | | | | A | | |
| Resin composition mixing ratio | Cellulose (mass %) | | | 10 | | |
| | Organic component (mass %) | | | 2.5 | | |
| | Maleic acid-modified PP (mass %) | 5.5 | 3 | 3 | 3 | 3 |
| | Polyamide 6(mass %) | — | 0.1 | 0.5 | 1 | 2 |
| | Polypropylene (mass %) | 82 | 84.4 | 84 | 83.5 | 82.5 |
| Resin composition properties | Dispersibility | A | A | A | A | A |
| | Colorability | B | B | B | B | B |
| | MFR (g/10 min) | A | A | A | A | A |
| | Linear expansion coefficient (ppm/K) | A: 110 | A: 105 | A: 106 | A: 107 | A: 103 |
| | Tensile strength (MPa) | A: 45.6 | A: 44.9 | A: 44.8 | A: 45.1 | A: 45.7 |
| | Tensile elongation (%) | A: 250 | A: 250 | A: 250 | A: 240 | A: 240 |

TABLE C7

|  |  | Example C24 | Example C25 | Example C26 | Example C27 | Example C28 |
|---|---|---|---|---|---|---|
| Cellulose formulation | | | | A | | |
| Resin composition mixing ratio | Cellulose (mass %) | | | 10 | | |
| | Organic component (mass %) | | | 2.5 | | |
| | Maleic acid-modified PP (mass %) | 3 | 3 | 3 | 3 | 3 |
| | Polyamide 6(mass %) | 5 | 10 | 20 | 30 | 75 |
| | Polypropylene (mass %) | 79.5 | 74.5 | 64.5 | 54.5 | 9.5 |
| Resin composition properties | Dispersibility | A | A | A | A | A |
| | Colorability | B | B | B | B | B |
| | MFR (g/10 min) | A | B | B | B | B |
| | Linear expansion coefficient (ppm/K) | A: 101 | AA: 94 | AA: 89 | AAA: 78 | AA: 85 |
| | Tensile strength (MPa) | A: 45.5 | AA: 47.4 | AA: 50.2 | AA: 51.5 | AA: 48.0 |
| | Tensile elongation (%) | A: 230 | A: 220 | A: 210 | A: 210 | B: 180 |

The results showed that the resin compositions of Examples C14 to 28, which contained maleic acid-modified PP as an interface-forming agent at 1 mass % or greater as the mass ratio with respect to cellulose, all exhibited improved linear expansion coefficient, tensile strength and tensile elongation compared to PP alone.

Example C29

Cellulose formulation Q (moisture content: 2 mass %, organic component binding rate: ≤5%) was obtained by the same method as Example C2, except that in the method of producing the cellulose formulation in Example C2, the organic component used was a polyoxyethylene alkyl phenyl ether (BLAUNON N-515, product of Aoki Oil Industrial Co., Ltd., static surface tension: 34.8 mN/m, dynamic surface tension: 40.9 mN/m, boiling point: >100° C. at ordinary pressure). Cellulose formulation Q was used to produce a resin composition by the same method as Example C1, and was evaluated. The results are shown in Table C8.

Example C30

Cellulose formulation R (moisture content: 2 mass %, organic component binding rate: ≤5%) was obtained by the same method as Example C2, except that in the method of producing the cellulose formulation in Example C2, the organic component used was a polyoxyethylene styrenated phenyl ether (BLAUNON KTSP-16, product of Aoki Oil Industrial Co., Ltd., static surface tension: 39.0 mN/m, dynamic surface tension: 55.8 mN/m, boiling point: >100° C. at ordinary pressure). Cellulose formulation R was used to produce a resin composition by the same method as Example C1, and was evaluated. The results are shown in Table C8.

Example C31

Cellulose formulation S (moisture content: 2 mass %, organic component binding rate: ≤5%) was obtained by the same method as Example C2, except that in the method of producing the cellulose formulation in Example C2, the organic component used was polyoxyethylene (3-naphthyl) ether (BLAUNON BN-10, product of Aoki Oil Industrial Co., Ltd., static surface tension: 48.2 mN/m, dynamic surface tension: 51.7 mN/m, boiling point: >100° C. at ordinary pressure). Cellulose formulation S was used to produce a resin composition by the same method as Example C1, and was evaluated. The results are shown in Table C8.

Example C32

Cellulose formulation T (moisture content: 2 mass %, organic component binding rate: ≤5%) was obtained by the same method as Example C2, except that in the method of producing the cellulose formulation in Example C2, the organic component used was polyoxyethylene bisphenol A ether (BLAUNON BEO-17.5, product of Aoki Oil Industrial Co., Ltd., static surface tension: 49.5 mN/m, dynamic surface tension: 53.1 mN/m, boiling point: >100° C. at ordinary pressure). Cellulose formulation T was used to produce a resin composition by the same method as Example C1, and was evaluated. The results are shown in Table C8.

Example C33

Cellulose formulation U (moisture content: 2 mass %, organic component binding rate: ≤5%) was obtained by the same method as Example C2, except that in the method of producing the cellulose formulation in Example C2, the organic component used was polyoxyethylene hydrogenated castor oil ether (BLAUNON RCW-20, product of Aoki Oil Industrial Co., Ltd., static surface tension: 42.4 mN/m, dynamic surface tension: 52.9 mN/m, boiling point: >100° C. at ordinary pressure). Cellulose formulation U was used to produce a resin composition by the same method as Example C1, and was evaluated. The results are shown in Table C8.

Example C34

Cellulose formulation V (moisture content: 2 mass %, organic component binding rate: ≤5%) was obtained by the same method as Example C2, except that in the method of producing the cellulose formulation in Example C2, the organic component used was a polyoxyethylene straight-chain alkyl ether (BLAUNON CH-315L, product of Aoki Oil Industrial Co., Ltd., static surface tension: 36.7 mN/m, dynamic surface tension: 62.6 mN/m, boiling point: >100° C. at ordinary pressure). Cellulose formulation V was used to produce a resin composition by the same method as Example C1, and was evaluated. The results are shown in Table C8.

Example C35

Cellulose formulation Q (moisture content: 2 mass %, organic component binding rate: ≤5%) was obtained by the same method as Example C2, except that in the method of producing the cellulose formulation in Example C2, the organic component used was polyoxyethylene phytosterol ether (NIKKOL BPS-20, product of Nikko Chemicals Co., Ltd., static surface tension: 51.3 mN/m, dynamic surface tension: 65.7 mN/m, boiling point: >100° C. at ordinary pressure). Cellulose formulation W was used to produce a resin composition by the same method as Example C1, and was evaluated. The results are shown in Table C8.

Example C36

After obtaining cellulose formulation A by the method of Example C1, and adding 12.5 parts by mass of the obtained cellulose formulation and 87.5 parts by mass of polyamide 6 (PA6) (UBE Nylon 1013B, trade name of Ube Industries, Ltd., carboxyl terminal group ratio: ([COOH]/[total terminal groups])=0.6), a mini kneader ("Xplore", product name of Xplore Instruments) was used for circulated kneading for 5 minutes at 240° C., 100 rpm (shear rate: 1570 (1/s)), and the kneaded mixture was passed through a die to obtain a ϕ1 mm strand of the resin composition. The strand was cut to 1 cm lengths at ordinary temperature and weighed out to 1 g, and a thin-film of 100 μm thickness was obtained using a hot press (240° C.). Pellets obtained from the strand (after cutting the strand to 1 cm lengths) were melted at 260° C. with an accessory injection molding machine, and the resin was used to form a dumbbell-shaped test piece conforming to JIS K7127, which was used for evaluation. The obtained thin-film, pellets and dumbbell-shaped test piece were used to conduct the evaluation. The results are shown in Table C8.

Example C37

Cellulose formulation X was obtained by the same method as Example C1, except that in the method of producing the cellulose formulation in Example C1, the organic component used was a polyoxyethylene alkyl phenyl ether (BLAUNON N-515, product of Aoki Oil Industrial Co., Ltd., static surface tension: 34.8 mN/m, dynamic surface tension: 40.9 mN/m, boiling point: >100° C. at ordinary pressure). The obtained cellulose formulation X was used to prepare a resin composition by the same method as Example C38, and was evaluated. The results are shown in Table C8.

Example C38

Cellulose formulation Y was obtained by the same method as Example C1, except that in the method of producing the cellulose formulation in Example C1, the organic component used was a polyoxyethylene styrenated phenyl ether (BLAUNON KTSP-16, product of Aoki Oil Industrial Co., Ltd., static surface tension: 39.0 mN/m, dynamic surface tension: 55.8 mN/m, boiling point: >100° C. at ordinary pressure). The obtained cellulose formulation X was used to prepare a resin composition by the same method as Example C38, and was evaluated. The results are shown in Table C8.

Example C39

Cellulose formulation Z was obtained by the same method as Example C1, except that in the method of producing the cellulose formulation in Example C1, the organic component used was polyoxyethylene β-naphthyl ether (BLAUNON BN-10, product of Aoki Oil Industrial Co., Ltd., static surface tension: 48.2 mN/m, dynamic surface tension: 51.7 mN/m, boiling point: >100° C. at ordinary pressure). The obtained cellulose formulation X was used to prepare a resin composition by the same method as Example C38, and was evaluated. The results are shown in Table C8.

Example C40

Cellulose formulation α was obtained by the same method as Example C1, except that in the method of producing the cellulose formulation in Example C1, the organic component used was polyoxyethylene bisphenol A ether (BLAUNON BEO-17.5, product of Aoki Oil Industrial Co., Ltd., static surface tension: 49.5 mN/m, dynamic surface tension: 53.1 mN/m, boiling point: >100° C. at ordinary pressure). The obtained cellulose formulation X was used to prepare a resin composition by the same method as Example C38, and was evaluated. The results are shown in Table C8.

Example C41

Cellulose formulation β was obtained by the same method as Example C1, except that in the method of producing the cellulose formulation in Example C1, the organic component used was a polyoxyethylene hydrogenated castor oil ether (BLAUNON RCW-20, product of Aoki Oil Industrial Co., Ltd., static surface tension: 42.4 mN/m, dynamic surface tension: 52.9 mN/m, boiling point: >100° C. at ordinary pressure). The obtained cellulose formulation X was used to prepare a resin composition by the same method as Example C38, and was evaluated. The results are shown in Table C8.

TABLE C8

| | | Example C29 | Example C30 | Example C31 | Example C32 | Example C33 | Example C34 | Example C35 |
|---|---|---|---|---|---|---|---|---|
| Cellulose formulation | | Q | R | S | T | U | V | W |
| Crystal cellulose (A) | Mean polymerization degree | | | | 220 | | | |
| | Crystalline form | | | | Type I | | | |
| | Degree of crystallinity (%) | | | | 78% | | | |
| | Particle diameter (μm) | | | | 0.2 | | | |
| | Particle L/D | | | | 1.6 | | | |
| | Colloid component (mass %) | | | | 55 | | | |
| Organic component | Type | Alkyl phenyl ether | Styrenated phenyl ether | β-Naphthyl ether | Bisphenol A ether | Hydrogenated castor oil ether | Straight-chain alkyl ether | Phytosterol |
| | Dynamic surface tension (25° C.) (mN/m) | 34.8 | 39 | 48.2 | 49.5 | 42.4 | 36.7 | 51.3 |
| | Dynamic surface tension (25° C.) (mN/m) | 40.9 | 55.8 | 51.7 | 53.1 | 52.9 | 62.6 | 65.7 |
| Hydrophobic group | Number of carbons | 15 | 22 | 10 | 15 | 57 | 16 | 29 |
| | Cyclic structure | Yes | Yes | Yes | Yes | No | No | Yes |
| Hydrophilic group | Structure | Polyoxy-ethylene | Polyoxy-ethylene | Polyoxy-ethylene | Polyoxy-ethylene | Polyoxy-ethylene | Polyoxy-ethylene | Polyoxy-ethylene |
| | Number of residues | 15 | 16 | 10 | 17.5 | 20 | 15 | 20 |
| Cellulose formulation mixing ratio | Cellulose | 95 | 95 | 95 | 95 | 95 | 95 | 95 |
| | Organic component | 5 | 5 | 5 | 5 | 5 | 5 | 5 |
| Resin composition properties | Dispersibility | A | A | A | A | A | C | C |
| | Colorability | A | A | A | A | A | A | A |
| | MFR (g/10 min) | B: 10.4 | B: 9.5 | B: 9.7 | B: 9.6 | B: 10.0 | C: 9.2 | C: 9.3 |
| | Linear expansion coefficient (ppm/K) | B: 120 | B: 129 | B: 125 | B: 127 | B: 126 | D: 141 | D: 142 |
| | Tensile strength (MPa) | B: 42.7 | B: 39.5 | B: 40.5 | B: 39.7 | B: 40.1 | C: 36.4 | C: 36.1 |
| | Tensile elongation (%) | B: 151 | C: 134 | C: 149 | C: 139 | B: 150 | C: 131 | C: 130 |

| | | Example C36 | Example C37 | Example C38 | Example C39 | Example C40 | Example C41 |
|---|---|---|---|---|---|---|---|
| Cellulose formulation | | A | X | Y | Z | α | β |
| Crystal cellulose (A) | Mean polymerization degree | | | | 220 | | |
| | Crystalline form | | | | Type I | | |
| | Degree of crystallinity (%) | | | | 78% | | |
| | Particle diameter (μm) | | | | 0.2 | | |
| | Particle L/D | | | | 1.6 | | |
| | Colloid component (mass %) | | | | 55 | | |
| Organic component | Type | Rosin ester | Alkyl phenyl ether | Styrenated phenyl ether | β-Naphthyl ether | Bisphenol A ether | Hydrogenated castor oil ether |
| | Dynamic surface tension (25° C.) (mN/m) | 39.7 | 34.8 | 39 | 48.2 | 49.5 | 42.4 |
| | Dynamic surface tension (25° C.) (mN/m) | 48.1 | 40.9 | 55.8 | 51.7 | 53.1 | 52.9 |
| Hydrophobic group | Number of carbons | 20 | 15 | 22 | 10 | 15 | 57 |
| | Cyclic structure | Yes | Yes | Yes | Yes | Yes | No |
| Hydrophilic group | Structure | Polyoxy-ethylene | Polyoxy-ethylene | Polyoxy-ethylene | Polyoxy-ethylene | Polyoxy-ethylene | Polyoxy-ethylene |
| | Number of residues | 15 | 15 | 16 | 10 | 17.5 | 20 |
| Cellulose formulation mixing ratio | Cellulose | 80 | 80 | 80 | 80 | 80 | 80 |
| | Organic component | 20 | 20 | 20 | 20 | 20 | 20 |
| Resin composition properties | Dispersibility | A | A | B | A | B | A |
| | Colorability | B | A | A | A | A | A |
| | MFR (g/10 min) | B | B | C | B | C | B |

TABLE C8-continued

|  |  |  |  |  |  |  |
|---|---|---|---|---|---|---|
| Linear expansion coefficient (ppm/K) | B | B | C | B | C | B |
| Tensile strength (MPa) | B | B | C | B | C | B |
| Tensile elongation (%) | B | B | C | B | C | B |

INDUSTRIAL APPLICABILITY

The resin compositions of aspects of the present disclosure (particularly aspects A and B) can be suitably used in fields that use automobile exterior materials, as large parts that require high strength and low linear expansibility, as well as stable performance. Moreover, the cellulose formulation and resin composition according to a different aspect of the present disclosure (particularly aspect C) can be satisfactorily applied to resin composites, for a variety of purposes, that exhibit advantageous performance including a low linear expansion coefficient and excellent strength and elongation when subjected to stretching or bending deformation.

REFERENCE SIGNS LIST

1 Relative position of runner (hot runner)
(1)-(10) Sampling locations of test pieces for measurement of coefficient of variation of linear expansion coefficient

The invention claimed is:

1. A resin composition comprising 100 parts by mass of a thermoplastic resin and 0.1 to 100 parts by mass of a cellulose component, wherein the cellulose component includes cellulose whiskers having a length/diameter ratio (L/D ratio) of less than 30 and a diameter of 20 nm or larger and 500 nm or smaller and cellulose fibers having an L/D ratio of 30 or greater and a diameter of 90 nm or larger and 500 nm or smaller.

2. The resin composition according to claim 1, wherein the proportion of cellulose whiskers is 50 mass % or greater with respect to the total mass of the cellulose component.

3. The resin composition according to claim 1, wherein the degree of crystallinity of the cellulose whiskers and the degree of crystallinity of the cellulose fibers are both 55% or higher.

4. The resin composition according to claim 1, wherein the degree of polymerization of the cellulose whiskers is 100 or higher and 300 or lower.

5. The resin composition according to claim 1, wherein the degree of polymerization of the cellulose fibers is 400 or higher and 3500 or lower.

6. The resin composition according to claim 1, further comprising an organic component having a dynamic surface tension of no greater than 60 mN/m in an amount of up to 50 parts by mass with respect to 100 parts by mass of the cellulose component.

7. The resin composition according to claim 6, wherein the organic component is a surfactant.

8. The resin composition according to claim 6, wherein the static surface tension of the organic component is 20 mN/m or greater.

9. The resin composition according to claim 6, wherein the organic component is one or more selected from the group consisting of rosin derivatives, alkylphenyl derivatives, bisphenol A derivatives, β-naphthyl derivatives, styrenated phenyl derivatives and hydrogenated castor oil derivatives.

10. The resin composition according to claim 6, wherein the organic component is a polyoxyethylene derivative.

11. The resin composition according to claim 1, wherein the coefficient of variation of the tensile break strength of the resin composition (standard deviation/arithmetic mean value) is no greater than 10%.

12. The resin composition according to claim 1, wherein the coefficient of variation of the linear expansion coefficient of the resin composition (standard deviation/arithmetic mean value) in a range of 0° C. to 60° C. is no greater than 15%, and the coefficient of variation of the tensile break strength of the resin composition is no greater than 10%.

13. Resin pellets formed of a resin composition according to claim 1.

14. A molded resin formed of a resin composition according to claim 1.

* * * * *